(12) United States Patent
Omata et al.

(10) Patent No.: US 9,093,936 B2
(45) Date of Patent: Jul. 28, 2015

(54) CONTROL APPARATUS FOR AC MOTOR

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/142,415

(22) Filed: Dec. 27, 2013

(65) Prior Publication Data
US 2014/0184114 A1 Jul. 3, 2014

(30) Foreign Application Priority Data

Dec. 28, 2012 (JP) .................................. 2012-287671
Oct. 23, 2013 (JP) .................................. 2013-220298

(51) Int. Cl.
*H02P 21/00* (2006.01)
*H02P 6/08* (2006.01)
*H02P 21/14* (2006.01)

(52) U.S. Cl.
CPC .............. *H02P 6/08* (2013.01); *H02P 21/0035* (2013.01); *H02P 21/146* (2013.01)

(58) Field of Classification Search
CPC .............................. H02P 6/08; H02P 21/0096
USPC .................. 318/400.02, 400.01, 700
See application file for complete search history.

(56) References Cited

U.S. PATENT DOCUMENTS

| 7,548,035 B2 * | 6/2009 | Endo et al. .................. 318/432 |
| 2008/0079385 A1 | 4/2008 | Hashimoto et al. |
| 2010/0123418 A1 | 5/2010 | Itoh et al. |

FOREIGN PATENT DOCUMENTS

| JP | 2001-309697 | 11/2001 |
| JP | 2004-159391 | 6/2004 |
| JP | 2008-050075 | 3/2008 |
| JP | 2012-050259 | 3/2012 |
| JP | 2012-060710 | 3/2012 |
| JP | 4942425 | 3/2012 |
| JP | 2012-090490 | 5/2012 |

OTHER PUBLICATIONS

Office Action (3 pages) dated Feb. 24, 2015, issued in corresponding Japanese Application No. 2013-220298 and English translation (2 pages).

* cited by examiner

*Primary Examiner* — David S Luo
(74) *Attorney, Agent, or Firm* — Nixon & Vanderhye, P.C.

(57) ABSTRACT

An apparatus for controlling an AC motor driven by an inverter includes a two-phase calculator for calculating a two-phase control current value based on a first-phase current, a second-phase current, and a rotation angle of the motor, a one-phase calculator for calculating a one-phase control current value based on the first-phase current and the rotation angle, a determinator for determining whether a sudden change occurs based on a fluctuation in a rotation speed of the motor, a switch for selecting the one-phase control current value as a fixed value when no sudden change occurs and selecting the two-phase control current value as the fixed value when the sudden change occurs, and a voltage command value calculator for calculating a voltage command value related to a voltage applied to the inverter based on the current fixed value and a drive command value related to driving of the AC motor.

13 Claims, 30 Drawing Sheets

CONTROL APPARATUS FOR AC MOTOR

CROSS REFERENCE TO RELATED APPLICATION

This application is based on Japanese Patent Application No. 2012-287671 filed on Dec. 28, 2012 and No. 2013-220298 filed on Oct. 23, 2013, the contents of which are incorporated herein by reference.

FIELD

The present disclosure relates to a control apparatus for an alternating-current (AC) motor.

BACKGROUND

In recent years, from social demands for low-fuel consumption and low exhaust emission, there has been an increased attention to an electric vehicle or a hybrid vehicle equipped with an alternate-current (AC) motor to run. For example, in a hybrid vehicle, an AC motor is connected to a direct-current (DC) power source such as a rechargeable battery unit through a power converter such as an inverter. The inverter converts a DC voltage supplied from the DC power source to an AC voltage and drives the AC motor by the AC voltage.

US 2008/0079385 corresponding to JP-2008-86139 discloses a technique for reducing the number of current sensors used in a control apparatus for an AC motor mounted on an electric vehicle or a hybrid vehicle, thereby reducing the size of the apparatus near output terminals of the inverter and the cost of a control system of the AC motor. In the technique disclosed in US 2008/0079385, a current sensor for detecting a phase current is provided to one phase of the AC motor.

JP-4942425 discloses that two current sensors are separately provided to two phases of an AC motor. In a technique disclosed in JP-4942425, the motor is controlled based on detection values of two current sensors in low speed conditions and controlled based on a detection value of one current sensor in the other conditions to prevent a torque ripple caused by a difference in gain between the current sensors. The control using the detection values of two current sensors is hereinafter referred to as the "two-phase control", and the control using the detection value of one current sensor is hereinafter referred to as the "one-phase control".

SUMMARY

In US 2008/0079385, the one-phase control is performed by using the detection value of one current sensor and a three-phase AC current command value as an estimation value. The three-phase AC current command value is calculated by inverse dq transformation based on a d-axis current command value, a q-axis current command value, and an electrical angle. The three-phase AC current command value does not accurately reflect an actual current of the AC motor. In JP-4942425, the one-phase control is performed simply by shifting a phase of the detection value of one current sensor by 120°. Therefore, one-phase control methods disclosed in US 2008/0079385 and in JP-4942425 are not performed by accurately detecting driving conditions of the AC motor.

By the way, when an electric vehicle or a hybrid vehicle equipped with an AC motor runs on a road, a drive wheel of the vehicle may slip and grip according to road conditions including an uneven surface and an iced surface. At this time, a rotation speed of the AC motor may suddenly change according to the slip and the grip of the drive wheel. It may be difficult for the one-phase control methods disclosed in US 2008/0079385 and JP-4942425 to respond to such a sudden change. JP-4942425 discloses that the two-phase control is used in low speed conditions to improve controllability, but is silent on how to perform control when the rotation speed suddenly changes.

In view of the above, it is an object of the present disclosure to provide an AC motor control apparatus for increasing responsiveness to a sudden change in a rotation speed of an AC motor.

According to an aspect of the present disclosure, an apparatus is configured to control a three-phase AC motor, to which a voltage controlled by an inverter is applied, and includes a first current receiver, a second current receiver, a rotation angle receiver, a two-phase control current value calculator, a one-phase control current value calculator, a rotation speed calculator, a fluctuation calculator, a sudden-change determinator, a switch, and a voltage command value calculator.

The first current receiver receives a first current detection value from a first current sensor provided to a first phase of the AC motor. The second current receiver receives a second current detection value from a second current sensor provided to a second phase of the AC motor. The second phase is different from the first phase. The rotation angle receiver receives a rotation angle detection value from a rotation angle sensor that detects a rotation angle of the AC motor.

The two-phase control current value calculator calculates a two-phase control current value based on the first current detection value, the second current detection value, and the rotation angle detection value. The one-phase control current value calculator calculates a one-phase control current value based on the first current detection value and the rotation angle detection value.

The rotation speed calculator calculates a rotation speed of the AC motor. The fluctuation calculator calculates a rotation speed fluctuation indicative of a fluctuation in the rotation speed. The sudden-change determinator determines whether a sudden change occurs based on the rotation speed fluctuation.

The switch selects the one-phase control current value as a current fixed value when the sudden-change determinator does not determine that the sudden change occurs, and selects the two-phase control current value as the current fixed value when the sudden-change determinator determines that the sudden change occurs. The voltage command value calculator calculates a voltage command value based on the current fixed value and a drive command value related to driving of the AC motor. The voltage command value is related to a voltage applied to the inverter.

In a configuration where two current sensors are separately provided to two phases of a three-phase AC motor, when one-phase control is performed based on a current detection value of one current sensor, an influence of a difference in gain between the current sensors is reduced, and also abnormal conditions of the current sensors can be monitored. However, since the one-phase control uses less actual information, the one-phase control is inferior in responsiveness and stability to two-phase control which is performed based on detection values of two current sensors.

Therefore, according to the aspect of the present disclosure, in normal times where the sudden change does not occurs, the one-phase control current value is selected as the current fixed value to perform one-phase control. Thus, an influence of a difference in gain between the current sensors can be reduced, and also abnormal conditions of the current sensors can be monitored.

In contrast, in abnormal times where the sudden change occurs, the two-phase control current value is selected as the current fixed value to perform two-phase control, so that control responsiveness can be increased. Thus, for example, when the apparatus is used to control an AC motor mounted on a vehicle, and a rotation speed of the AC motor suddenly changes due to road conditions, the two-phase control is selected so that control responsiveness can be increased to respond to a sudden change in the rotation speed. In this way, the apparatus can suitably control the AC motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
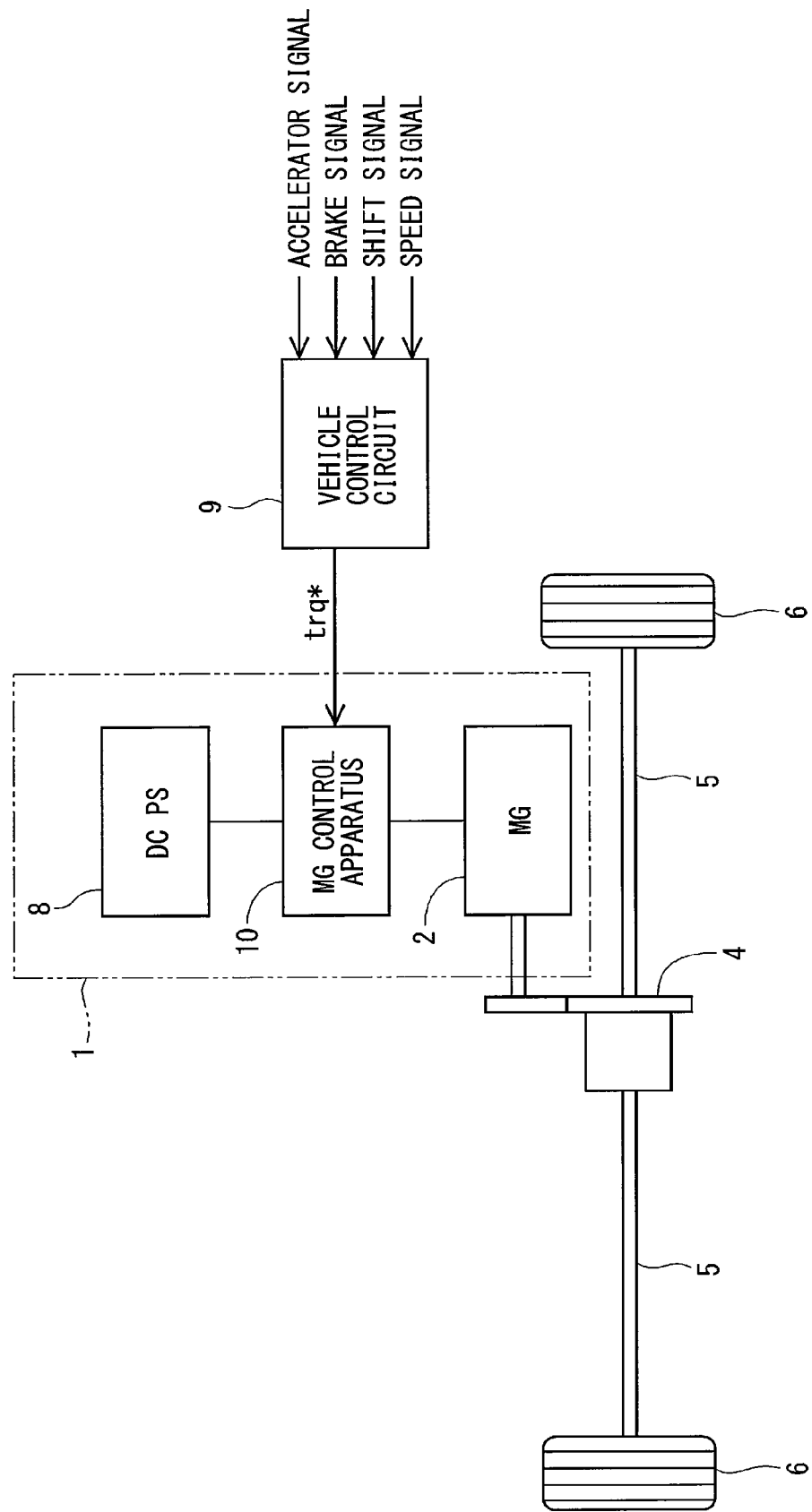
FIG. 1 is a block diagram of an AC motor drive system according to a first embodiment of the present disclosure.

A control apparatus for an AC motor according to the present disclosure is described below with reference to the drawings in which the same reference characters refer to similar parts.

(First Embodiment)

As shown in FIG. 1, a motor control apparatus 10 according to a first embodiment of the present disclosure is applied to a motor drive system 1 for driving a motor-operated vehicle.

The motor drive system 1 includes an AC motor 2, a direct-current (DC) power supply 8, and the motor control apparatus 10. For example, the AC motor 2 can be a so-called motor generator (MG) having not only a motor function of generating torque to drive a drive wheel 6 of the motor-operated vehicle but also a generator function of generating electric power from regeneration energy produced during deceleration of the motor-operated vehicle. According to the first embodiment, the AC motor 2 is a permanent magnet three-phase synchronous motor. The motor-operated vehicle is a vehicle that uses electric power to drive the drive wheel 6. Examples of the motor-operated vehicle can include a hybrid vehicle, an electric vehicle, and a fuel cell vehicle. According to the first embodiment, the motor-operated vehicle is an electric vehicle.

The AC motor 2 is connected to an axle 5 of the motor-operated vehicle through a gear 4 such as a transmission so that output torque of the AC motor can be transmitted to the axle 5 though the gear 4. Thus, the axle 5 is rotated by the output torque, and the drive wheel 6 is driven accordingly.

The DC power supply 8 is a rechargeable power storage device such as an electric double-layer capacitor or a secondary battery such as a lithium-ion battery or a nickel hydride battery. The DC power supply 8 is connected to an inverter 11 (refer to FIG. 2) of the motor control apparatus 10 and exchange power with the AC motor through the inverter 11.

For example, a vehicle control unit 9 is configured as a microcomputer and includes a CPU, a ROM, and an I/O that are connected through buses. The vehicle control unit 9 controls the whole of the motor-operated vehicle by software by executing prestored programs using the CPU or by hardware using a specific electronic circuit.

The vehicle control unit 9 is capable of receiving signals from sensors and switches. For example, the vehicle control unit 9 can receive a brake signal from a brake sensor (not shown), an accelerator signal from an accelerator sensor (not shown), a shift signal from a shift switch (not shown), and a speed signal from a vehicle speed sensor (not shown). The speed signal can be considered to be information associated with the number of rotations of the drive wheel 6.

Further, the vehicle control unit 9 detects operating conditions of the vehicle based on the received signals and outputs a torque command value trq* to the motor control apparatus 10 according to the operating conditions.

Figure 2:
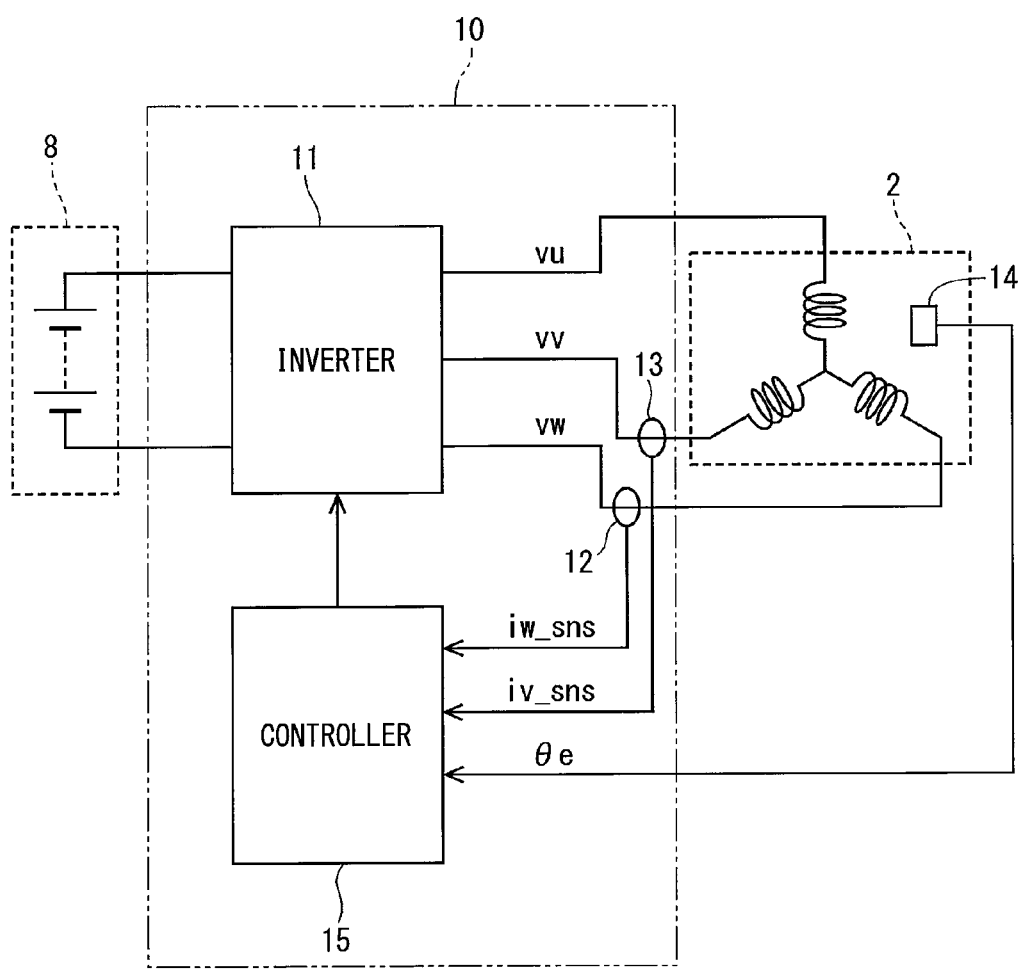
FIG. 2 is a block diagram of a motor control apparatus according to the first embodiment.

As shown in FIG. 2, the motor control apparatus 10 includes an inverter 11 and a controller 15.

An inverter input voltage VH is applied to the inverter 11 according to driving conditions of the AC motor 2 and vehicle requests. The inverter input voltage VH is generated by stepping up a DC voltage from the DC power supply 8 using a step-up converter (not shown). The inverter 11 includes six switching devices (not shown) connected in a bridge configuration. Examples of the switching device include an insulated-gate bipolar transistor (IGBT), a metal oxide semiconductor (MOS) transistor, and a bipolar transistor. The switching devices are controlled (i.e., turned ON and OFF) based on driving signals UU, UL, VU, VL, WU, and WL outputted from a PWM signal generator 25 (refer to FIG. 3) of the controller 15 so that the inverter 11 can control three-phase AC voltages vu, vv, and vw applied to the AC motor 2. The AC motor 2 is controlled (i.e., driven) by the three-phase AC voltages vu, vv, and vw generated and applied by the inverter 11. According to the first embodiment, the AC motor 2 is controlled by a sinusoidal PWM control mode or an overmodulation PWM control mode. In the sinusoidal PWM control mode, control is performed so that a fundamental wave component in a predetermined period (e.g., PWM one cycle) can become a sinusoidal wave. In the overmodulation PWM control mode, a voltage command is distorted to be different from an original sinusoidal waveform so that voltage utilization can be increased.

When the three-phase AC voltages vu, vv, and vw are applied to the AC motor 2, phase currents iu, iv, and iw flows through a U-phase, a V-phase, and a W-phase of the AC motor 2, respectively.

A first current sensor 12 is provided to any one of the three phases of the AC motor 2. According to the first embodiment, the first current sensor 12 is provided to the W-phase. The W-phase corresponds to a first phase recited in claims. The first current sensor 12 is hereinafter sometimes referred to as the "W-phase current sensor 12". The W-phase current sensor 12 detects the W-phase current iw and outputs a W-phase current detection value iw_sns indicative of the detected W-phase current iw to the controller 15.

A second current sensor 13 is provided to one of the three phases of the AC motor 2 other than the W-phase. According to the first embodiment, the second current sensor 13 is provided to the V-phase. The V-phase corresponds to a second phase recited in claims. The second current sensor 13 is hereinafter sometimes referred to as the "V-phase current sensor 13". The V-phase current sensor 13 detects the V-phase current iv and outputs a V-phase current detection value iv_sns indicative of the detected V-phase current iv to the controller 15.

The controller 15 receives the W-phase current detection value iw_sns and the V-phase current detection value iv_sns.

A rotation angle sensor 14 is located near a rotor (not shown) of the AC motor 2. The rotation angle sensor 14 detects an electrical angle θe and outputs the electrical angle θe to the controller 15. The controller 15 receives the electrical angle θe. According to the first embodiment, the rotation angle sensor 14 is a resolver. Alternatively, the rotation angle sensor 14 can be a rotary encoder or the like.

For example, the controller 15 is configured as a microcomputer and includes a CPU, a ROM, and an I/O that are connected through buses. The controller 15 controls operations of the AC motor 2 by software by executing prestored programs using the CPU or by hardware using a specific electronic circuit.

The AC motor 2 is controlled as follows. The motor control apparatus 10 detects a rotation speed Nmg of the AC motor 2 based on the electrical angle θe. Based on the electrical angle θe detected by the rotation angle sensor 14 and the torque command value trq* received from the vehicle control unit 9, the motor control apparatus 10 causes the AC motor 2 to consume power by performing a motoring operation as a motor or to generate power by performing a regeneration operation as a generator. Specifically, the motor control apparatus 10 causes the AC motor 2 to operate in one of the following four operation modes based on a sign (i.e., positive or negative) of the rotation speed Nmg and a sign of the torque command value trq*.

<First mode> forward rotation/forward torque (motoring)
<Second mode> forward rotation/reverse torque (regeneration)
<Third mode> reverse rotation/reverse torque (motoring)
<Fourth mode> reverse rotation/forward torque (regeneration)

The motor control apparatus 10 causes the AC motor 2 to operate in the first mode, when both the rotation speed Nmg and the torque command value trq* are positive. The motor control apparatus 10 causes the AC motor 2 to operate in the second mode, when the rotation speed Nmg is positive, but the torque command value trq* is negative. The motor control apparatus 10 causes the AC motor 2 to operate in the third mode, when both the rotation speed Nmg and the torque command value trq* are negative. The motor control apparatus 10 causes the AC motor 2 to operate in the fourth mode, when the rotation speed Nmg is negative, but the torque command value trq* is positive.

When the rotation speed Nmg is greater than 0 (i.e., forward rotation) and the torque command value trq* is greater than 0 (i.e., the first mode), or when the rotation speed Nmg is less than 0 (i.e., reverse rotation) and the torque command value trq* is less than 0 (i.e., the third mode), the inverter 11 converts DC power supplied from the DC power supply 8 to AC power by switching operations of the switching device and supplies the AC power to the AC motor 2 so that the AC motor 2 can output torque. Thus, the AC motor 2 performs the motoring operation.

In contrast, when the rotation speed Nmg is greater than 0 (i.e., forward rotation) and the torque command value trq* is less than 0 (i.e., the second mode), or when the rotation speed Nmg is less than 0 (i.e., reverse rotation) and the torque command value trq* is greater than 0 (i.e., the fourth mode), the inverter 11 converts AC power generated by the AC motor 2 to DC power by switching operations of the switching devices and supplies the DC power to the DC power supply 8 so that the DC power supply 8 can be charged. Thus, the AC motor 2 performs the regeneration operation.

According to the first embodiment, since the AC motor 2 is connected through the gear 4 to the drive wheel 6, a rotation direction of the AC motor 2 is opposite to a rotation direction of the drive wheel 6. That is, to cause the drive wheel to rotate in a forward direction, there is a need to cause the AC motor 2 to rotate in a reverse direction. Therefore, when the vehicle accelerates during movement in a forward direction, the AC motor 2 operates in the third mode and outputs negative torque. In contrast, when the vehicle decelerates during the movement in the forward direction, the AC motor 2 operates in the fourth mode.

Figure 3:
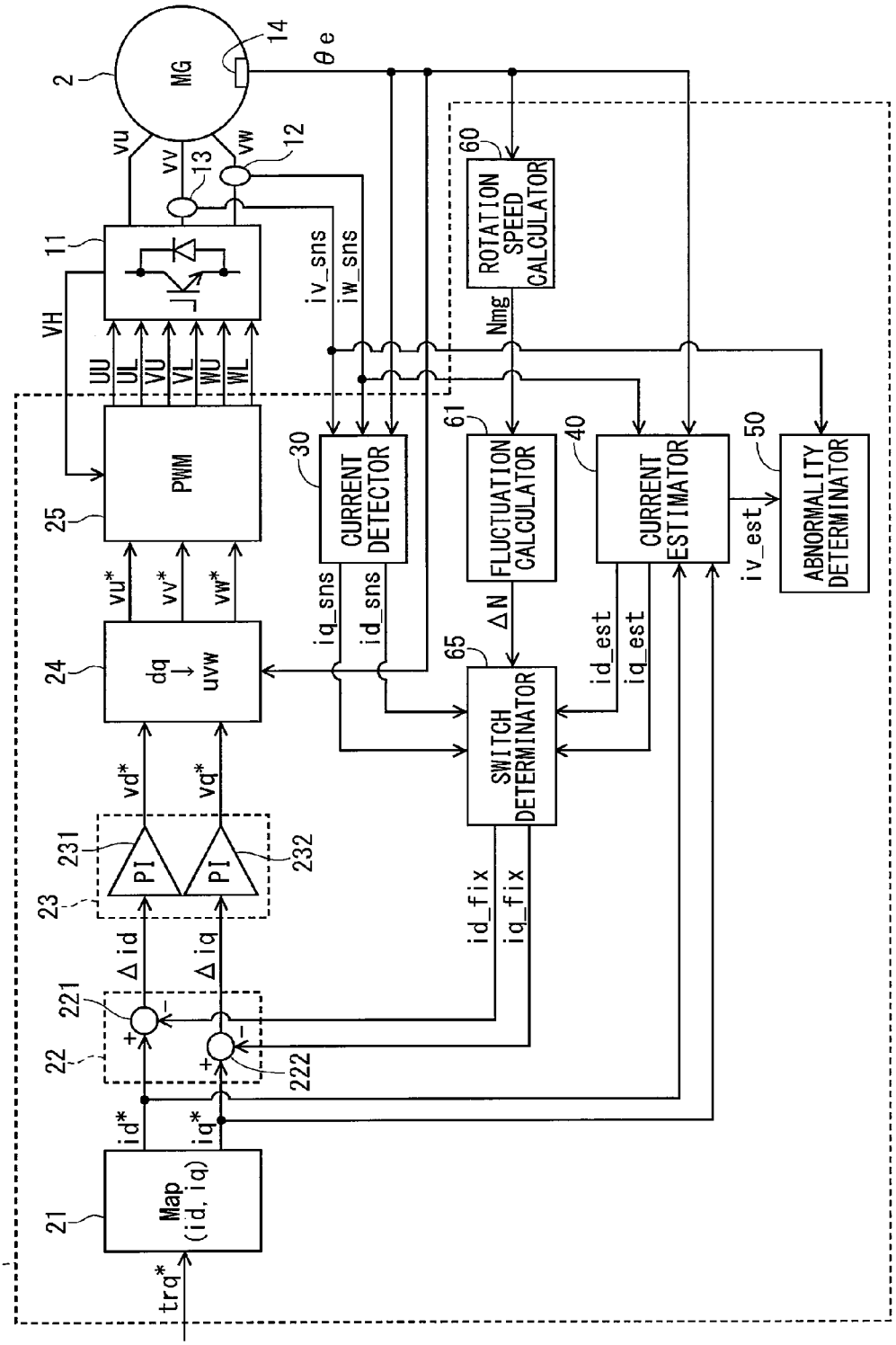
FIG. 3 is a block diagram of a controller according to the first embodiment.

Next, the controller 15 is described in detail with reference to FIG. 3. As shown in FIG. 3, the controller 15 includes a current command calculator 21, a subtractor 22, a PI calculator 23, a three-phase voltage command calculator 24, the PWM signal generator 25, a current detector 30, a current estimator 40, an abnormality determinator 50, a rotation speed calculator 60, a FLUCTUATION calculator 61, and a switch determinator 65.

Based on the torque command value trq* received from the vehicle control unit 9, the current command calculator 21 calculates a d-axis current command value id* and a q-axis current command value iq* in a rotating coordinate system (d-q coordinate system) of the AC motor 2. According to the first embodiment, the d-axis current command value id* and the q-axis current command value iq* are calculated by referring to a prestored map. Alternatively, the d-axis current command value id* and the q-axis current command value iq* can be calculated from a formula or the like.

The subtractor 22 includes a d-axis current subtractor 221 and a q-axis current subtractor 222. The d-axis current subtractor 221 calculates a d-axis current deviation Δid. The d-axis current deviation Δid is a difference between a d-axis current fixed value id_fix, which is fed back from the switch determinator 65, and the d-axis current command value id*. The q-axis current subtractor 222 calculates a q-axis current deviation Δiq. The q-axis current deviation Δiq is a difference between a q-axis current fixed value iq_fix, which is fed back from the switch determinator 65, and the q-axis current command value iq*.

The PI calculator 23 includes a d-axis PI calculator 231 and a q-axis PI calculator 232. The d-axis PI calculator 231 cal- AC motor 2 can output torque corresponding to the torque command value trq*. The three-phase AC voltages vu, vv, and vw correspond to an application voltage recited in claims.

The current detector 30 calculates a d-axis current detection value id_sns and a q-axis current detection value iq_sns as two-phase control current values by dq transformation based on the V-phase current detection value iv_sns, the W-phase current detection value iw_sns, and the electrical angle θe. The following formula (1) represents a general expression for the dq transformation.

$$\begin{bmatrix} \text{id\_sns} \\ \text{iq\_sns} \end{bmatrix} = \sqrt{\frac{2}{3}} \begin{bmatrix} \cos(\theta e - 120°) & \cos(\theta e + 120°) \\ -\sin(\theta e - 120°) & -\sin(\theta e + 120°) \end{bmatrix} \begin{bmatrix} iu \\ iv \\ iw \end{bmatrix} \quad (1)$$

The following formula (2) can be derived from Kirchhoff's law.

$$iu + iv + iw = 0 \quad (2)$$

The formula (2) can be rewritten as follows.

$$iu = -iv - iw \quad (3)$$

The following formula (4) can be derived by assigning the V-phase current detection value iv_sns and the W-phase current detection value iw_sns to the V-phase current iv and the W-phase current iw in the formula (3) respectively and then by substituting the formula (3) into the formula (1), the following formula (4).

$$\begin{bmatrix} \text{id\_sns} \\ \text{iq\_sns} \end{bmatrix} = \sqrt{\frac{2}{3}} \begin{bmatrix} \cos(\theta e - 120°) - \cos(\theta e) & \cos(\theta e + 120°) - \cos(\theta e) \\ -\sin(\theta e - 120°) + \sin(\theta e) & -\sin(\theta e + 120°) + \sin(\theta e) \end{bmatrix} \begin{bmatrix} \text{iv\_sns} \\ \text{iw\_sns} \end{bmatrix} \quad (4)$$

$$= \sqrt{\frac{2}{3}} \times \sqrt{3} \begin{bmatrix} -\cos(\theta e + 30°) & \cos(\theta e + 150°) \\ \sin(\theta e + 30°) & -\sin(\theta e + 150°) \end{bmatrix} \begin{bmatrix} \text{iv\_sns} \\ \text{iw\_sns} \end{bmatrix}$$

$$= \sqrt{2} \begin{bmatrix} -\sin(\theta e + 120°) & \sin(\theta e - 120°) \\ -\cos(\theta e + 120°) & \cos(\theta e - 120°) \end{bmatrix} \begin{bmatrix} \text{iv\_sns} \\ \text{iw\_sns} \end{bmatrix}$$

culates a d-axis voltage command value vd* by PI calculation so that the d-axis current deviation Δid can converge to zero [A], thereby causing the d-axis current fixed value id_fix to follow the d-axis current command value id*. The q-axis PI calculator 232 calculates a q-axis voltage command value vq* by PI calculation so that the q-axis current deviation Δiq can converge to zero [A], thereby causing the q-axis current fixed value iq_fix to follow the q-axis current command value iq*.

The three-phase voltage command calculator 24 performs inverse dq transformation based on the electrical angle θe received from the rotation angle sensor 14 so that the d-axis voltage command value vd* and the q-axis voltage command value vq* can be converted to a U-phase voltage command value vu*, a V-phase voltage command value vv*, and a W-phase voltage command value vw*.

The PWM signal generator 25 calculates the driving signals UU, UL, VU, VL, WU, and WL based on the three-phase voltage command values vu*, vv*, and vw* and the inverter input voltage VH applied to the inverter 11.

The switching devices of the inverter 11 are turned ON and OFF based on the driving signals UU, UL, VU, VL, WU, and WL so that the three-phase AC voltages vu, w, and vw can be generated. The three-phase AC voltages vu, vv, and vw are applied to the AC motor 2 to control the AC motor 2 so that the As shown in the formula (4), the d-axis current detection value id_sns and the q-axis current detection value iq_sns can be calculated from current values of two phases out of the three phases. Therefore, there is no need to calculate a current value of the other phase (i.e., U-phase in the first embodiment).

The d-axis current detection value id_sns and the q-axis current detection value iq_sns calculated by the current detector 30 are outputted to the switch determinator 65.

The current estimator 40 calculates a d-axis current estimation value id_est and a q-axis current estimation value iq_est as one-phase control current values based on the W-phase current detection value iw_sns and the electrical angle θe.

Further, the current estimator 40 calculates a V-phase current estimation value iv_est as a second phase current estimation value based on the W-phase current detection value iw_sns and the electrical angle θe.

According to the first embodiment, to improve current estimation accuracy, the current estimator 40 calculates the d-axis current estimation value id_est, the q-axis current estimation value iq_est, and the V-phase current estimation value iv_est based on the d-axis current command value id* and the q-axis current command value iq* in addition to the W-phase current detection value iw_sns and the electrical angle θe.

According to the first embodiment, the W-phase current sensor 12 is provided to the W-phase, and the V-phase current sensor 13 is provided to the V-phase. The W-phase as the first phase is hereinafter referred to as a sensor phase, and the W-phase current detection value iw_sns detected by the W-phase current sensor 12 is used to calculate the d-axis current estimation value id_est, the q-axis current estimation value iq_est, and the V-phase current estimation value iv_est. Alternatively, the d-axis current estimation value id_est and the q-axis current estimation value iq_est can be calculated based on the V-phase current detection value iv_sns. Alternatively, the current estimator 40 can calculate both the current estimation value based on the V-phase current detection value iv_sns and the current estimation value based on the W-phase current detection value iw_sns in parallel so that one-phase control can be performed based on either of the current estimation values.

Next, a current estimation method performed by the current estimator 40 is described below with reference to FIG. 4.

Figure 4:
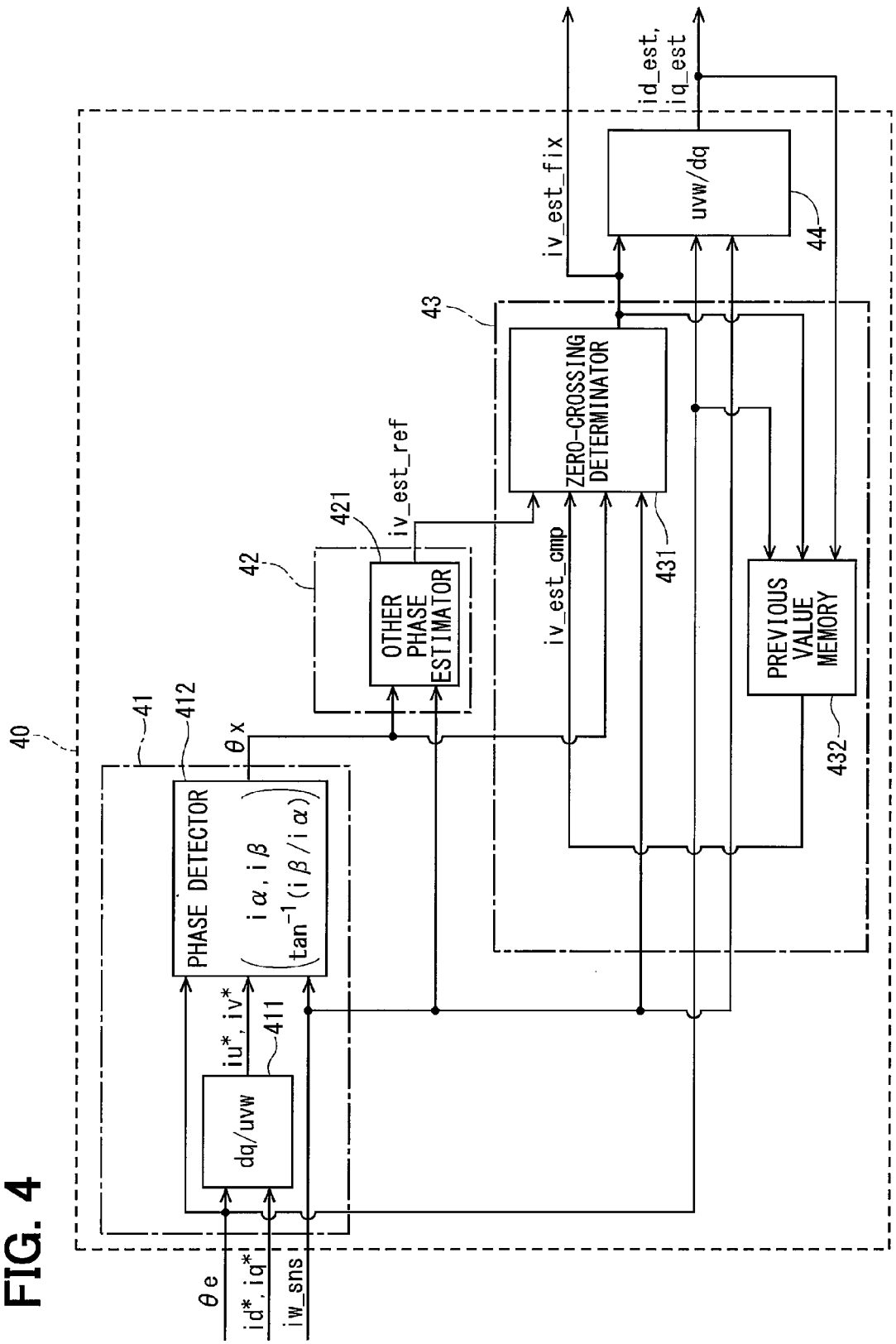
FIG. 4 is a block diagram of a current estimator according to the first embodiment.

As shown in FIG. 4, the current estimator 40 includes a sensor-phase reference current phase detector 41, a fundamental wave estimator 42, a zero-crossing interpolator 43, and a dq transformer 44.

The sensor-phase reference current phase detector 41 includes an inverse dq transformer 411 and a phase detector 412.

The inverse dq transformer 411 receives the d-axis current command value id* and the q-axis current command value iq* calculated by the current command calculator 21 and the electrical angle θe and calculates a U-phase current command value iu* and a V-phase current command value iv* by inverse dq transformation. Alternatively, the inverse dq transformer 411 can calculate one of the U-phase current command value iu* and the V-phase current command value iv* without going into detail.

The phase detector 412 calculates a sensor-phase reference current phase ex based on the W-phase current detection value iw_sns and at least one of the U-phase current command value iu* and the V-phase current command value iv* calculated by the inverse dq transformer 411.

Figure 5:
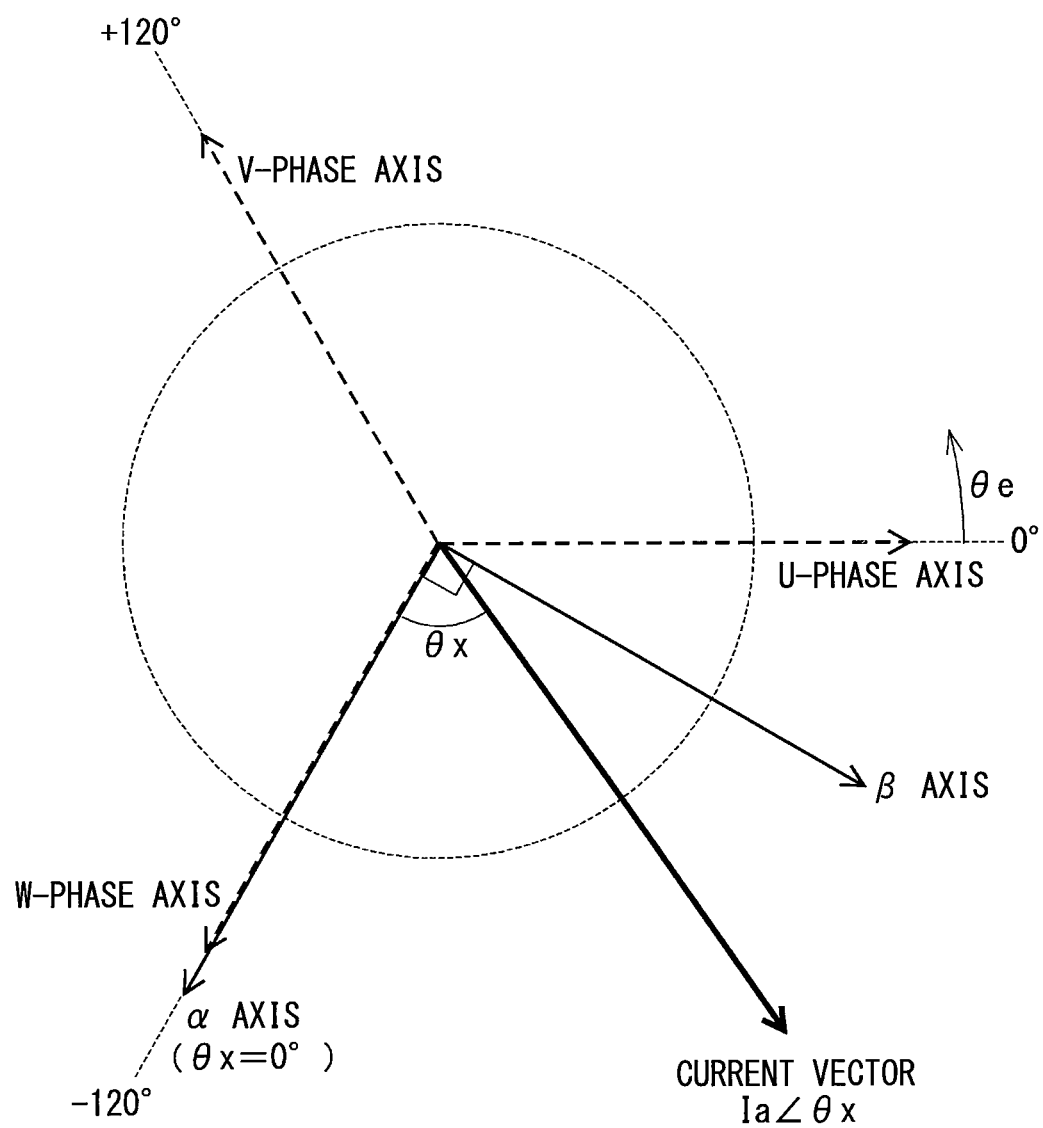
FIG. 5 is a diagram for explaining a α-axis and a β-axis according to the first embodiment.

As shown in FIG. 5, when a α-β coordinate system is defined by a α-axis coinciding with the W-phase as the sensor phase and a β-axis orthogonal to the α-axis, the sensor-phase reference current phase θx is an angle between the α-axis and a current vector Ia∠θx in the α-β coordinate system. In the first mode, the sensor-phase reference current phase θx is 0[°] at a negative zero-crossing point where a waveform of the W-phase current detection value iw_sns changes from negative to positive, and the sensor-phase reference current phase θx is 180[°] at a positive zero-crossing point where the waveform of the W-phase current detection value iw_sns changes from positive to negative. That is, the sensor-phase reference current phase θx changes synchronously with the W-phase current detection value iw_sns.

According to the first embodiment, the phase detector 412 calculates the sensor-phase reference current phase θx based on a α-axis current iα and a β-axis current iβ.

The α-axis current iα and the β-axis current iβ, which are used to calculate the sensor-phase reference current phase θx, are explained below. The α-axis current iα and the β-axis current iβ can be respectively represented by the following formulas (5) and (6) using the phase currents iu, iv, and iw. It is noted that Kt in the formulas (5) and (6) is a transformation coefficient.

$$i\alpha = Kt \times \left(iw - \frac{1}{2} \times iu - \frac{1}{2} \times iv\right) \quad (5)$$

$$i\beta = Kt \times \left(\frac{\sqrt{3}}{2} \times iu - \frac{\sqrt{3}}{2} \times iv\right) \quad (6)$$

The formula (5) can be rewritten as the following formula (7) by using the Kirchhoffs law (i.e., the formula (2)).

$$i\alpha = Kt \times \frac{3}{2} \times iw \quad (7)$$

As can be understood from the formula (7), the α-axis current iα can be calculated based on the W-phase current iw. When the W-phase current detection value iw_sns is used as the W-phase current iw, a α-axis current detection value iα_sns can be represented by the following formula (8).

$$i\alpha\_sns = Kt \times \frac{3}{2} \times iw\_sns \quad (8)$$

From the formula (6), when the U-phase current command value iu* and the V-phase current command value iv* are respectively used as the U-phase current iu and the V-phase current iv, a β-axis current estimation value iβ_est can be represented by the following formula (9).

$$i\beta\_est = Kt \times \left(\frac{\sqrt{3}}{2} \times iu^* - \frac{\sqrt{3}}{2} iv^*\right) \quad (9)$$

In the formula (9), the β-axis current estimation value iβ_est is calculated from the U-phase current command value iu* and the V-phase current command value iv* and does not have a component of the W-phase current detection value iw_sns. Therefore, the β-axis current estimation value iβ_est can be calculated by using the following formula (10) instead of the formula (9) so that the β-axis current estimation value iβ_est can accurately reflect an actual current. The formula (10) is given by rewriting the formula (9) using the Kirchhoff's law (i.e., the formula (2)).

$$i\beta\_est = Kt \times \left(-\sqrt{3} \times iv^* - \frac{\sqrt{3}}{2} iw\_sns\right) \quad (10)$$

When the β-axis current estimation value iβ_est is calculated by using the following formula (10), the β-axis current estimation value iβ_est has a component of the W-phase current detection value iw_sns which is an actual current. Therefore, a responsiveness to control fluctuations is improved so that a region where a W-phase axis component is less likely to converge to a small value can be reduced. Accordingly, accuracy of the β-axis current estimation value iβ_est can be improved. Thus, detection accuracy of the sensor-phase reference current phase θx, which is calculated based on the β-axis current estimation value iβ_est, can be improved.

The sensor-phase reference current phase θx can be calculated by the following formula (11) based on the α-axis current detection value iα_sns calculated from the formula (8)

and the α-axis current estimation value iβ_est calculated from the formula (10). Alternatively, the α-axis current estimation value iβ_est can be calculated from the formula (9) instead of the formula (10).

$$\theta x = \tan^{-1}\left(\frac{i\beta\_est}{i\alpha\_sns}\right) \qquad (11)$$

When the sensor-phase reference current phase θx is calculated from an arctangent function ($\tan^{-1}$) as shown in the formula (11), the sensor-phase reference current phase θx may not change synchronously with the W-phase as the sensor-phase, depending on the definitions of the α-axis current iα and the β-axis current iβ. This is caused by the definitions of the axes (e.g., interchange between the α-axis and the β-axis, sign inversion, or the like). Therefore, the sensor-phase reference current phase θx can be calculated by changing the signs of the α-axis current iα and the β-axis current iβ, by interchanging the α-axis current iα and the α-axis current iβ, or by adding a phase difference of 90[°] due to the orthogonal relationship to the sensor-phase reference current phase θx, so that in the first mode, the sensor-phase reference current phase θx can be 0[°] at the negative zero-crossing point where the waveform of the W-phase current detection value iw_sns changes from negative to positive and can be 180[°] at the positive zero-crossing point where the waveform of the W-phase current detection value iw_sns changes from positive to negative, i.e., so that the sensor-phase reference current phase ex can change synchronously with the W-phase current detection value iw_sns.

The sensor-phase reference current phase θx, which is calculated by the phase detector 412 based on the α-axis current detection value iα_sns and the α-axis current estimation value iβ_est as described above, is outputted to the fundamental wave estimator 42.

The fundamental wave estimator 42 includes an other phase estimator 421. The other phase estimator 421 calculates an other phase current estimation value based on the sensor-phase reference current phase ex calculated by the phase detector 412 and the W-phase current detection value iw_sns. According to the first embodiment, the other phase estimator 421 calculates the V-phase current estimation value iv_est as the other phase current estimation value.

Since there is a phase difference of 120[°] between the phases, the W-phase current detection value iw_sns and the V-phase current estimation value iv_est can be respectively represented by the following formulas (12) and (13) using the sensor-phase reference current phase θx. It is noted that Ia in the formulas (12) and (13) represents a current amplitude.

$$iw\_sns = Ia \times \sin(\theta x) \qquad (12)$$

$$iv\_est = Ia \times \sin(\theta x + 120°) \qquad (13)$$

By rewriting the formula (13) according to the addition theorem, the V-phase current estimation value iv_est can be represented by the following formula (14) using the sensor-phase reference current phase θx and the W-phase current detection value iw_sns.

$$iv\_est = Ia \times \sin(\theta x + 120°) \qquad (14)$$

$$= -\frac{1}{2} \times Ia \times \sin(\theta x) + \frac{\sqrt{3}}{2} \times Ia \times \cos(\theta x)$$

-continued
$$= -\frac{1}{2} \times iw\_sns + \frac{\sqrt{3}}{2} \times \frac{Ia \times \sin(\theta x)}{\tan(\theta x)}$$

$$= \left\{-\frac{1}{2} + \frac{\sqrt{3}}{2} \times \frac{1}{\tan(\theta x)}\right\} \times iw\_sns$$

When an estimation coefficient iv_kp is defined as shown in the following formula (15), the V-phase current estimation value iv_est can be represented by the following formula (16).

$$iv\_kp = -\frac{1}{2} + \frac{\sqrt{3}}{2} \times \frac{1}{\tan(\theta x)} \qquad (15)$$

$$iv\_est = iv\_kp \times iw\_sns \qquad (16)$$

The estimation coefficient iv_kp can be calculated directly from the formula (15). Alternatively, the estimation coefficient iv_kp can be calculated by referring to a map which is created in advance from a part or the whole of the formula (15) based on the sensor-phase reference current phase θx.

Assuming that the controller 15 is a typical electronic control circuit (e.g., microcomputer), when calculation formulas are implemented in the controller 15, processing is performed in discrete time, not continuous time. Therefore, the detection values of the sensors and the calculated values are treated as discrete values based on a specified resolution (LSB). The calculation formulas can be implemented in the controller 15 by software programs or hardware circuits. To reduce multiplication and division calculations requiring large processing loads, it is preferable that a map defining a relationship between the sensor-phase reference current phase θx.and the estimation coefficient iv_kp or the term "1/tan(θx)" in the estimation coefficient iv_kp should be pre-stored. Since the use of such a map can allow discrete system to be easily applied to the controller 15 and also reduce processing load of the controller 15, there is no need to use an expensive, high-performance microcomputer as the controller 15.

As can be understood from the formula (14) or (16), the V-phase current estimation value iv_est can be calculated based on the sensor-phase reference current phase ex and the W-phase current detection value iw_sns without using the current amplitude Ia. Since there is no need to calculate the current amplitude Ia, the number of variables to be calculated can be reduced.

The V-phase current estimation value iv_est, which is calculated by the other phase estimator 421 based on the sensor-phase reference current phase ex and the W-phase current detection value iw_sns, is outputted as a V-phase current estimation reference value iv_est_ref to the zero-crossing interpolator 43.

When the W-phase current detection value iw_sns becomes 0[A] or the tan(θx), which is the tangent of the sensor-phase reference current phase θx, becomes infinity, multiplication by zero occurs in the formula (14). Further, when the tan(θx) becomes zero, division by zero occurs in the formula (14). In these cases, the V-phase current estimation value iv_est may become an inappropriate value.

Therefore, according to the first embodiment, the zero-crossing interpolator 43 masks the division by zero and the multiplication by zero by interpolating the V-phase current estimation reference value iv_est_ref. The zero-crossing interpolator 43 includes a zero-crossing determinator 431 and a previous value memory 432.

The zero-crossing determinator 431 determines whether a zero-crossing condition is satisfied. According to the first embodiment, the W-phase current detection value iw_sns is within a predetermined range including 0[A], the zero-crossing determinator 431 determines that the zero-crossing condition is satisfied. Specifically, the W-phase current detection value iw_sns can be within the predetermined range, when an absolute value of the W-phase current detection value iw_sns is equal to or less than a predetermined value, or when an absolute value of the estimation coefficient iv_kp is equal to or greater than the predetermined value. For example, the predetermined value can be a current value such as ±5[A], can be set based on resolution such as 5[LSB] in discrete system, or can be set by a formula or the like. Alternatively, when the sensor-phase reference current phase θx is within a predetermined zero-crossing range, the zero-crossing determinator 431 can determine that the zero-crossing condition is satisfied.

When the zero-crossing determinator 431 does not determine that the zero-crossing condition is satisfied, the zero-crossing determinator 431 outputs the V-phase current estimation reference value iv_est_ref, which is calculated by the other phase estimator 421, as a V-phase current estimation fixed value iv_est_fix to the dq transformer 44 and the abnormality determinator 50 without interpolation. The V-phase current estimation fixed value iv_est_fix outputted to the dq transformer 44, as d-axis current estimation held values id_est_hld and also stores a predetermined number of the last q-axis current estimation values iq_est, which are previously calculated by the dq transformer 44, as q-axis current estimation held values iq_est_hld. Then, when the zero-crossing determinator 431 determines that the zero-crossing condition is satisfied, the previous value memory 432 outputs a V-phase component, which is calculated by inverse dq transformation of one of the stored d-axis current estimation held values id_est_hld and one of the stored q-axis current estimation held values iq_est_hld, as the V-phase current estimation interpolation value iv_est_cmp to the zero-crossing determinator 431.

The dq transformer 44 calculates the d-axis current estimation value id_est and the q-axis current estimation value iq_est by dq transformation based on the electrical angle θe, the W-phase current detection value iw_sns, and the V-phase current estimation value iv_est outputted from the zero-crossing interpolator 43. The following formula (17) is used to calculate the d-axis current estimation value id_est and the q-axis current estimation value iq_est. The d-axis current estimation value id_est and the q-axis current estimation value iq_est calculated by the dq transformer 44 are outputted to the switch determinator 65.

$$\begin{bmatrix} \text{id\_est} \\ \text{iq\_sns} \end{bmatrix} = \sqrt{\frac{2}{3}} \begin{bmatrix} \cos(\theta e - 120°) - \cos(\theta e) & \cos(\theta e + 120°) - \cos(\theta e) \\ -\sin(\theta e - 120°) + \sin(\theta e) & -\sin(\theta e + 120°) + \sin(\theta e) \end{bmatrix} \begin{bmatrix} \text{iv\_est} \\ \text{iw\_sns} \end{bmatrix} \quad (17)$$

$$= \sqrt{\frac{2}{3}} \times \sqrt{3} \begin{bmatrix} -\cos(\theta e + 30°) & \cos(\theta e + 150°) \\ \sin(\theta e + 30°) & -\sin(\theta e + 150°) \end{bmatrix} \begin{bmatrix} \text{iv\_est} \\ \text{iw\_sns} \end{bmatrix}$$

$$= \sqrt{2} \begin{bmatrix} -\sin(\theta e + 120°) & \sin(\theta e - 120°) \\ -\cos(\theta e + 120°) & \cos(\theta e - 120°) \end{bmatrix} \begin{bmatrix} \text{iv\_est} \\ \text{iw\_sns} \end{bmatrix}$$

transformer 44 and the abnormality determinator 50 is hereinafter simply referred to as the "V-phase current estimation value iv_est".

In contrast, when the zero-crossing determinator 431 determines that the zero-crossing condition is satisfied, the zero-crossing determinator 431 receives a V-phase current estimation interpolation value iv_est_cmp from the previous value memory 432 and outputs the V-phase current estimation interpolation value iv_est_cmp as the V-phase current estimation fixed value iv_est_fix to the dq transformer 44 and the abnormality determinator 50.

The previous value memory 432 stores a previous value in advance. When the zero-crossing determinator 431 determines that the zero-crossing condition is satisfied, the previous value memory 432 calculates and outputs the V-phase current estimation interpolation value iv_est_cmp to the zero-crossing determinator 431.

For example, the previous value memory 432 stores a predetermined number of the last V-phase current estimation fixed values iv_est_fix calculated previously as V-phase current estimation held values iv_est_hld. Then, when the zero-crossing determinator 431 determines that the zero-crossing condition is satisfied, the previous value memory 432 outputs one of the stored V-phase current estimation held values iv_est_hld as the V-phase current estimation interpolation value iv_est_cmp to the zero-crossing determinator 431.

Alternatively, for example, the previous value memory 432 stores a predetermined number of the last d-axis current estimation values id_est, which are previously calculated by the Returning to FIG. 3, the abnormality determinator 50 determines whether an abnormal condition occurs in at least one of the W-phase current sensor 12 and the V-phase current sensor 13 by comparing the V-phase current estimation value iv_est calculated by the current estimator 40 with the V-phase current detection value iv_sns. According to the first embodiment, when a difference between the V-phase current estimation value iv_est and the V-phase current detection value iv_sns is greater than a predetermined abnormality determination threshold Ae, the abnormality determinator 50 determines that the abnormal condition occurs in at least one of the W-phase current sensor 12 and the V-phase current sensor 13.

The rotation speed calculator 60 calculates a rotation speed Nmg of a rotor of the AC motor 2 based on the electrical angle θe. The rotation speed Nmg of the rotor of the AC motor 2 is hereinafter referred to simply as the "rotation speed Nmg of the AC motor 2".

The fluctuation calculator 61 calculates a rotation speed fluctuation ΔN based on the rotation speed Nmg of the AC motor 2 calculated by the rotation speed calculator 60. According to the first embodiment, the rotation speed fluctuation ΔN is a moving average over every 20 msec, for example. The rotation speed fluctuation ΔN is not limited to the moving average but includes a difference between previous and present values and a difference between maximum and minimum values over a predetermined period. That is, the rotation speed fluctuation ΔN can be any value as long as it is possible to determine whether the rotation speed Nmg suddenly changes based on the rotation speed fluctuation ΔN.

The switch determinator 65 determines whether the rotation speed Nmg of the AC motor 2 suddenly changes based on the rotation speed fluctuation ΔN calculated by the fluctuation calculator 61. The switch determinator 65 changes a current to be fed back to the subtractor 22 based on a result of the determination made by the switch determinator 65. According to the first embodiment, when the rotation speed fluctuation ΔN is greater than a predetermined sudden change determination threshold An, the switch determinator 65 determines that the rotation speed Nmg suddenly changes. When the switch determinator 65 does not determine that the rotation speed Nmg suddenly changes, the d-axis current estimation value id_est calculated by the current estimator 40 is set as the d-axis current fixed value id_fix to be fed back, and the q-axis current estimation value iq_est calculated by the current estimator 40 is set as the q-axis current fixed value iq_fix to be fed back, so that a one-phase control mode can be set. In contrast, when the switch determinator 65 determines that the rotation speed Nmg suddenly changes, the d-axis current detection value id_sns calculated by the current detector 30 is set as the d-axis current fixed value id_fix to be fed back, and the q-axis current detection value iq_sns calculated by the current detector 30 is set as the q-axis current fixed value iq_fix to be fed back, so that a two-phase control mode can be set.

Figure 30:
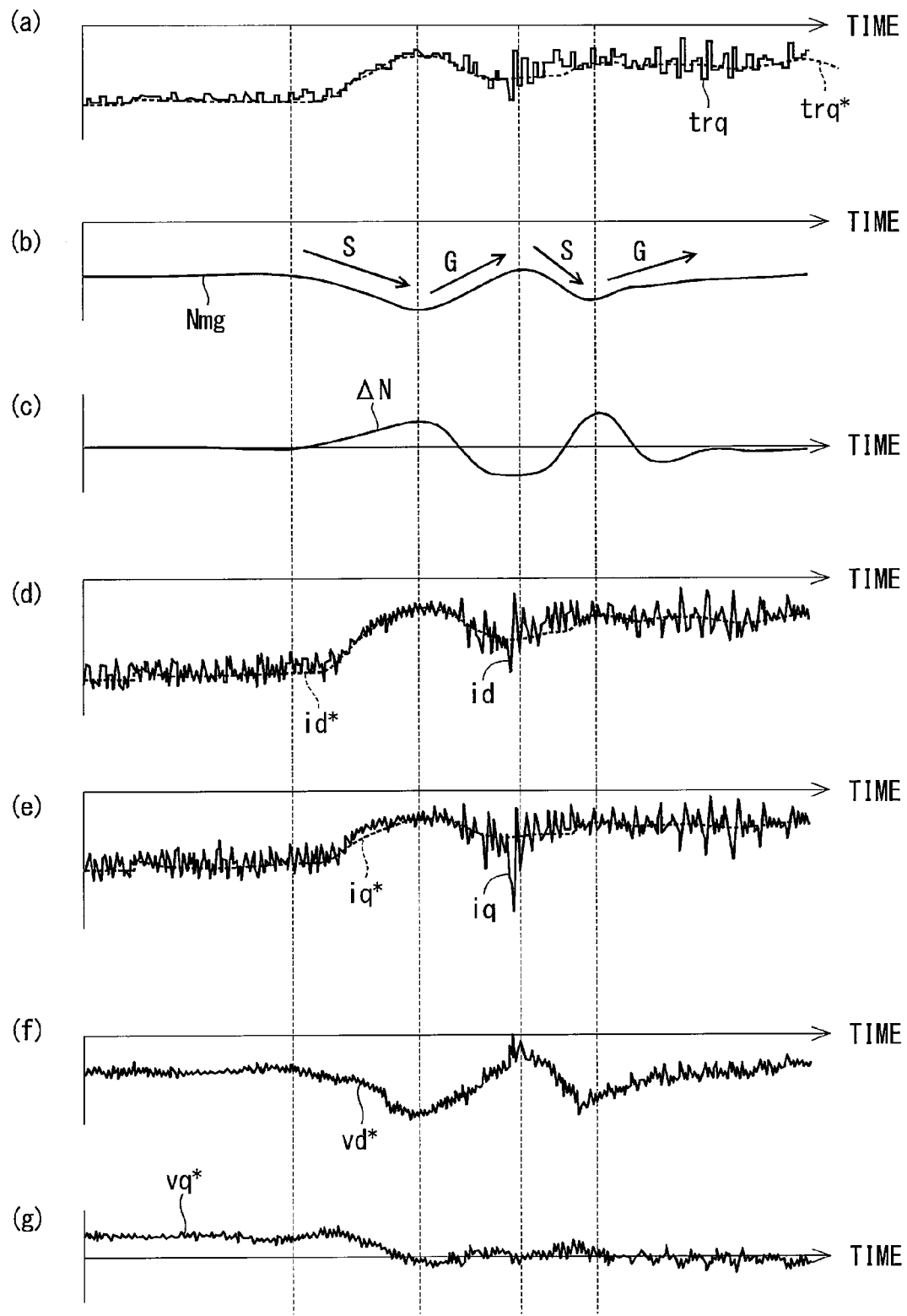
FIG. 30 is a diagram for explaining a behavior of an AC motor observed when a drive wheel of a vehicle equipped with the AC motor slips and grips.

The sudden change in the rotation speed Nmg of the AC motor 2 is described below with reference to FIG. 30. In FIG. 30, (a) indicates torque, (b) indicates the rotation speed Nmg of the AC motor 2, (c) indicates the rotation speed fluctuation ΔN, (d) indicates the d-axis current, (e) indicates the q-axis current, (f) indicates the d-axis voltage command value vd*, and (g) indicates the q-axis voltage command value vq*. In (a) of FIG. 30, a broken line indicates the torque command value trq*, and a solid line indicates actual torque trq. In (d) of FIG. 30, a broken line indicates the d-axis current command value id*, and a solid line indicates a d-axis current accrual value id. In (e) of FIG. 30, a broken line indicates the q-axis current command value id*, and a solid line indicates a q-axis current actual value iq.

It is noted that FIG. 30 shows a case where the AC motor 2 is controlled in the one-phase control mode.

As mentioned previously, the AC motor 2 and the drive wheel 6 are connected through the gear 4 (refer to FIG. 1). Therefore, when the vehicle moves forward, i.e., when the drive wheel 6 rotates in a forward direction, the AC motor 2 rotates in a reverse direction. That is, as a graph shown in (b) of FIG. 30 decreases, as the rotation speed Nmg increases in a reverse direction.

Further, when the vehicle moves forward, i.e., when the drive wheel 6 rotates in a forward direction, the AC motor 2 outputs negative torque. Therefore, as shown in (a) and (e) of FIG. 30, when the vehicle moves forward, each of the torque and the q-axis current becomes negative. As shown in (d) of FIG. 30, the d-axis current is always negative regardless of the torque and the rotation speed Nmg.

For example, assuming that the vehicle runs on a road with an uneven surface, when the vehicle runs over the uneven surface, the drive wheel 6 is temporarily separated from the road and slips (i.e., spins). As a result, a rotation speed Nw of the drive wheel 6 suddenly increases in a forward direction. Then, when the drive wheel 6 grips (i.e., contacts) the road, the rotation speed Nw of the drive wheel 6 suddenly decreases. It is noted that the rotation speed Nw of the drive wheel 6 can be considered to be the rotation speed Nmg of the AC motor 2 when a gear ratio is taken into account. Therefore, the rotation speed Nw of the drive wheel 6 is hereinafter referred to as the "rotation speed Nmg of the AC motor 2".

When the rotation speed Nmg suddenly increases due to the slip of the drive wheel 6, control is made to reduce the torque. Therefore, an absolute value of the torque command value trq* indicated by the broken line suddenly decreases. In contrast, when the rotation speed Nmg suddenly decreases due to the grip of the drive wheel 6, control is made to increase the torque. Therefore, the absolute value of the torque command value trq* suddenly increases. Thus, as shown in (a) of FIG. 30, the torque command value trq* suddenly changes when the drive wheel 6 slips and grips.

Further, since the AC motor 2 and the drive wheel 6 are connected through the gear 4, when the drive wheel 6 slips, the rotation speed Nmg of the AC motor 2 suddenly increases in a reverse direction as indicated by an arrow S in (b) of FIG. 30. In contrast, when the drive wheel 6 grips the road, the rotation speed Nmg of the AC motor 2 suddenly decreases as indicated by an arrow G in (b) of FIG. 30.

As shown in (c) of FIG. 30, when the rotation speed Nmg of the AC motor 2 suddenly changes, the rotation speed fluctuation ΔN suddenly changes accordingly.

As indicated by the broken line in (d) of FIG. 30, when the torque command value trq* shown in (a) of FIG. 30 suddenly changes due to the slip and grip, the d-axis current command value id*, which is calculated based on the torque command value trq*, suddenly changes. Likewise, as indicated by the broken line in (e) of FIG. 30, the q-axis current command value iq*, which is calculated based on the torque command value trq*, suddenly changes. When the d-axis current command value id* and the q-axis current command value iq* suddenly change, control cannot fully respond to the changes. Therefore, as indicated by the solid lines in (d) and (e) of FIG. 30, a difference between the d-axis current command value id* and the d-axis current actual value id is increased, and a difference between the q-axis current command value iq* and the q-axis current actual value iq is increased. When the d-axis current command value id* differs from the d-axis current actual value id, and the q-axis current command value iq* from the q-axis current actual value iq, the torque command value trq* becomes different from the torque actual value trq as shown in (a) of FIG. 30.

Further, even after the slip and the grip become stable, the d-axis current actual value id may not converge to the d-axis current command value id*, and the q-axis current actual value iq may not converge to the q-axis current command value iq*. As a result, control may become unstable.

Further, the d-axis voltage command value vd* is calculated based on the d-axis current command value id* and the feedback d-axis current estimation value id_est, and the q-axis voltage command value vq* is calculated based on the q-axis current command value iq* and the feedback q-axis current estimation value iq_est. Therefore, when the d-axis current command value id* and the q-axis current command value iq* suddenly change, the d-axis voltage command value vd* and the q-axis voltage command value vq* suddenly change accordingly as shown in (f) and (g) of FIG. 30.

As described above, for example, when the vehicle runs on an uneven surface or an iced surface of a road, the drive wheel 6 slips and grips, and the rotation speed Nmg of the AC motor 2 suddenly changes. In such a case, since parameters suddenly change accordingly, higher control responsiveness to the changes is required.

Figure 6:
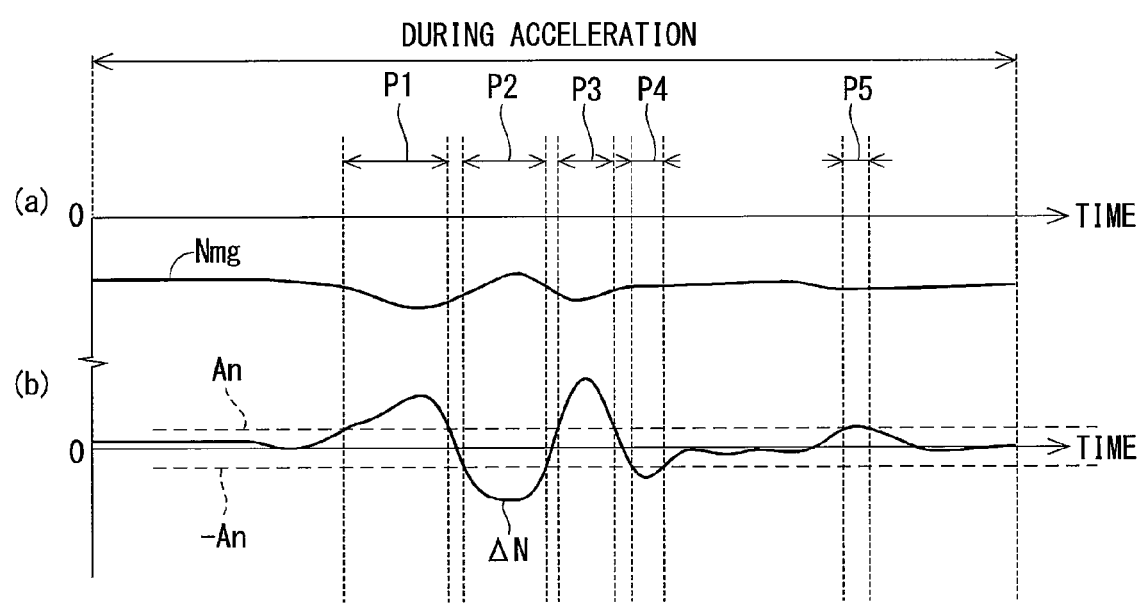
FIG. 6 is a diagram explaining a sudden change determination according to the first embodiment.

Therefore, according to the first embodiment, as shown in FIG. 6, in normal times where no sudden change occurs, one-phase control having relatively high responsiveness is performed to reduce an influence of a difference in gain between the current sensors 12 and 13 and to detect abnormal conditions of the current sensors 12 and 13. In contrast, in abnormal times where a sudden change occurs, i.e., during periods P1-P5 where an absolute value of the rotation speed fluctuation ΔN is greater than the sudden change determination threshold An, two-phase control is performed to increase control responsiveness. Although FIG. 6 shows a case when the vehicle is accelerated, the same is true for when the vehicle runs normally or is decelerated.

According to the first embodiment, the "sudden change" means that the rotation speed Nmg of the AC motor 2 changes so suddenly that the one-phase control cannot respond to the change. That is, when the "sudden change" occurs, higher responsiveness than in normal times is required. Whether or not the sudden change occurs varies depending on various factors including current estimation accuracy in the one-phase control, a calculation speed of the controller 15, and responsiveness of the AC motor 2. Therefore, the thresholds used to determine whether the sudden change occurs can be set according to the factors including the current estimation accuracy in the one-phase control, the calculation speed of the controller 15, and the responsiveness of the AC motor 2.

Next, a drive control process according to the first embodiment is described with reference to a flowchart shown in FIG. 7. For example, while the motor drive system 1 remains powered on, the controller 15 repeatedly performs the drive control process at a predetermined time interval.

Firstly, at S101, the controller 15 receives the electrical angle θe from the rotation angle sensor 14.

At S102, the controller 15 receives the W-phase current detection value iw_sns from the W-phase current sensor 12 and the V-phase current detection value iv_sns from the V-phase current sensor 13.

At S103, the current detector 30 calculates the d-axis current detection value id_sns and the q-axis current detection value iq_sns by dq transformation based on the V-phase current detection value iv_sns, the W-phase current detection value iw_sns, and the electrical angle θe.

At S104, the current estimator 40 calculates the d-axis current estimation value id_est, the q-axis current estimation value iq_est, and the V-phase current estimation value iv_est based on the W-phase current detection value iw_sns and the electrical angle θe. According to the first embodiment, the current estimator 40 calculates the d-axis current estimation value id_est, the q-axis current estimation value iq_est, and the V-phase current estimation value iv_est based on the d-axis current command value id* and the q-axis current command value iq* in addition to the W-phase current detection value iw_sns and the electrical angle θe.

At S105, the rotation speed calculator 60 calculates the rotation speed Nmg of the AC motor 2 based on the electrical angle θe, which was received at S101.

At S106, the fluctuation calculator 61 calculates the rotation speed fluctuation ΔN based on the rotation speed Nmg.

At S107, the switch determinator 65 determines whether the sudden change occurs in the rotation speed Nmg. According to the first embodiment, when an absolute value of the rotation speed fluctuation ΔN is greater than the sudden change determination threshold An, the switch determinator 65 determines that the sudden change occurs in the rotation speed Nmg. When the switch determinator 65 determines that the sudden change occurs in the rotation speed Nrng (YES at S107), i.e., when the absolute value of the rotation speed fluctuation ΔN is greater than the sudden change determination threshold An, the drive control process proceeds to S111. A procedure performed at S111, which is performed when an affirmative determination was made at S107, corresponds to the two-phase control mode. In contrast, when the switch determinator 65 does not determine that the sudden change occurs in the rotation speed Nmg (NO at S107), i.e., when the absolute value of the rotation speed fluctuation ΔN is not greater than the sudden change determination threshold An, the drive control process proceeds to S108. Procedures performed at S108, S109, and 110, which are performed when a negative determination was made at S107, correspond to the one-phase control mode. It is noted that the procedures performed at S109 and S110 can be considered to correspond to an abnormality detection mode.

At S108, the switch determinator 65 selects the d-axis current estimation value id_est and the q-axis current estimation value iq_est calculated by the current estimator 40 as the d-axis current fixed value id_fix and the q-axis current fixed value iq_fix to be fed back to the subtractor 22.

At S109, the abnormality determinator 50 determines whether the abnormal condition occurs in at least one of the W-phase current sensor 12 and the V-phase current sensor 13. According to the first embodiment, when the difference between the V-phase current estimation value iv_est calculated by the current estimator 40 and the V-phase current detection value iv_sns detected by the V-phase current sensor 13 is greater than the predetermined abnormality determination threshold Ae, the abnormality determinator 50 determines that the abnormal condition occurs in at least one of the W-phase current sensor 12 and the V-phase current sensor 13. When the abnormality determinator 50 determines that the abnormal condition occurs neither in the W-phase current sensor 12 nor in the V-phase current sensor 13 (NO at S109), i.e., when the difference between the V-phase current estimation value iv_est and the V-phase current detection value iv_sns is not greater than the predetermined abnormality determination threshold Ae, the control process proceeds to S112. In contrast, when the abnormality determinator 50 determines that the abnormal condition occurs in at least one of the W-phase current sensor 12 and the V-phase current sensor 13 (YES at S109), i.e., when the difference between the V-phase current estimation value iv_est and the V-phase current detection value iv_sns is greater than the predetermined abnormality determination threshold Ae, the control process proceeds to S110 after setting a current sensor abnormal flag.

At S110, abnormal information, indicating that the abnormal condition occurs in at least one of the W-phase current sensor 12 and the V-phase current sensor 13, is sent to the vehicle control unit 9 so that the motor control apparatus 10 can stop driving the AC motor 2.

At S111, to which the drive control process proceeds when the switch determinator 65 determines that the rotation speed Nmg suddenly changes (YES at S107), the switch determinator 65 selects the d-axis current detection value id_sns and the q-axis current detection value iq_sns calculated by the current detector 30 as the d-axis current fixed value id_fix and the q-axis current fixed value iq_fix to be fed back to the subtractor 22.

At S112, to which the drive control process proceeds after S111 or when a negative determination is made at S109, the subtractor 22 calculates the d-axis current deviation Δid and the q-axis current deviation Δiq based on the d-axis current command value id*, the q-axis current command value iq*, the feedback d-axis current fixed value id_fix, and the feedback q-axis current fixed value iq_fix. Further, the PI calculator 23 calculates the d-axis voltage command value vd* and the q-axis voltage command value vq* by PI calculation so that the d-axis current deviation Δid and the q-axis current deviation Δiq can converge to zero.

At S113, the three-phase voltage command calculator 24 calculates the three-phase voltage command values vu*, vv*, and vw* by inverse dq transformation of the d-axis voltage command value vd* and the q-axis voltage command value vq* based on the electrical angle θe.

At S114, the PWM signal generator 25 calculates the driving signals UU, UL, VU, VL, WU, and WL by PWM modulating the three-phase voltage command values vu*, vv*, and vw* based on the inverter input voltage VH. Further, the PWM signal generator 25 outputs the driving signals UU, UL, VU, VL, WU, and WL to the inverter 11.

The switching devices of the inverter 11 are turned ON and OFF based on the driving signals UU, UL, VU, VL, WU, and WL so that the three-phase AC voltages vu, vv, and vw can be generated. When the three-phase AC voltages vu, vv, and vw are applied to the AC motor 2, the AC motor 2 outputs torque corresponding to the torque command value trq*.

As described above, the motor control apparatus 10 controls the three-phase AC motor 2 to which the three-phase AC voltages vu, vv, and vw controlled by the inverter 11 is applied.

The procedures performed in the controller 15 of the motor control apparatus 10 can be summarized as follows. The electrical angle θe is received from the rotation angle sensor 14 (at S101 in FIG. 7). The W-phase current detection value iw_sns is received from the W-phase current sensor 12 which is provided to the first phase (i.e., W-phase in the first embodiment) of the AC motor 2, and the V-phase current detection value iv_sns is received from the V-phase current sensor 13 which is provided to the second phase (i.e., V-phase in the first embodiment) of the AC motor 2 (at S102). Each of the first phase and the second phase is any one of the phases of the AC motor 2, and the first phase and the second phase are different from each other.

The current detector 30 calculates the d-axis current detection value id_sns and the q-axis current detection value iq_sns based on the V-phase current detection value iv_sns, the W-phase current detection value iw_sns, and the electrical angle θe (at S103).

The current estimator 40 calculates the d-axis current estimation value id_est and the q-axis current estimation value iq_est based on the W-phase current detection value iw_sns and the electrical angle θe (at S104).

The rotation speed calculator 60 calculates the rotation speed Nmg of the AC motor 2 based on the electrical angle θe (at S105). The fluctuation calculator 61 calculates the rotation speed fluctuation ΔN based on the rotation speed Nmg (at S106).

The switch determinator 65 determines whether a sudden change occurs based on the rotation speed fluctuation ΔN (at S107). If the switch determinator 65 does not determine that the sudden change occurs (NO at S107), the d-axis current estimation value id_est is selected as the d-axis current fixed value id_fix, and the q-axis current estimation value iq_est is selected as the q-axis current fixed value iq_fix (at S108). In contrast, if the switch determinator 65 determines that the sudden change occurs (YES at S107), the d-axis current detection value id_sns is selected as the d-axis current fixed value id_fix, and the q-axis current detection value iq_sns is selected as the q-axis current fixed value iq_fix (at S111).

The PI calculator 23 calculates the d-axis voltage command value vd* and the q-axis voltage command value vq*, which are related to the voltages applied to the inverter 11, based on the d-axis current fixed value id_fix and the q-axis current fixed value iq_fix in addition to the d-axis current command value id* and the q-axis current command value iq*, which are related to driving of the AC motor 2.

In a configuration where the current sensors 12 and 13 are separately provided to two phases (the W-phase and the V-phase in the first embodiment) of the three-phase AC motor 2, when the one-phase control is performed based on the W-phase current detection value iw_sns of one current sensor (the W-phase current sensor 12 in the first embodiment), the influence of the difference in gain between the current sensors 12 and 13 is reduced, and also the abnormal conditions of the current sensors 12 and 13 can be monitored. However, since the one-phase control uses less actual information, the one-phase control is inferior in responsiveness and stability to the two-phase control which is performed based on the W-phase current detection value iw_sns and the V-phase current detection value iv_sns of two current sensors 12 and 13.

Therefore, according to the first embodiment, in normal times where no sudden change occurs, the d-axis current estimation value id_est and the q-axis current estimation value iq_est are respectively selected as the d-axis current fixed value id_fix and the q-axis current fixed value iq_fix to be fed back to perform the one-phase control. Thus, an influence of a difference in gain between the current sensors 12 and 13 can be reduced, and also abnormal conditions of the current sensors 12 and 13 can be monitored.

In contrast, in abnormal times where the sudden change occurs, the d-axis current detection value id_sns and the q-axis current detection value iq_sns are respectively selected as the d-axis current fixed value id_fix and the q-axis current fixed value iq_fix to be fed back to perform the two-phase control, thereby increasing control responsiveness. Thus, for example, when the motor control apparatus 10 is used to control the AC motor 2 mounted on the vehicle, and the rotation speed Nmg of the AC motor 2 suddenly changes due to road conditions, the two-phase control is selected so that control responsiveness can be increased to respond to the sudden change in the rotation speed Nmg. In this way, the motor control apparatus 10 can suitably control the AC motor 2.

Further, according to the first embodiment, the current estimator 40 calculates the d-axis current estimation value id_est and the q-axis current estimation value iq_est based on the d-axis current command value id* and the q-axis current command value iq*, which are related to driving of the AC motor 2, in addition to the W-phase current detection value iw_sns and the electrical angle θe.

More specifically, in the current estimator 40, the sensor-phase reference current phase detector 41 calculates the sensor-phase reference current phase θx based on the W-phase current detection value iw_sns, the electrical angle θe, the d-axis current command value id*, and the q-axis current command value iq*. The fundamental wave estimator 42 calculates the V-phase current estimation value iv_est based on the sensor-phase reference current phase θx and the W-phase current detection value iw_sns. The zero-crossing interpolator 43 calculates the V-phase current estimation fixed value iv_est_fix by interpolating the zero-crossing of the V-phase current estimation value iv_est. The dq transformer 44 calculates the d-axis current estimation value id_est and the q-axis current estimation value iq_est based on the electrical angle θe, the W-phase current detection value iw_sns, and the V-phase current estimation value iv_est.

In such an approach, the d-axis current estimation value id_est and the q-axis current estimation value iq_est can be accurately. Therefore, responsiveness in the one-phase control can be improved.

The d-axis current estimation value id_est and the q-axis current estimation value iq_est can be calculated by any method that uses at least the electrical angle θe and the W-phase current detection value iw_sns. According to the first embodiment, the d-axis current estimation value id_est and the q-axis current estimation value iq_est are calculated based on the d-axis current command value id* and the q-axis current command value iq* in addition to the W-phase current detection value iw_sns and the electrical angle θe. In this way, the d-axis current estimation value id_est and the q-axis current estimation value iq_est can be calculated based on other parameters such as the d-axis current command value id* and the q-axis current command value iq* in addition to the electrical angle θe and the W-phase current detection value iw_sns.

Further, according to the first embodiment, both a set of the d-axis current detection value id_sns and the q-axis current detection value iq_sns and a set of the d-axis current estimation value id_est and the q-axis current estimation value iq_est are always calculated regardless of the feedback current values. In other words, even in the two-phase control, the d-axis current estimation value id_est and the q-axis current estimation value iq_est are calculated. In such an approach, errors in the d-axis current estimation value id_est and the q-axis current estimation value iq_est are kept small. Therefore, even when a filter calculation with a delay is performed in the current estimator 40, current control immediately after a control mode is switched from the two-phase control to the one-phase control can be stabilized. Accordingly, the AC motor 2 can be stably controlled.

Further, according to the first embodiment, the current estimator 40 calculates the V-phase current estimation value iv_est based on the W-phase current detection value iw_sns (at S104). Further, the abnormality determinator 50 determines whether the abnormal condition occurs in at least one of the W-phase current sensor 12 and the V-phase current sensor 13 based on a result of a comparison between the V-phase current estimation value iv_est and the V-phase current detection value iv_sns, when the d-axis current estimation value id_est and the q-axis current estimation value iq_est are selected as the current fixed values to be fed back (at S109).

Thus, the abnormality conditions of the W-phase current sensor 12 and the V-phase current sensor 13 can be suitably monitored to ensure fail-safe operation.

Further, according to the first embodiment, the PI calculator 23 calculates the d-axis voltage command value vd* and the q-axis voltage command value vq* based on the feedback d-axis current fixed value id_fix and the feedback q-axis current fixed value iq_fix in addition to the d-axis current command value id* and the q-axis current command value iq*, which are related to driving of the AC motor 2. That is, according to the first embodiment, the d-axis voltage command value vd* and the q-axis voltage command value vq* are calculated in a current feedback control system. In such an approach, a torque ripple can be reduced, in particular, in low speed range.

Correspondence between terms used in the first embodiment and claims is as follows. The W-phase current sensor 12 corresponds to a first current sensor. The V-phase current sensor 13 corresponds to a second current sensor. The controller 15 corresponds to a first current receiver, a second current receiver, a rotation angle receiver, a two-phase control current value calculator, a one-phase control current value calculator, a rotation speed calculator, a fluctuation calculator, a switch, a voltage command value calculator, an other-phase current estimator, and an abnormality determinator. Specifically, the current detector 30 corresponds to a two-phase control current value calculator, the current estimator 40 corresponds to a one-phase control current value calculator and an other-phase current estimator, the rotation speed calculator 60 corresponds to a rotation speed calculator, the fluctuation calculator 61 corresponds to a fluctuation calculator, the switch determinator 65 corresponds to a sudden-change determinator and a switch, the PI calculator 23 corresponds to a voltage command value calculator, and the abnormality determinator 50 corresponds to an abnormality determinator.

S102 corresponds to a procedure as functions of a first current receiver, a second current receiver. S101 corresponds to a procedure as a function of a rotation angle receiver. S103 corresponds to a procedure as a function of a two-phase control current value calculator. S104 corresponds to a procedure as functions of a one-phase control current value calculator and an other-phase current estimator. S105 corresponds to a procedure as a function of a rotation speed calculator. S106 corresponds to a procedure as a function of a fluctuation calculator. S107 corresponds to a procedure as a function of a sudden-change determinator. S108 and S111 correspond to procedures as a function of a switch. S112 corresponds to a procedure as a function of a voltage command calculator. S109 corresponds to a procedure as a function of an abnormality determinator.

The W-phase corresponds to a first phase. The W-phase current detection value iw_sns corresponds to a first current detection value. The V-phase corresponds to a second phase. The V-phase current detection value iv_sns corresponds to a second current detection value. The V-phase current estimation value iv_est corresponds to a second-phase current estimation value. The electrical angle θe corresponds to a rotation angle detection value. The d-axis current detection value id_sns and the q-axis current detection value iq_sns correspond to a two-phase control current value. The d-axis current estimation value id_est and the q-axis current estimation value iq_est correspond to a one-phase control current value. The d-axis current fixed value id_fix and the q-axis current fixed value iq_fix correspond to a current fixed value. The d-axis current command value id* and the q-axis current command value iq* correspond to a drive command value and a current command value. The d-axis voltage command value vd* and the q-axis voltage command value vq* correspond to a voltage command value.

(Second Embodiment)

A second embodiment of the present disclosure is described below with reference to FIGS. 8 and 9. The second embodiment differs from the first embodiment in a procedure performed in the switch determinator 65.

Figure 8:
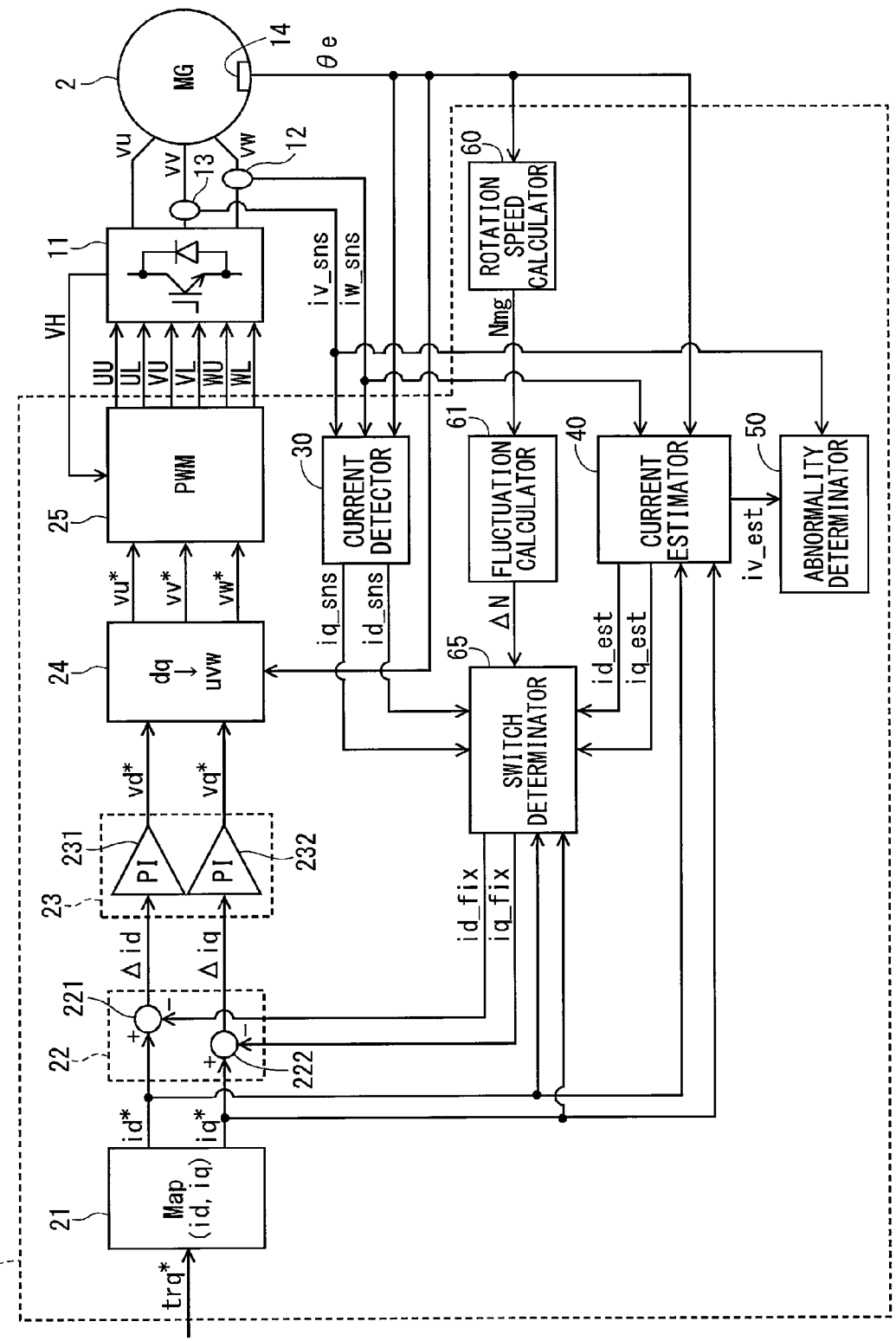
FIG. 8 is a block diagram of a controller according to a second embodiment of the present disclosure.
Figure 9:
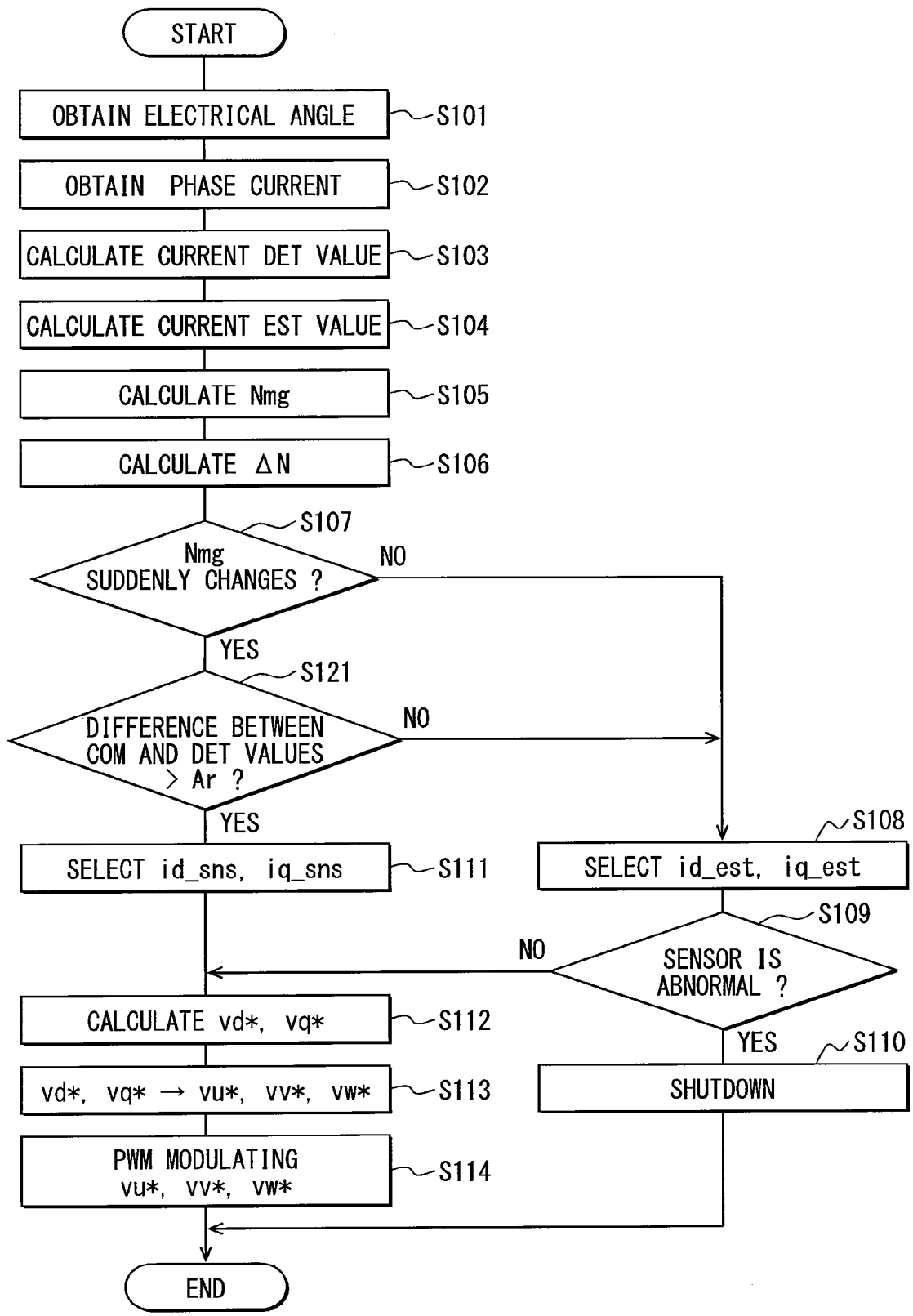
FIG. 9 is a flowchart of a drive control process according to the second embodiment.

As shown in FIG. 8, according to the second embodiment, the switch determinator 65 determines whether the sudden change occurs based on the d-axis current command value id*, the q-axis current command value iq*, the d-axis current detection value id_sns, and the q-axis current detection value iq_sns in addition to the rotation speed fluctuation ΔN.

Even when the rotation speed fluctuation ΔN is large, suitable responsiveness can be achieved even in the one-phase control under a condition that both the difference between the d-axis current command value id* and the d-axis current detection value id_sns and the difference between the q-axis current command value iq* and the q-axis current detection value iq_sns are small. In contrast, if at least one of the difference between the d-axis current command value id* and the d-axis current detection value id_sns and the difference between the q-axis current command value iq* and the q-axis current detection value iq_sns is large, the two-phase control is used to ensure suitable responsiveness.

A drive control process according to the second embodiment is described with reference to a flowchart in FIG. 9. A difference between FIGS. 7 and 9 is that S121, to which the drive control process proceeds when an affirmative determination is made at S107, is added.

At S121, to which the drive control process proceeds when the switch determinator 65 determines that the sudden change occurs in the rotation speed Nmg (YES at S107), the switch determinator 65 determines whether each of the difference between the d-axis current command value id* and the d-axis current detection value id_sns and the difference between the q-axis current command value iq* and the q-axis current detection value iq_sns is greater than a predetermined responsiveness determination threshold Ar. The responsiveness determination threshold Ar can be set according to various factors including current estimation accuracy in the one-phase control, a calculation speed of the controller 15, and responsiveness of the AC motor 2. The same is true for determination thresholds described in third to fifth embodiments.

If both the difference between the d-axis current command value id* and the d-axis current detection value id_sns and the difference between the q-axis current command value iq* and the q-axis current detection value iq_sns are not greater than the responsiveness determination threshold Ar (NO at S121), the drive control process proceeds to S108. Thus, even when the rotation speed Nmg suddenly changes, the switch determinator 65 does not determine that the sudden change occurs so that the one-phase control can be performed under the condition that both the difference between the d-axis current command value id* and the d-axis current detection value id_sns and the difference between the q-axis current command value iq* and the q-axis current detection value iq_sns are not greater than the responsiveness determination threshold Ar.

In contrast, if at least one of the difference between the d-axis current command value id* and the d-axis current detection value id_sns and the difference between the q-axis current command value iq* and the q-axis current detection value iq_sns is greater than the responsiveness determination threshold Ar (YES at S121), the drive control process proceeds to S111. Thus, when at least one of the difference between the d-axis current command value id* and the d-axis current detection value id_sns and the difference between the q-axis current command value iq* and the q-axis current detection value iq_sns is greater than the responsiveness determination threshold Ar, the switch determinator 65 determines that the sudden change occurs so that the two-phase control can be performed.

As described above, according to the second embodiment, the switch determinator 65 determines whether the sudden change occurs based on the difference between the d-axis current command value id* and the d-axis current detection value id_sns and the difference between the q-axis current command value iq* and the q-axis current detection value iq_sns in addition to the rotation speed fluctuation ΔN. In such an approach, a suitable selection between the one-phase control and the two-phase control can be made.

Correspondence between terms used in the second embodiment and claims is as follows. S107 and S121 correspond to procedures as a function of a sudden-change determinator.

(Third Embodiment)

Figure 10:
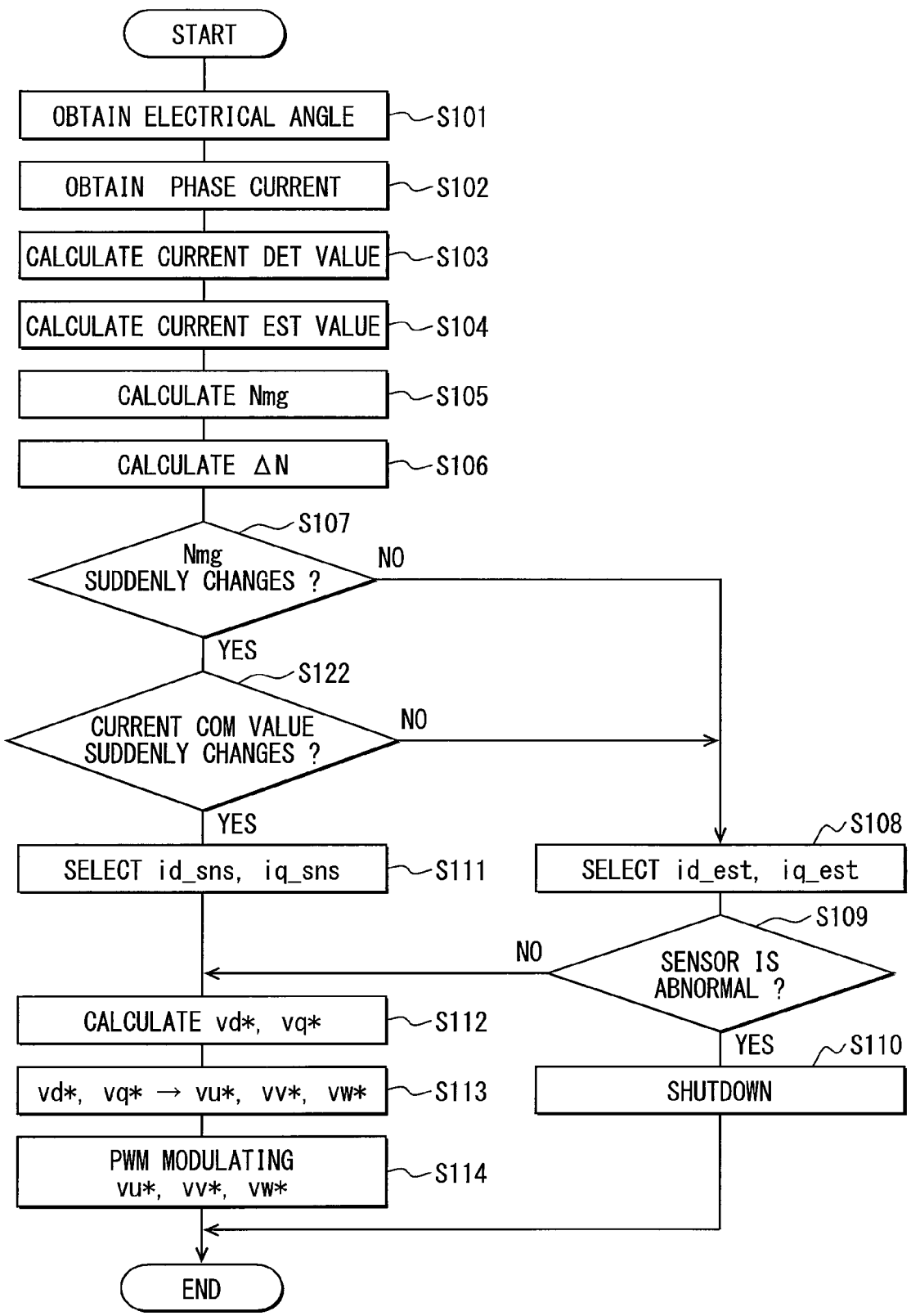
FIG. 10 is a flowchart of a drive control process according to a third embodiment of the present disclosure.

A third embodiment of the present disclosure is described below with reference to FIG. 10. A difference between the second embodiment and the third embodiment is as follows.

In the second embodiment, the switch determinator 65 determines whether the sudden change occurs based on the difference between the d-axis current command value id* and the d-axis current detection value id_sns and the difference between the q-axis current command value iq* and the q-axis current detection value iq_sns in addition to the rotation speed fluctuation ΔN.

In contrast, in the third embodiment, the switch determinator 65 determines whether the sudden change occurs based on the d-axis current command value id* itself and the q-axis current command value iq* itself in addition to the rotation speed fluctuation ΔN.

In the preceding embodiments, the d-axis current command value id* and the q-axis current command value iq* are used by the current estimator 40 to calculate the d-axis current estimation value id_est and the q-axis current estimation value iq_est. In such a case, even when the rotation speed Nmg suddenly changes, suitable responsiveness is likely to be achieved even in the one-phase control under a condition that each of the d-axis current command value id* and the q-axis current command value iq* does not suddenly change. Therefore, the one-phase control is continued.

A drive control process according to the third embodiment is described with reference to a flowchart in FIG. 10. A difference between FIGS. 9 and 10 is that S121 is replaced with S122.

At S122, to which the drive control process proceeds when the switch determinator 65 determines that the rotation speed Nmg suddenly changes (YES at S107), the switch determinator 65 determines whether at least one of the d-axis current command value id* and the q-axis current command value iq* suddenly changes. Like the determination of whether the rotation speed Nmg suddenly changes, determination of whether at least one of the d-axis current command value id* and the q-axis current command value iq* suddenly changes can be made based on any value including a moving average, a difference between previous and present values, and a difference between maximum and minimum values over a predetermined period. If the switch determinator 65 does not determine that at least one of the d-axis current command value id* and the q-axis current command value iq* suddenly changes (NO at S122), the drive control process proceeds to S108 so that the one-phase control can be selected. In contrast, if the switch determinator 65 determines that at least one of the d-axis current command value id* and the q-axis current command value iq* suddenly changes (YES at S122), the drive control process proceeds to S111 so that the two-phase control can be selected.

As described above, according to the third embodiment, the switch determinator 65 determines whether the sudden change occurs based on the d-axis current command value id* and the q-axis current command value iq* in addition to the rotation speed fluctuation ΔN. In such an approach, a suitable selection between the one-phase control and the two-phase control can be made.

Correspondence between terms used in the third embodiment and claims is as follows. S107 and S122 correspond to procedures as a function of a sudden-change determinator.

(Fourth Embodiment)

A fourth embodiment of the present disclosure is described below with reference to FIGS. 11 and 12. A difference between the third embodiment and the fourth embodiment is as follows.

In the third embodiment, the switch determinator 65 determines whether the sudden change occurs based on the d-axis current command value id* and the q-axis current command value iq* in addition to the rotation speed fluctuation ΔN.

Figure 11:
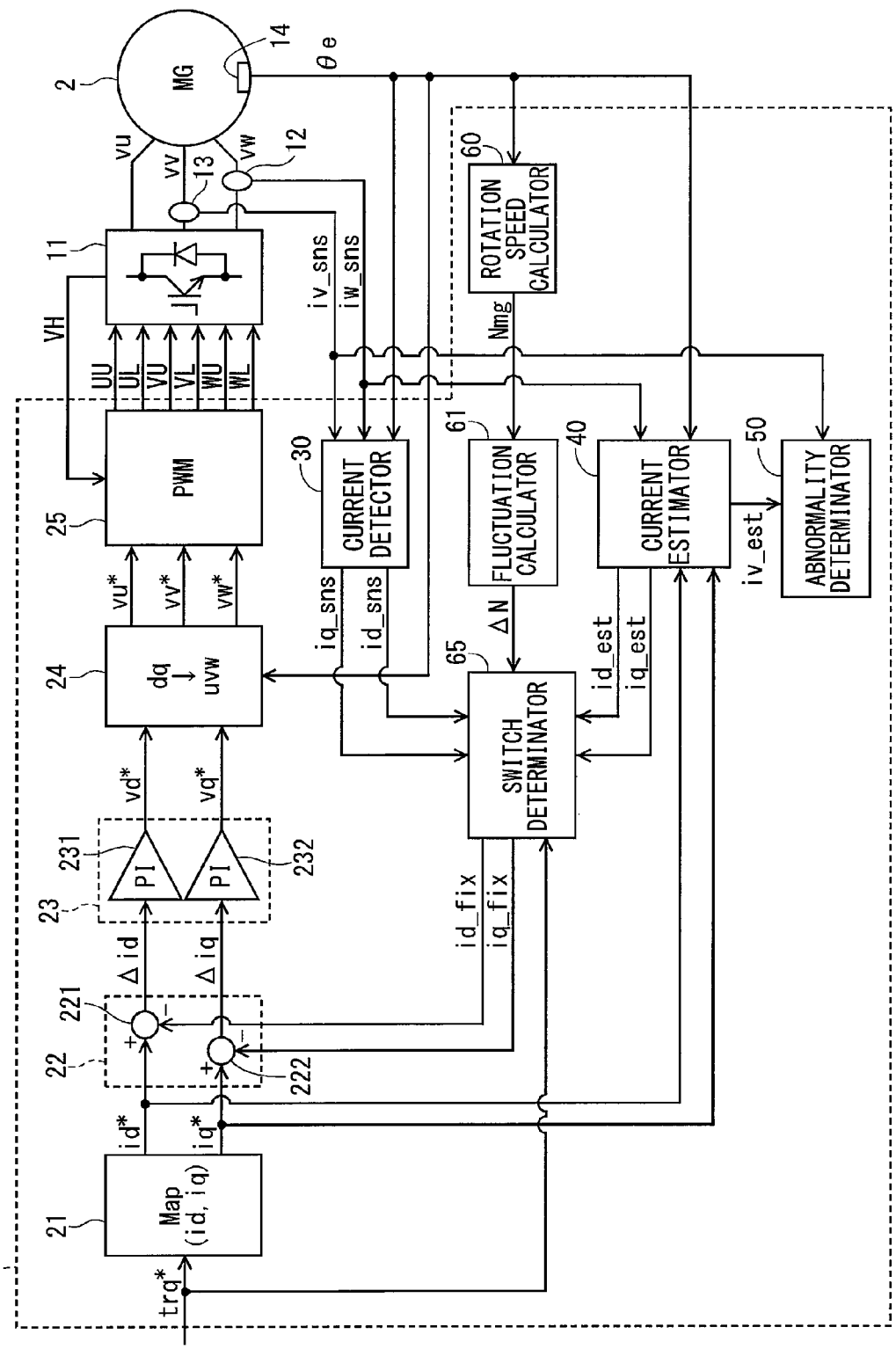
FIG. 11 is a block diagram of a controller according to a fourth embodiment of the present disclosure.

In contrast, in the fourth embodiment, as shown in FIG. 11, the switch determinator 65 determines whether the sudden change occurs based on the torque command value trq* in addition to the rotation speed fluctuation ΔN.

As described in the first embodiment, the d-axis current command value id* and the q-axis current command value iq* are calculated based on the torque command value trq*. Therefore, a sudden change in the d-axis current command value id* and the q-axis current command value iq* can have almost the same meaning as a sudden change in the torque command value trq*. However, there is a possibility that the d-axis current command value id* and the q-axis current command value iq* are changed by calculations according to characteristics. In such a case, determination of whether the sudden change occurs may be made properly based on the torque command value trq* as a higher command rather than the d-axis current command value id* and the q-axis current command value iq*. For this reason, according to the fourth embodiment, the switch determinator 65 determines whether the sudden change occurs based on the torque command value trq* in addition to the rotation speed fluctuation ΔN.

A drive control process according to the fourth embodiment is described with reference to a flowchart in FIG. 12. A difference between FIGS. 10 and 12 is that S122 is replaced with S123.

At S123, to which the drive control process proceeds when the switch determinator 65 determines that the rotation speed Nmg suddenly changes (YES at S107), the switch determinator 65 determines whether the torque command value trq* suddenly changes. Like the determination of whether the rotation speed Nmg suddenly changes, determination of whether the torque command value trq* suddenly changes can be made based on any value including a moving average, a difference between previous and present values, and a difference between maximum and minimum values over a predetermined period. If the switch determinator 65 does not determine that the torque command value trq* suddenly changes (NO at S123), the drive control process proceeds to S108 so that the one-phase control can be selected. In contrast, if the switch determinator 65 determines that the torque command value trq* suddenly changes (YES at S123), the drive control process proceeds to S111 so that the two-phase control can be selected.

As described above, according to the fourth embodiment, the switch determinator 65 determines whether the sudden change occurs based on the torque command value trq* in addition to the rotation speed fluctuation ΔN. In such an approach, a suitable selection between the one-phase control and the two-phase control can be made.

Correspondence between terms used in the fourth embodiment and claims is as follows. S107 and S123 correspond to procedures as a function of a sudden-change determinator.

(Fifth Embodiment)

Figure 13:
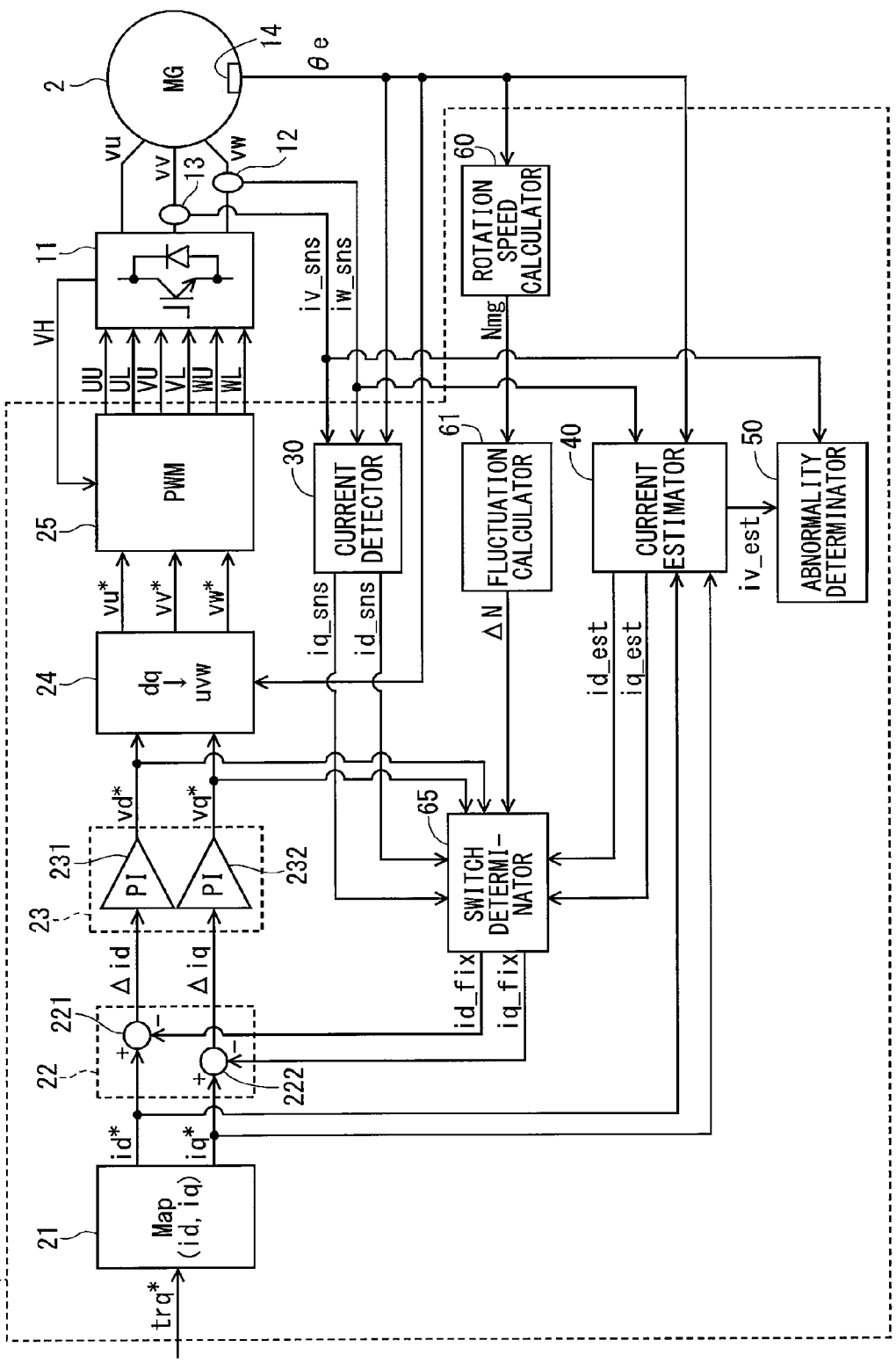
FIG. 13 is a block diagram of a controller according to a fifth embodiment of the present disclosure.

A fifth embodiment of the present disclosure is described below with reference to FIGS. 13 and 14. According to the fifth embodiment, as shown in FIG. 13, the switch determinator 65 determines whether the sudden change occurs based on the d-axis voltage command value vd* and the q-axis voltage command value vq* in addition to the rotation speed fluctuation ΔN for the following reasons. Unless the d-axis voltage command value vd* and the q-axis voltage command value vq* as calculation results suddenly change, the three-phase voltage command values vu*, vv*, and vw* applied to the AC motor 2 do not suddenly change. Therefore, unless the d-axis voltage command value vd* and the q-axis voltage command value vq* suddenly change, suitable responsiveness can be achieved even in the one-phase control using the d-axis current estimation value id_sns and the q-axis current estimation value iq_sns. In contrast, if the d-axis voltage command value vd* and the q-axis voltage command value vq* suddenly change, the control mode is switched from the one-phase control to the two-phase control, because the one-phase control may not respond to the sudden change.

A drive control process according to the fifth embodiment is described with reference to a flowchart in FIG. 14. A difference between FIGS. 9 and 14 is that S121 is replaced with S124.

At S124, to which the drive control process proceeds when the switch determinator 65 determines that the rotation speed Nmg suddenly changes (YES at S107), the switch determinator 65 determines whether at least one of the d-axis voltage command value vd* and the q-axis voltage command value vq* suddenly changes. Like the determination of whether the rotation speed Nmg suddenly changes, determination of whether at least one of the d-axis voltage command value vd* and the q-axis voltage command value vq* suddenly changes can be made based on any value including a moving average, a difference between previous and present values, and a difference between maximum and minimum values over a predetermined period. If the switch determinator 65 does not determine that at least one of the d-axis voltage command value vd* and the q-axis voltage command value vq* suddenly changes (NO at S124), the drive control process proceeds to S108 so that the one-phase control can be selected. In contrast, if the switch determinator 65 determines that at least one of the d-axis voltage command value vd* and the q-axis voltage command value vq* suddenly changes (YES at S124), the drive control process proceeds to S111 so that the two-phase control can be selected.

As described above, according to the fifth embodiment, the switch determinator 65 determines whether the sudden change occurs based on the d-axis voltage command value vd* and the q-axis voltage command value vq* in addition to the rotation speed fluctuation ΔN. In such an approach, a suitable selection between the one-phase control and the two-phase control can be made.

Correspondence between terms used in the fifth embodiment and claims is as follows. S107 and S124 correspond to procedures as a function of a sudden-change determinator.

(Sixth Embodiment)

When the vehicle runs on the uneven surface of the road, the slip and the grip of the drive wheel 6 may be repeated depending on road conditions, so that the control mode can frequently switch between the one-phase control and the two-phase control. For example, in FIG. 6, a period, where the one-phase control is performed, between the periods P1 and P2, where the two-phase control is performed, is short. When the control mode switches between the one-phase control and the two-phase control at short intervals as shown in FIG. 6, a phenomenon called hunting may occur.

To prevent such a phenomenon, according to the sixth embodiment, when the control mode switches to the two-phase control upon a determination that the sudden change occurs, the two-phase control is continued for a predetermined time period. More specifically, even when a determination that the sudden change does not occur is made after the control mode switches from the one-phase control to the two-phase control upon the determination that the sudden change occurs, the two-phase control is continued for the predetermined time period.

Figure 15:
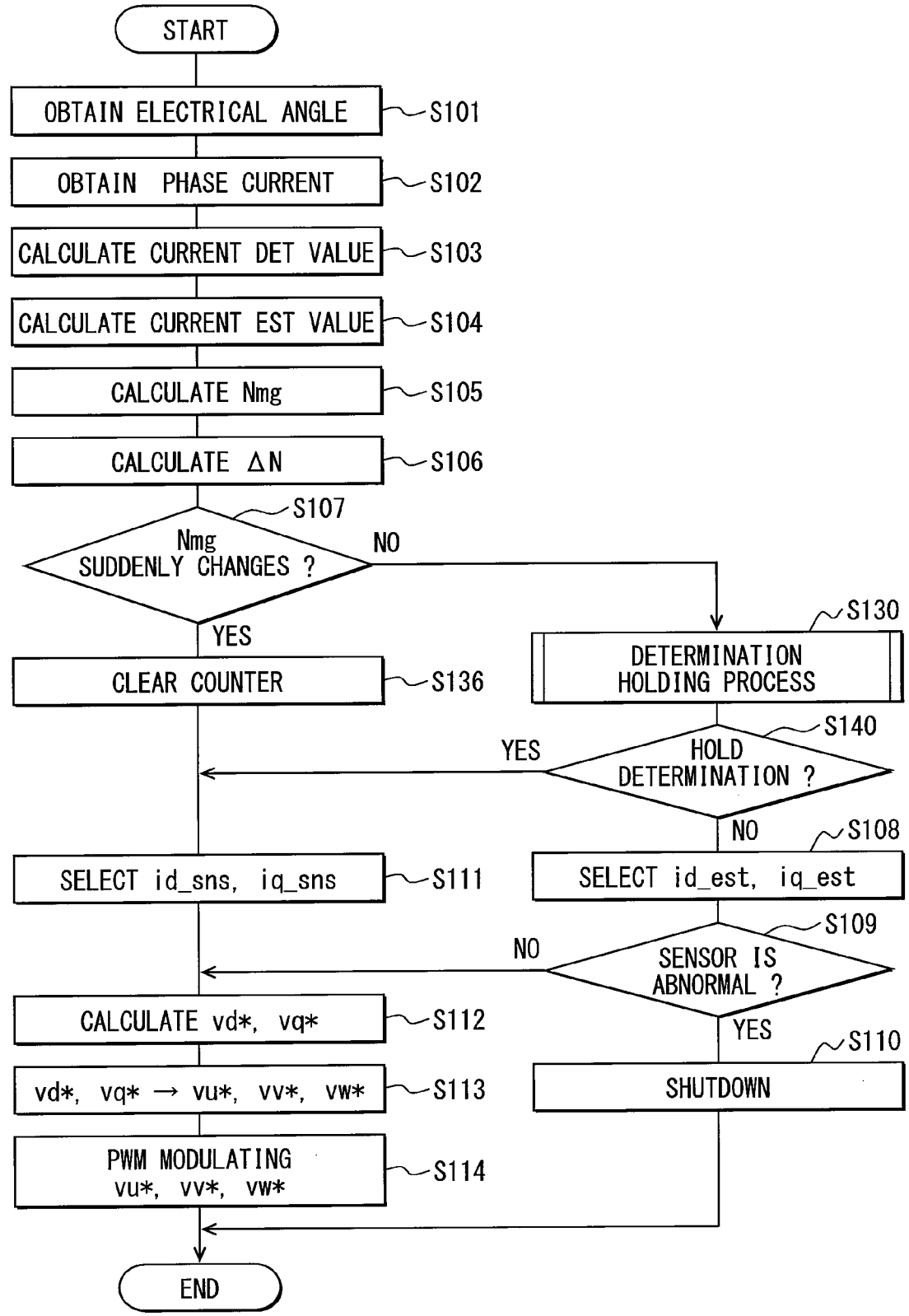
FIG. 15 is a flowchart of a drive control process according to a sixth embodiment of the present disclosure.
Figure 16:
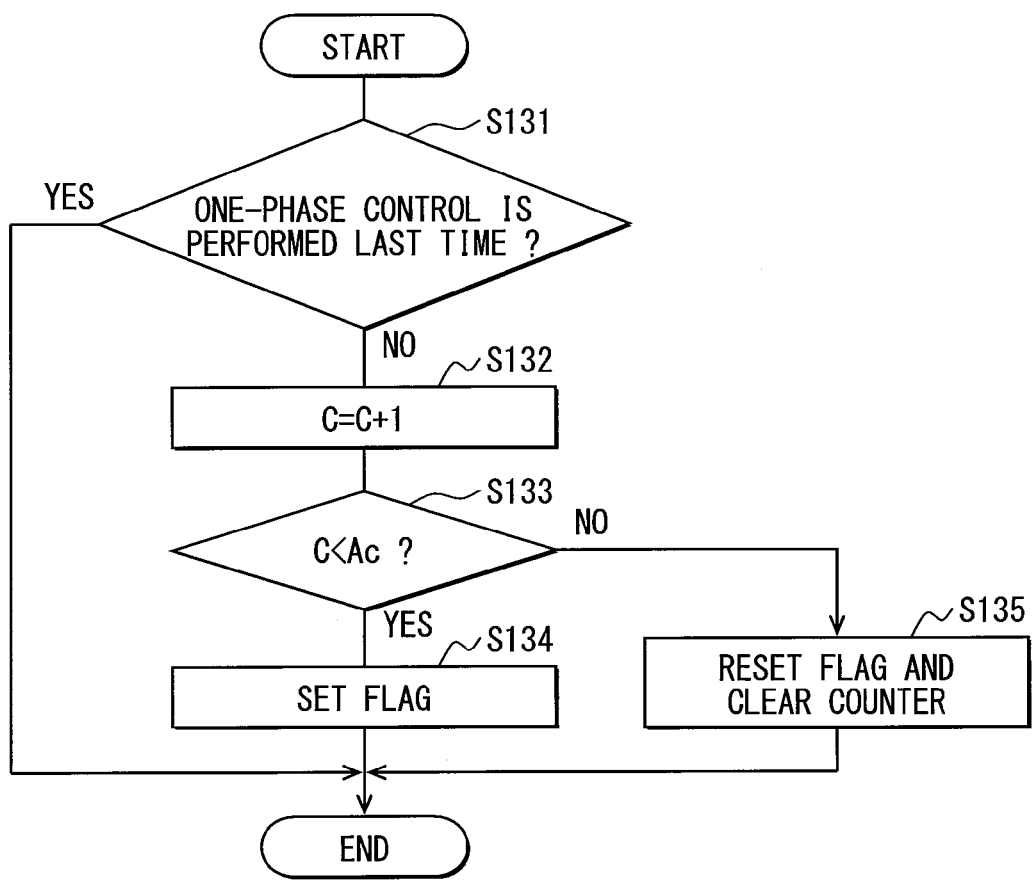
FIG. 16 is a flowchart of a determination holding process according to the sixth embodiment.

A drive control process according to the sixth embodiment is described with reference to flowcharts in FIGS. 15 and 16. Differences between FIGS. 7 and 15 are that S130 and S140, to which the drive control process proceeds when a negative determination is made at S107, are added, and that S136, to which the drive control process proceeds when an affirmative determination is made at S107, is added. FIG. 16 is a flowchart of a determination holding process performed at S130 in FIG. 15.

At S130, to which the drive control process proceeds when the switch determinator 65 does not determine that the rotation speed Nmg suddenly changes (NO at S107), the determination holding process is performed.

The determination holding process is described below with reference to FIG. 16.

At S131, it is determined whether the previous drive control process was performed in the one-phase mode. If it is determined that the previous drive control process was performed in the one-phase mode (YES at S131), i.e., if the d-axis current estimation value id_est and the q-axis current estimation value iq_est to be fed back from the switch determinator 65 were respectively selected as the d-axis current fixed value id_fix and the q-axis current fixed value iq_fix, the determination holding process ends, and the drive control process proceeds to S140 in FIG. 15. At this time, a determination holding flag, which is described later, remains reset. In contrast, if it is not determined that the previous drive control process was performed in the one-phase mode (NO at S131), i.e., if the previous drive control process was performed in the two-phase mode so that the d-axis current detection value id_sns and the q-axis current detection value iq_sns to be fed back from the switch determinator 65 were respectively selected as the d-axis current fixed value id_fix and the q-axis current fixed value iq_fix, the determination holding process proceeds to S132.

At S132, a count value C of a determination holding counter is incremented.

At S133, it is determined whether the count value C of the determination holding counter is less than a predetermined number Ac corresponding to the predetermined time period for which the two-phase control is continued. If it is determined that the count value C of the determination holding counter is not less than the predetermined number Ac (NO at S133), the determination holding process proceeds to S135. In contrast, if it is determined that the count value C of the determination holding counter is less than the predetermined number Ac (YES at S133), the determination holding process proceeds to S134.

At S134, the determination holding flag is set. Then, the determination holding process ends, and the drive control process proceeds to S140 in FIG. 15.

At S135, to which the determination holding process proceeds when if it is determined that the count value C of the determination holding counter is not less than the predetermined number Ac, the determination holding flag is reset, and the count value C of the determination holding counter is cleared. Then, the determination holding process ends, and the drive control process proceeds to S140 in FIG. 15.

Returning to FIG. 15, at S140, to which the drive control process proceeds after the determination holding process ends, it is determined whether the determination should be held based on the determination holding flag. If it is not determined that the determination should be held (NO at S140), i.e., if the determination holding flag is set, the determination is not held, and the drive control process proceeds to S108 to perform the one-phase control. In contrast, if it is determined that the determination should be held (YES at S140), i.e., if the determination holding flag is reset, the determination is held, and the drive control process proceeds to S111 to continue the one-phase control.

At S136, to which the drive control process proceeds when it is determined that the rotation speed Nmg suddenly changes (YES at S107), the count value C of the determination holding counter is cleared, and then the drive control process proceeds to S111.

As described above, according to the sixth embodiment, when it is determined that no sudden change occurs after it is determined that the sudden change occurs so that the d-axis current detection value id_sns and the q-axis current detection value iq_sns are respectively selected as the d-axis current fixed value id_fix and the q-axis current fixed value iq_fix, the d-axis current detection value id_sns and the q-axis current detection value iq_sns respectively remains selected as the d-axis current fixed value id_fix and the q-axis current fixed value iq_fix for the predetermined time period. Then, when the predetermined time period has elapsed after it is determined that the sudden change occurs, the d-axis current estimation value id_est and the q-axis current estimation value iq_est are selected as the d-axis current fixed value id_fix and the q-axis current fixed value iq_fix.

As described above, even when it is determined that no sudden change occurs after the control mode is switched from the one-phase control to the two-phase control as a result of the determination that the sudden change occurs, the two-phase control is continued for the predetermined time period. In other words, the two-phase control is continued for the predetermined time period after the sudden change condition is finished. In such an approach, frequent switching between the two-phase control and the one-phase control is avoided so that the hunting phenomenon can be avoided. In particular, when the vehicle runs on the uneven surface or the iced surface of the road, so that the drive wheel 6 repeatedly slips and grips, the two-phase control is continued so that the AC motor 2 can be accurately controlled.

Correspondence between terms used in the sixth embodiment and claims is as follows. S108, S111, S130-S136, and S140 correspond to procedures as a function of a sudden-change determinator.

It is noted that the sixth embodiment can be generalized as follows. Even when it is determined that no sudden change occurs after a two-phase control current value is selected as a current fixed value as a result of a determination that a sudden change occurs, the two-phase control current value remains selected as the current fixed value for a predetermined time period. This includes the concept that when a two-phase control current value is selected as a current fixed value, the two-phase control current value remains selected for a predetermined time period.

Figure 17:
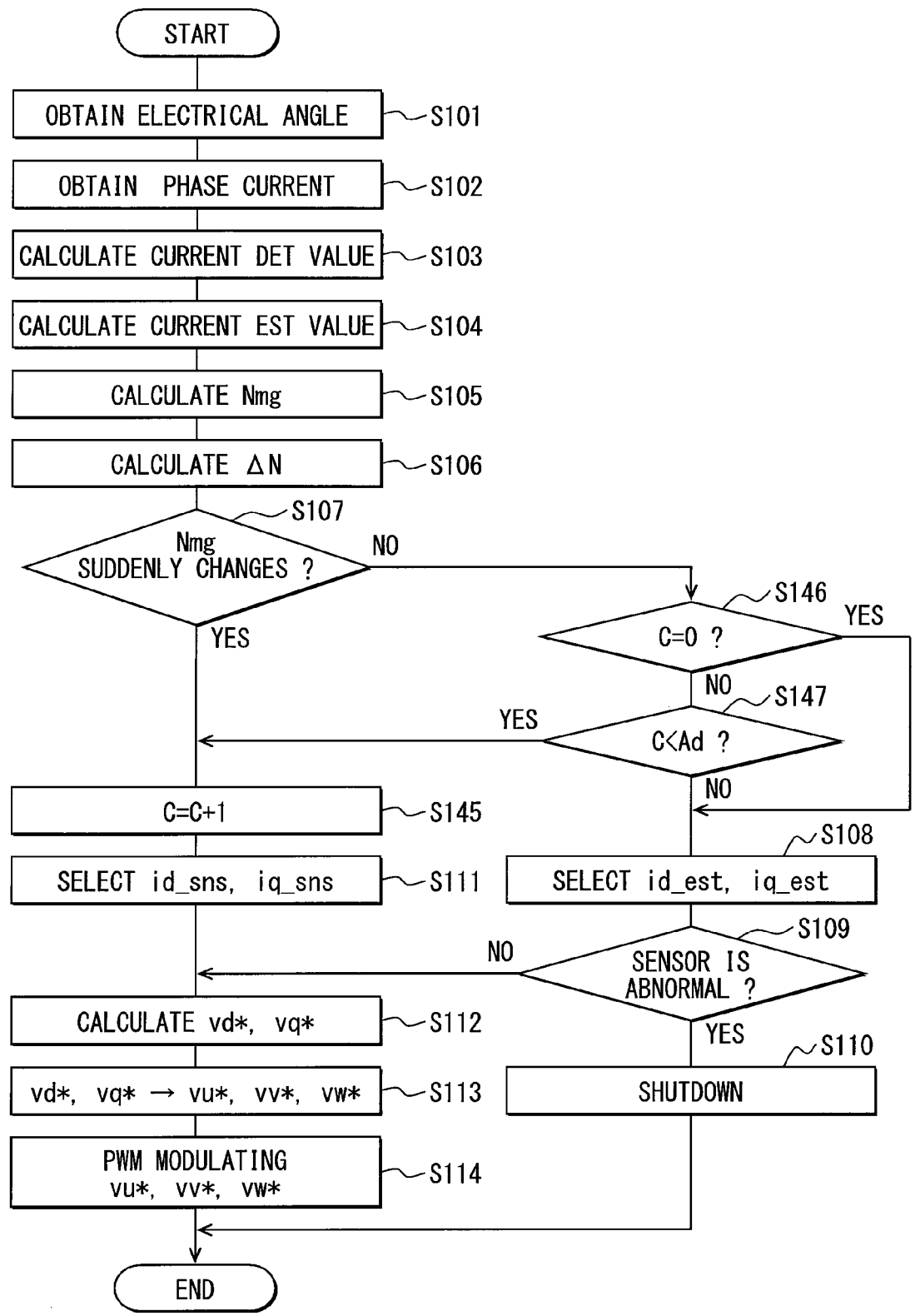
FIG. 17 is a flowchart of a determination holding process according to a modification of the sixth embodiment.

Therefore, for example, as shown in FIG. 17, when the d-axis current detection value id_sns and the q-axis current detection value iq_sns are respectively selected as the d-axis current fixed value id_fix and the q-axis current fixed value iq_fix, the d-axis current detection value id_sns and the q-axis current detection value iq_sns can remain fed back for a predetermined time period. In other words, the two-phase control can be continued for the predetermined time period after the sudden change condition is started.

Figure 7:
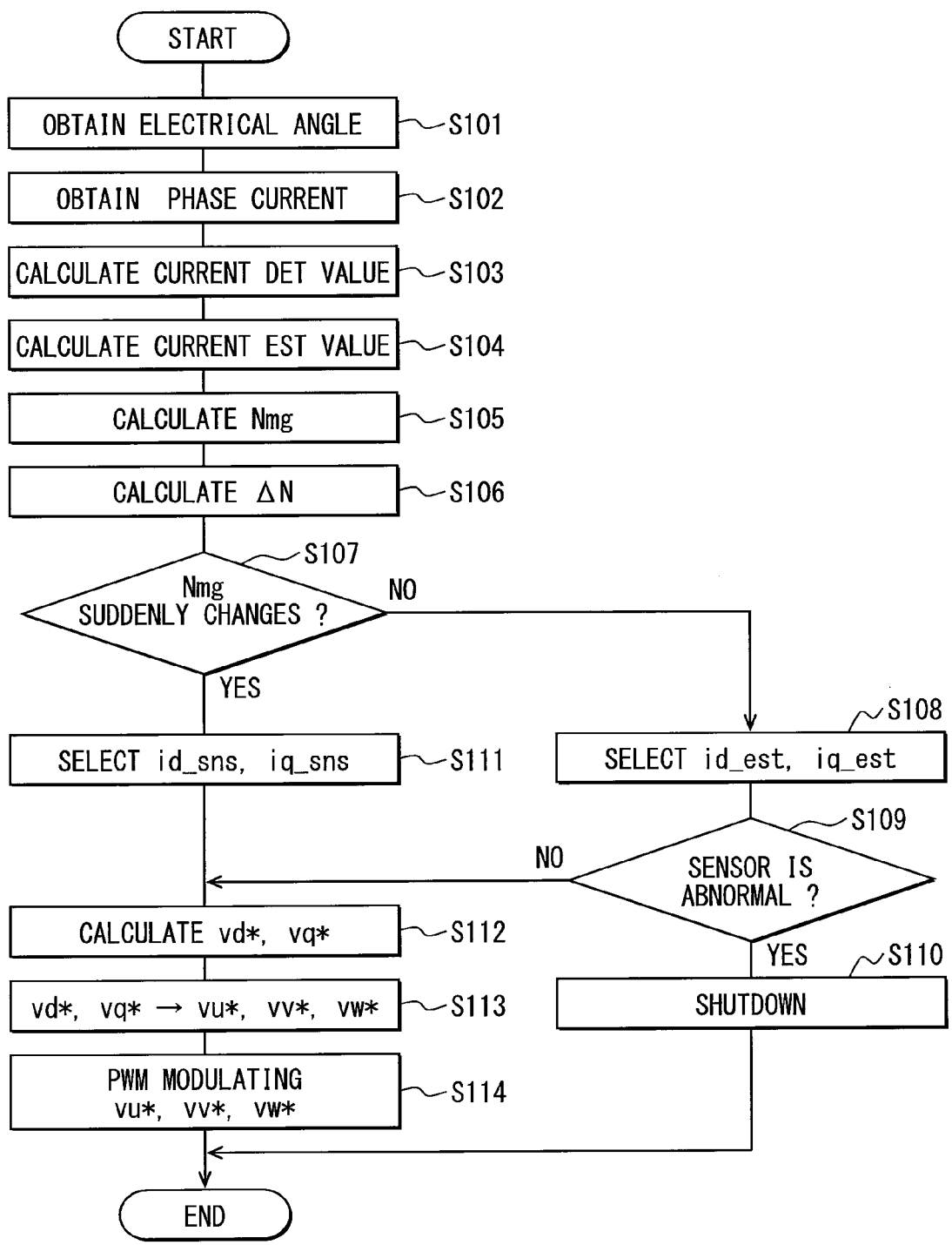
FIG. 7 is a flowchart of a drive control process according to the first embodiment.

Differences between FIGS. 7 and 17 are that S145, to which the drive control process proceeds when an affirmative determination is made at S107, is added and that S146 and S147, to which the drive control process proceeds when a negative determination is made at S107, are added.

At S145, to which the drive control process proceeds when it is determined that the sudden change occurs (YES at S107), the count value C of the determination holding counter is incremented, and the drive control process proceeds to S111 to perform the two-phase control.

At S146, to which the drive control process proceeds when it is not determined that the sudden change occurs (NO at S107), it is determined whether the counter value C of the determination holding counter is zero. If it is determined that the counter value C of the determination holding counter is zero (YES at S146), the drive control process proceeds to S108 to perform the one-phase control. In contrast, if it is not determined that the counter value C of the determination holding counter is zero (NO at S146), the drive control process proceeds to S147.

At S147, it is determined whether the count value C of the determination holding counter is less than a predetermined number Ad corresponding to the predetermined time period for which the two-phase control is continued. If it is determined that the count value C of the determination holding counter is less than the predetermined number Ad (YES at S147), the drive control process proceeds to S145. At S145, the counter value C of the determination holding counter is incremented, and then the drive control process proceeds to S111 to perform the two-phase control. In contrast, if it is determined that the count value C of the determination holding counter is not less than the predetermined number Ad (NO at S147), the counter value C of the determination holding counter is cleared, and then the drive control process proceeds to S108 to perform the one-phase control.

As described above, according to the drive control process shown in FIG. 17, when the d-axis current detection value id_sns and the q-axis current detection value iq_sns are respectively selected as the d-axis current fixed value id_fix and the q-axis current fixed value iq_fix, the d-axis current detection value id_sns and the q-axis current detection value iq_sns remain fed back for the predetermined time period. In other words, the two-phase control can be continued for the predetermined time period (YES at S147, S111).

Thus, frequent switching between the two-phase control and the one-phase control is avoided so that the hunting phenomenon can be avoided. Therefore, the AC motor 2 can be accurately controlled.

Correspondence between terms used in the modification of the sixth embodiment and claims is as follows. S108, S111, S145-S147 correspond to procedures as a function of a sudden-change determinator.

(Seventh Embodiment)

Figure 18:
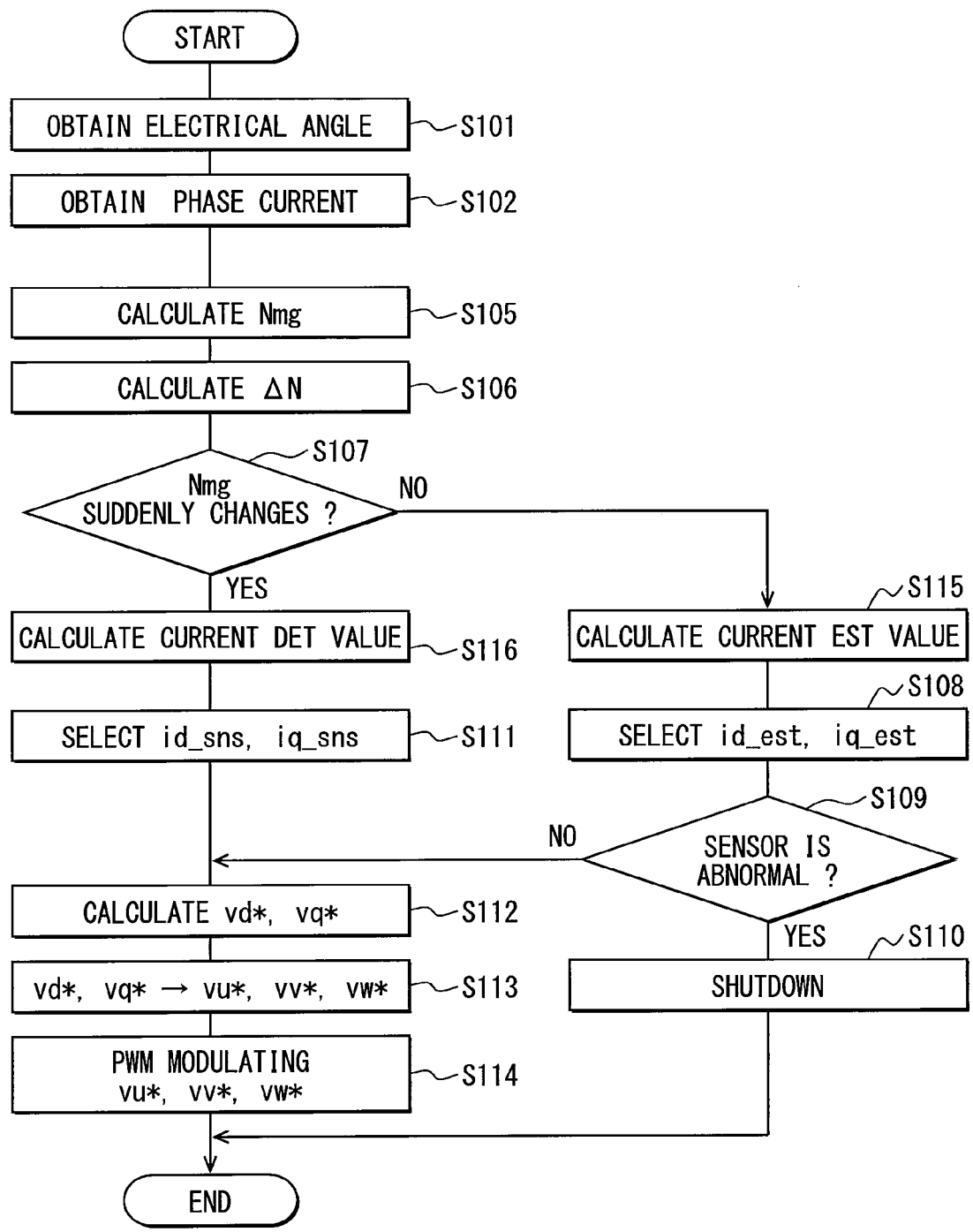
FIG. 18 is a flowchart of a drive control process according to a seventh embodiment of the present disclosure.

A drive control process according to the seventh embodiment is described below with reference to FIG. 18. Differences between FIGS. 7 and 15 are as follows. S103 and S104 in FIG. 7 are omitted. S115, to which the drive control process proceeds when a negative determination is made at S107, is added. S116, to which the drive control process proceeds when an affirmative determination is made at S108, is added.

A procedure performed at S115, to which the drive control process proceeds when the switch determinator 65 does not determine that the rotation speed Nmg suddenly changes (NO at S107), is the same as the procedure performed at S104 in FIG. 7. That is, at S115, the current estimator 40 calculates the d-axis current estimation value id_est, the q-axis current estimation value iq_est, and the V-phase current estimation value iv_est based on the d-axis current command value id*, the q-axis current command value iq*, the W-phase current detection value iw_sns, and the electrical angle θe. Then, the drive control process proceeds to S108.

A procedure performed at S116, to which the drive control process proceeds when the switch determinator 65 determines that the rotation speed Nmg suddenly changes (YES at S107), is the same as the procedure performed at S103 in FIG. 7. That is, at S116, the current detector 30 calculates the d-axis current detection value id_sns and the q-axis current detection value iq_sns by dq transformation based on the V-phase current detection value iv_sns, the W-phase current detection value iw_sns, and the electrical angle θe. Then, the drive control process proceeds to S111.

Thus, according to the seventh embodiment, in normal times where the sudden change does not occur, although the d-axis current estimation value id_est and the q-axis current estimation value iq_est are calculated, the d-axis current detection value id_sns and the q-axis current detection value iq_sns are not calculated. In contrast, in abnormal times where the sudden change occurs, although the d-axis current detection value id_sns and the q-axis current detection value iq_sns are calculated, the d-axis current estimation value id_est and the q-axis current estimation value iq_est are not calculated.

In such an approach, as compared to when both a set of the d-axis current estimation value id_est and the q-axis current estimation value iq_est and a set of the d-axis current detection value id_sns and the q-axis current detection value iq_sns are calculated, processing load is reduced so that resource can be saved.

However, assuming that a filter calculation with a delay is performed in the current estimator 40, when the d-axis current estimation value id_est and the q-axis current estimation value iq_est are not always calculated, errors in the d-axis current estimation value id_est and the q-axis current estimation value iq_est may become large immediately after the control mode is switched from the two-phase control to the one-phase control. As a result, the current control may become unstable. For example, this disadvantage can be overcome as follows. When an affirmative determination is made at S107, it is determined whether the rotation speed fluctuation ΔN is smaller than a second sudden change determination threshold A2 greater than the sudden change determination threshold An. If it is determined that the rotation speed fluctuation ΔN is smaller than the second sudden change determination threshold A2, it can be considered that the control mode will be returned to the one-phase control soon. Therefore, the estimator 40 starts to calculate the d-axis current estimation value id_est and the q-axis current estimation value iq_est. In such an approach, as compared to when both a set of the d-axis current detection value id_sns and the q-axis current detection value iq_sns and a set of the d-axis current estimation value id_est and the q-axis current estimation value iq_est are always calculated, processing load is reduced so that resource can be saved while stabilizing the current control immediately after the control mode is switched from the two-phase control to the one-phase control.

(Eighth Embodiment)

An eighth embodiment of the present disclosure is described below with reference to FIGS. 19, 20, and 21. The eighth embodiment differs from the preceding embodiments in the procedure performed in the current estimator 40, i.e., the procedure performed at S104 or S115 of the drive control process. A current estimation method according to the eighth embodiment can be used in any of the preceding embodiments.

In the eighth embodiment, like in the preceding embodiments, the W-phase as the first phase is referred to as a sensor phase, and the W-phase current detection value iw_sns is used.

Figure 19:
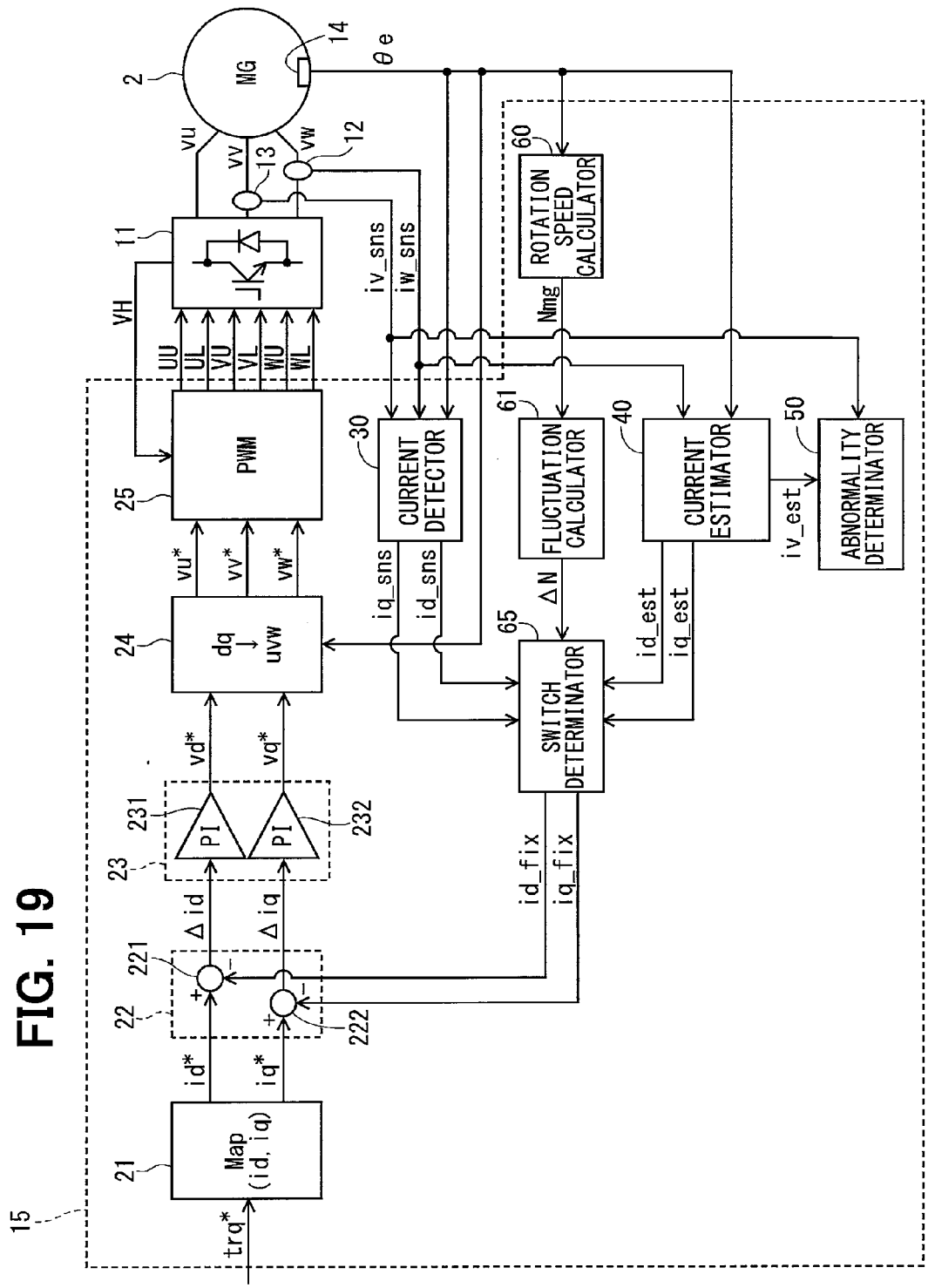
FIG. 19 is a block diagram of a controller according to an eighth embodiment of the present disclosure.

As shown in FIG. 19, according to the eighth embodiment, neither the d-axis current command value id* nor the q-axis current command value iq* is inputted to the current estimator 40. Thus, the current estimator 40 calculates the d-axis current estimation value id_est, the q-axis current estimation value iq_est, and the V-phase current estimation value iv_est without using the d-axis current command value id* and the q-axis current command value iq*.

Figure 20:
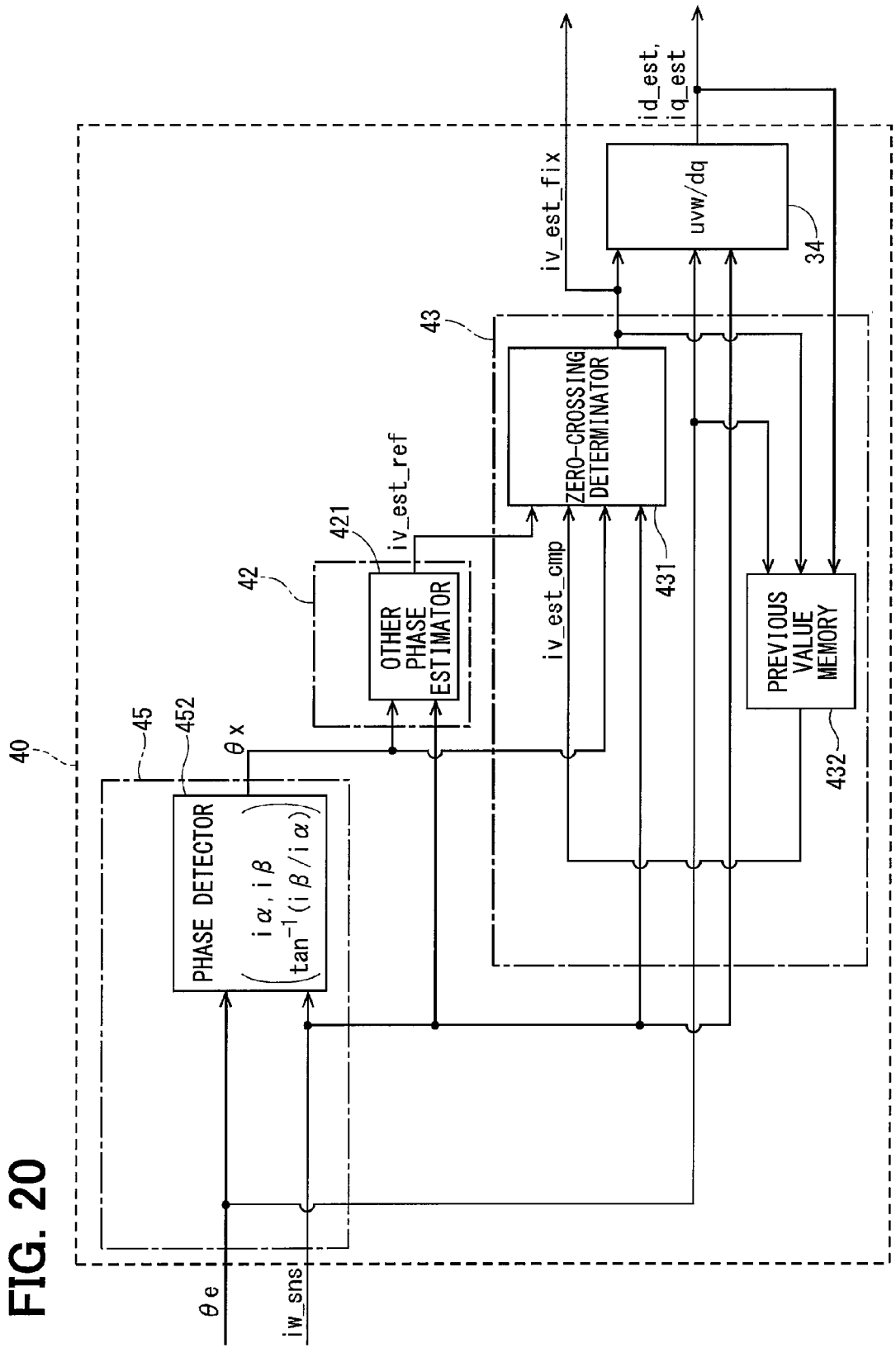
FIG. 20 is a block diagram of a current estimator according to the eighth embodiment.

As can be seen by comparing FIG. 4 and FIG. 20, according to the eighth embodiment, the current estimator 40 includes a sensor-phase reference current phase detector 45 instead of the sensor-phase reference current phase detector 41. Differences between the sensor-phase reference current phase detectors 41 and 45 are that neither the d-axis current command value id* nor the q-axis current command value iq* is inputted to the sensor-phase reference current phase detector 45 and that the sensor-phase reference current phase detector 45 has no inverse dq transformer. Therefore, a phase detector 452 of the sensor-phase reference current phase detector 45 calculates the sensor-phase reference current phase θx without using the d-axis current command value id* and the q-axis current command value iq*.

By the way, since the α-axis current iα and the β-axis current iβ have a relationship between a sine wave and a cosine wave, there is a phase difference of 90[°] between the α-axis current iα and the β-axis current iβ. From this point of view, the phase detector 452 calculates the β-axis current estimation value iβ_est based on a α-axis current differential value Δiα. The α-axis current differential value Δiα corresponds to a differential value of a α-axis current detection value recited in claims.

Firstly, the α-axis current detection value iα_sns is calculated from the formula (8) based on the W-phase current detection value iw_sns.

Further, the α-axis current differential value Δiα is calculated from the following formula (18) based on a change in the α-axis current detection value iα sns with respect to an electrical angle change Δθe [rad] between times at which the α-axis current detection value iα_sns is calculated, i.e., based on a difference between previous and present values of the α-axis current detection value iα sns.

$$\Delta i\alpha = -\{i\alpha(n) - i\alpha(n-1)\}/\Delta\theta e \quad (18)$$

In the formula (18), Δθe is a value expressed in units of radians and representing a change in the electrical angle θe from the previous current detection time to the present current detection time, iα(n) represents the present value of the α-axis current detection value iα_sns, and iα(n−1) represents the previous value of the α-axis current detection value iα_sns.

If the signs in the formula (18) are reversed depending on the definitions of the α-axis current iα and the β-axis current iβ, the signs can be changed to be suitable for the calculation of $\tan^{-1}(i\beta/i\alpha)$ in the formula (11) as necessary. Further, if the calculated sensor-phase reference current phase θx does not change synchronously with the W-phase current detection value iw_sns, a phase difference of 90[°] can be added to the calculated sensor-phase reference current phase θx in the same manner as described in the preceding embodiments.

Figure 21A:
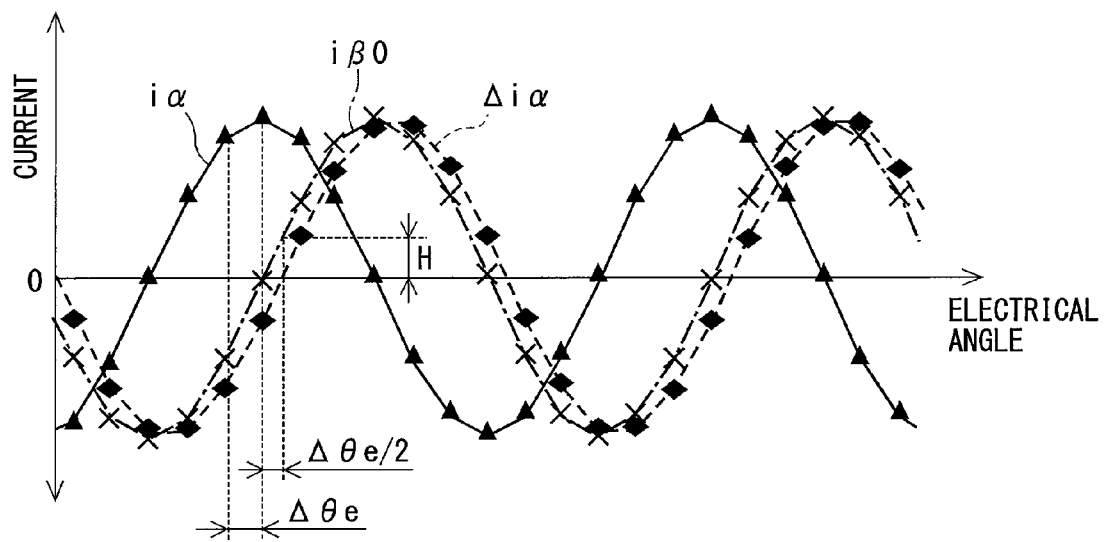
FIGS. 21A and 21B are diagrams for explaining a α-axis current and a β-axis current according to the eighth embodiment.
Figure 21B:
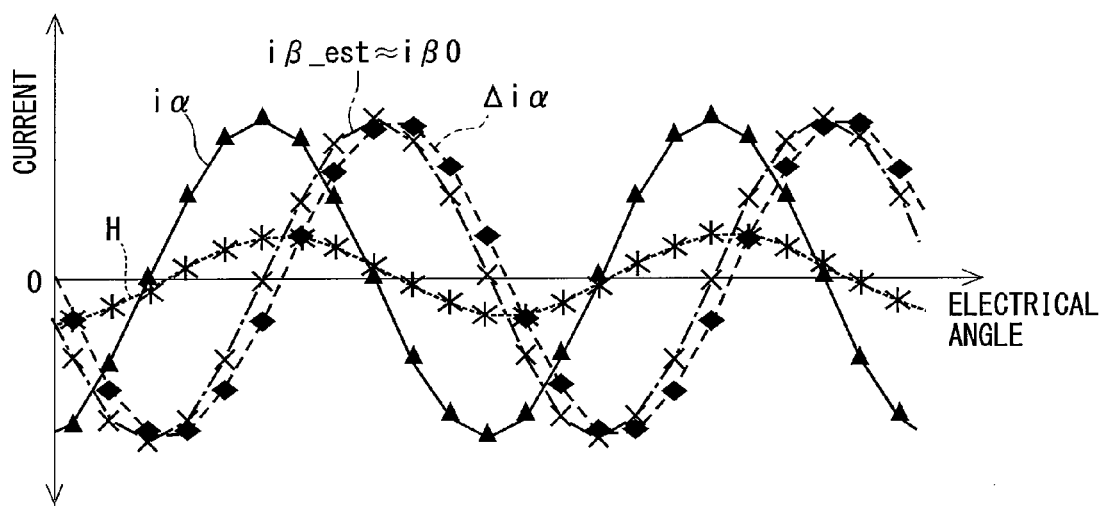

Next, a correction which is made when the β-axis current estimation value iβ_est is calculated based on the α-axis current differential value Δiα is described with reference to FIGS. 21A and 21B. In FIGS. 21A and 21B, a horizontal axis represents the electrical angle θ, and a mark on a waveform represents a time at which a current detection is performed. FIGS. 21A and 21B shows a case where the electrical angle change Δθe is π/6[rad]=30[°]. When the α-axis current iα and the β-axis current iβ are ideal sinusoidal waveforms, an actual β-axis current iβ0 is a differentiated waveform of the α-axis current iα and defined as a change in the α-axis current iα with respect to the infinitesimal electrical angle change Δθe.

However, in practice, the α-axis current differential value Δiα in the motor control apparatus 10 is a change in the α-axis current detection value iα sns with reference to the electrical angle change Δθe which is not infinitesimal. Therefore, as shown in FIG. 21A, the waveform of the α-axis current differential value Δiα is delayed by a half of the electrical angle change Δθe, i.e., delayed by Δθe/2, with respect to the waveform of the actual β-axis current iβ0.

For the above reason, when the β-axis current estimation value iβ_est is calculated based on the α-axis current differential value Δiα, it is preferable that a correction value H should be calculated from the following formula (19) and the β-axis current estimation value iβ_est should be calculated by adding the correction value H to the α-axis current differential value Δiα as shown in the following formula (20).

$$H = \frac{i\alpha(n-1) + i\alpha(n)}{2} \times \frac{\Delta\theta e}{2} \quad (19)$$

$$i\beta\_est = \Delta i\alpha + H \quad (20)$$

As can be understood from the formula (19), the correction value H is calculated by multiplying the half (i.e., Δθe/2) of the electrical angle change Δθe by an average between the present value iα(n) and the previous value iα(n−1) of the α-axis current detection value iα_sns.

As shown in FIG. 21B, a waveform of the β-axis current estimation value iβ_est calculated from the formula 20 substantially coincides with the waveform of the actual β-axis current iβ0.

Since the β-axis current estimation value iβ_est is calculated accurately, the detection accuracy of the sensor-phase reference current phase θx is improved. Accordingly, the d-axis current estimation value id_est and the q-axis current estimation value iq_est can be calculated accurately.

According to the eighth embodiment, the α-axis coincides with the W-phase, and the β-axis is orthogonal to the α-axis.

Further, the current estimator 40 calculates the d-axis current estimation value id_est and the q-axis current estimation value iq_est based on the α-axis current detection value iα sns, which is calculated based on the W-phase current detection value iw_sns, and the β-axis current estimation value iβ_est, which is calculated based on the α-axis current differential value Δiα. More specifically, the d-axis current estimation value id_est and the q-axis current estimation value iq_est are calculated based on the α-axis current detection value iα_sns and the sensor-phase reference current phase θx, which is with respect to the W-phase and calculated based on the β-axis current estimation value iβ_est, which is calculated based on the α-axis current differential value Δiα.

In such an approach, the d-axis current estimation value id_est and the q-axis current estimation value iq_est are calculated accurately. Thus, the responsiveness in the one-phase control can be improved.

Further, according to the eighth embodiment, the d-axis current estimation value id_est and the q-axis current estimation value iq_est are calculated without using the d-axis current command value id* and the q-axis current command value iq*. Therefore, for example, like a rectangular wave control by a phase control of a rectangular wave pulse based on changes in a torque estimation value trq_est and the torque command value trq*, the eighth embodiment can be applied to a torque feedback system that does not use the d-axis current command value id* and the q-axis current command value iq*.

By the way, the waveform of the α-axis current detection value iα_sns may be distorted when the switching devices of the inverter 11 are turned ON and OFF (hereinafter referred to as "at the switching time"). Therefore, it is preferable that the α-axis current differential value Δiα should be calculated based the α-axis current detection values iα_sns obtained at middle times between the switching times in addition to based on the α-axis current detection values iα_sns obtained at the switching time. In such an approach, the d-axis current estimation value id_est and the q-axis current estimation value iq_est can be calculated further accurately.

(Ninth Embodiment)

A ninth embodiment of the present disclosure is described below with reference to FIG. 22.

According to the ninth embodiment, like the eighth embodiment, the d-axis current estimation value id_est and the q-axis current estimation value iq_est are calculated without using the d-axis current command value id* and the q-axis current command value iq*. Specifically, according to the ninth embodiment, based on a fact that the W-phase axis relatively rotates on the dq-axis plane as a rotating coordinate system, a W-phase estimation error Δiw is integrated so that the d-axis current estimation value id_est and the q-axis current estimation value iq_est can gradually approach the d-axis current actual value id and the q-axis current actual value iq, respectively. Thus, the d-axis current estimation value id_est and the q-axis current estimation value iq_est can be calculated accurately.

Figure 22:
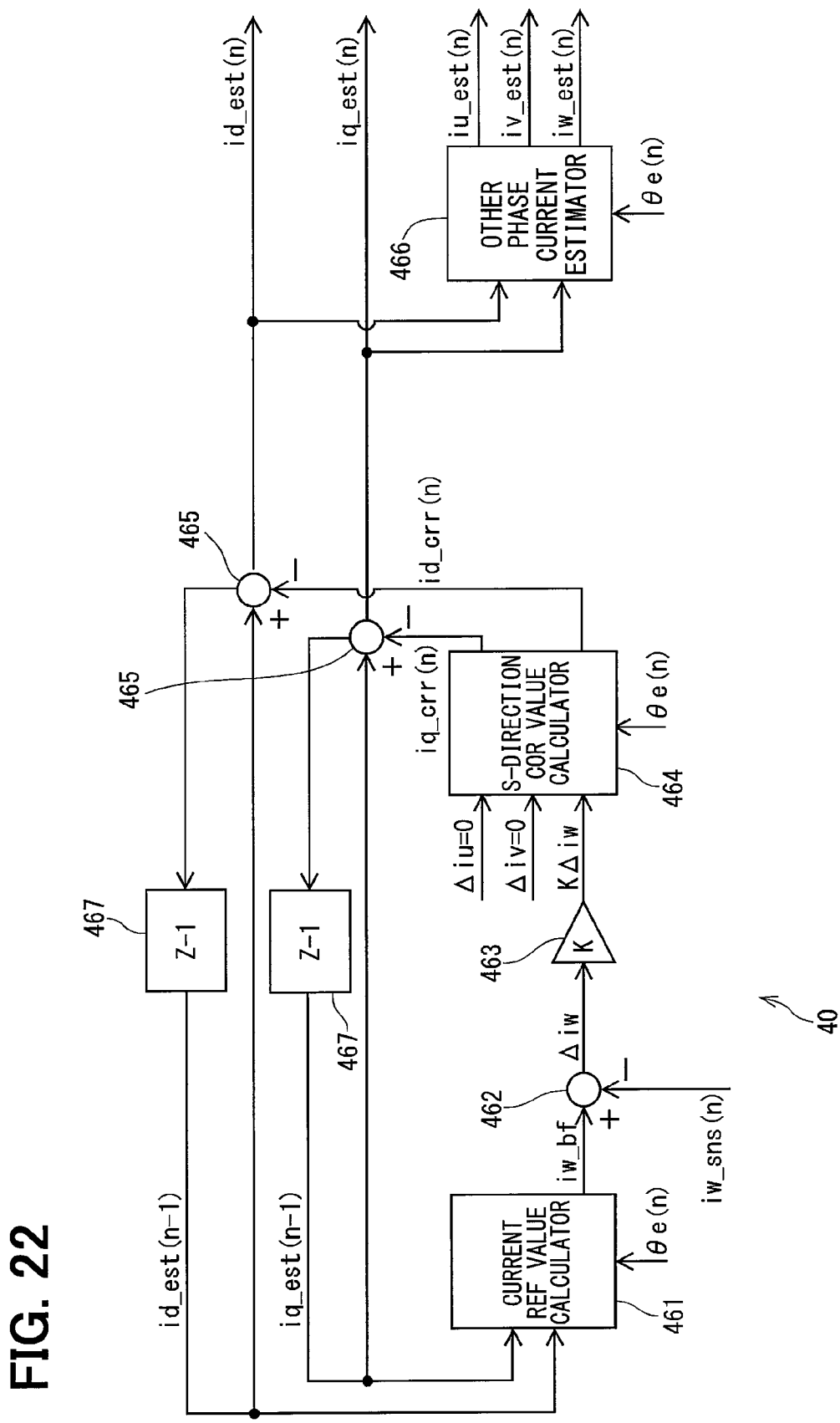
FIG. 22 is a block diagram of a current estimator according to a ninth embodiment of the present disclosure.

As shown in FIG. 22, the current estimator 40 includes a current reference value calculator 461, a subtractor 462, a gain corrector 463, a sensor phase direction correction value calculator 464, a subtractor 465, an other phase current estimator 466, and a delay device 467. Hereinafter, a current estimation process performed based on the presently-inputted W-phase current detection value iw_sns is referred to as the "nth process", the presently-inputted W-phase current detection value iw_sns is referred to as the "iw_sns(n)", the presently-inputted electrical angle θe is referred to as the "θe(n)", and the current estimation value obtained by the nth process is referred to as the "i#_est(n), where # represents d, q, u, v, and w.

The d-axis current estimation value id_est(n−1) and the q-axis current estimation value iq_est(n−1) are inputted to the current reference value calculator 461, and a current reference value iw_bf which is a component of the W-phase as the sensor-phase is calculated by inverse dq transformation based on the d-axis current estimation value id_est(n−1), the q-axis current estimation value iq_est(n−1), and the electrical angle θe(n).

The subtractor 462 calculates the W-phase estimation error Δiw which is a difference between the current reference value iw_bf and the W-phase current detection value iw_sns(n).

The gain corrector 463 calculates a corrected error KΔiw by multiplying the W-phase estimation error Δiw by a gain K. The gain K serves as a low-pass filter to smooth changes in the d-axis current estimation value id_est and the q-axis current estimation value iq_est as described in detail later. A value of the gain K is represented by 1/Klpf, where Klpf represents the number of processes performed by the low-pass filter with a predetermined time constant (i.e., a time constant/a process period). The gain K is greater than zero and less than one (i.e., 0<K<1).

The sensor phase direction correction value calculator 464 calculates a sensor-phase direction d-axis correction value id_crr(n) and a sensor-phase direction q-axis correction value iq_crr(n) by performing dq transformation of the corrected error KΔiw under conditions that Δiu=0, and Δiv=0. According to the ninth embodiment, the sensor-phase direction d-axis correction value id_crr(n) and the sensor-phase direction q-axis correction value iq_crr(n) correspond to a correction vector. The sensor-phase direction d-axis correction value id_crr(n) and the sensor-phase direction q-axis correction value iq_crr(n) are hereinafter sometimes referred to as the "correction vector (Δid, Δiq)".

It is noted that the correction vector is always represented as a set of (Δid, Δiq) and differ from the d-axis current deviation Δid and the q-axis current deviation Δiq, which are inputted, for example, to the PI calculator 23 (refer to, for example, FIG. 3) in a current feedback system.

The subtractor 465 calculates the d-axis current estimation value id_est(n) by subtracting the sensor-phase direction d-axis correction value id_crr(n) from the d-axis current estimation value id_est(n−1) which was fed back through the delay device 467. The subtractor 465 also calculates the q-axis current estimation value iq_est(n) by subtracting the sensor-phase direction q-axis correction value iq_crr(n) from the q-axis current estimation value iq_est(n−1) which was fed back through the delay device 467. The subtraction of the sensor-phase direction d-axis correction value id_crr(n) from the d-axis current estimation value id_est(n−1) and the subtraction of the sensor-phase direction q-axis correction value iq_crr(n) from the q-axis current estimation value iq_est(n−1) in the subtractor 465 correspond to an integration of the correction vector on the dq-axis plane.

The calculated d-axis current estimation value id_est(n) and q-axis current estimation value iq_est(n) are fed back to the current reference value calculator 461 through the delay device 467.

The other phase current estimator 466 calculates three-phase current estimation values iu_est(n), iv_est(n), and iw_est(n) by performing dq transformation of the d-axis current estimation value id_est(n) and the q-axis current estimation value iq_est(n) based on the electrical angle θe(n). It is not always essential that all of the three-phase current estimation values iu_est(n), iv_est(n), and iw_est(n) are calculated. For example, the other phase current estimator 466 can calculate only the V-phase current estimation value iv_est(n), if only the V-phase current estimation value iv_est(n) is necessary.

The current estimation process according to the ninth embodiment can be given by the following recurrence formula (21). In the formula (21), θw(n) represents θe(n)+120 [°], K cos(θw(n))Δiw represents the sensor-phase direction d-axis correction value id_crr(n), and −K sin(θw(n))Δiw represents the sensor-phase direction q-axis correction value iq_crr(n).

$$\begin{bmatrix} \text{id\_est}(n) \\ \text{iq\_est}(n) \end{bmatrix} = \begin{bmatrix} \text{id\_est}(n-1) \\ \text{iq\_est}(n-1) \end{bmatrix} - K \begin{bmatrix} \cos(\theta w(n)) \\ -\sin(\theta w(n)) \end{bmatrix} \Delta iw \quad (21)$$

Figure 23A:
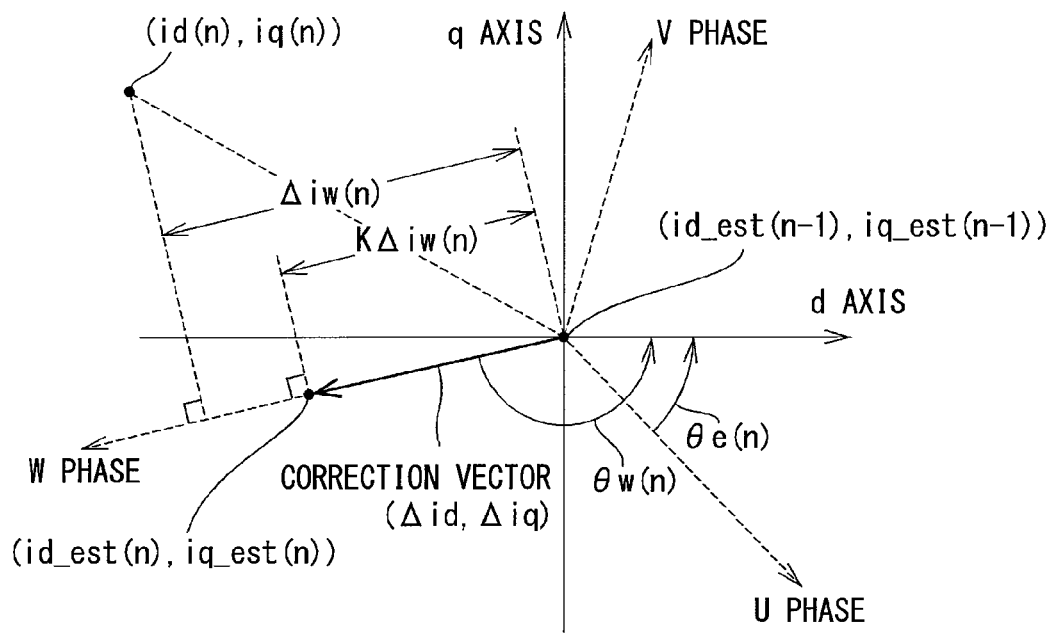
FIGS. 23A and 23B are vector diagrams for explaining current estimation according to the ninth embodiment.

The recurrence formula (21) can be expressed by a vector diagram shown in FIG. 23A.

Figure 23B:
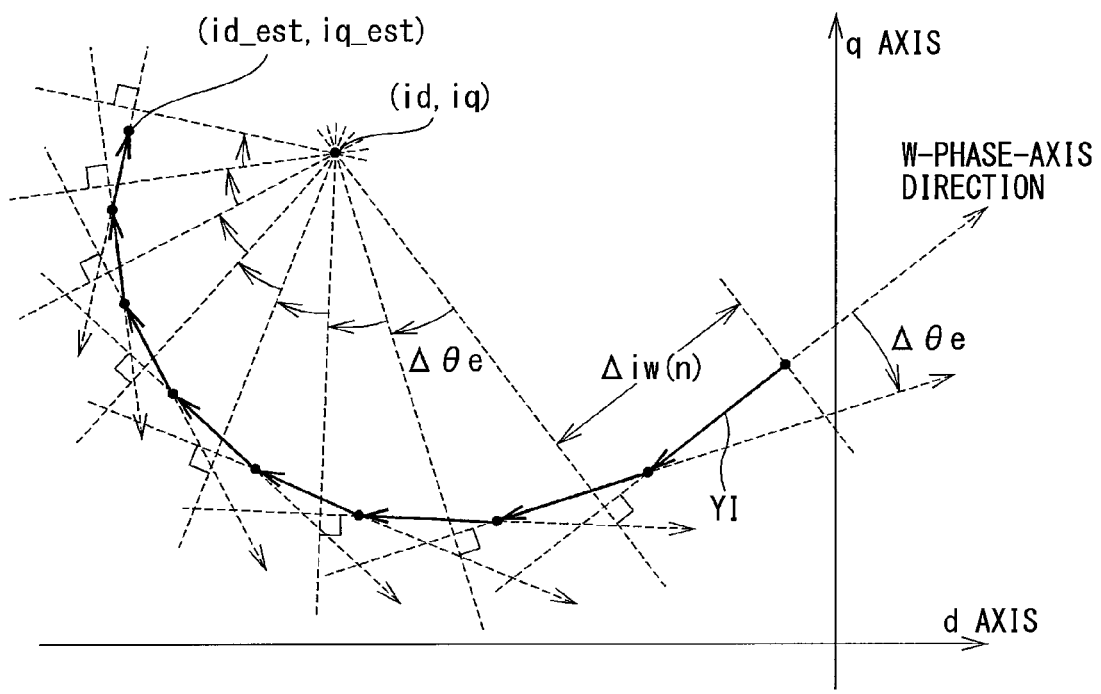

As described above, according to the ninth embodiment, the gain K is set so that 0<K<1. Therefore, as shown in FIG. 23B, when the correction vector (Δid, Δiq) indicated by an arrow YI is integrated based on the fact that the W-phase axis relatively rotates on the dq-axis plane as a rotating coordinate system, the d-axis current estimation value id_est and the q-axis current estimation value iq_est gradually approach the d-axis current actual value id and the q-axis current actual value iq, respectively.

The gain K is a filter factor for determining a speed at which the d-axis current estimation value id_est and the q-axis current estimation value iq_est respectively approach the d-axis current actual value id and the q-axis current actual value iq. When the gain K is too large, i.e., when the gain K is relatively close to 1, an error vector Δie, which is defined as a difference between the d-axis current estimation value id_est and the q-axis current estimation value iq_est and the d-axis current actual value id and the q-axis current actual value iq, becomes close to orthogonal to the W-phase axis. As a result, since the error vector Δie moves in a circumferential direction around the d-axis current actual value id and the q-axis current actual value iq to draw a spiral, it is less likely that the d-axis current estimation value id_est and the q-axis current estimation value iq_est respectively approach the d-axis current actual value id and the q-axis current actual value iq. The value of the gain K can be set in consideration of the above point so that 0<K<1 and that the d-axis current estimation value id_est and the q-axis current estimation value iq_est can easily approach the d-axis current actual value id and the q-axis current actual value iq, respectively.

According to the ninth embodiment, the d-axis current estimation value id_est and the q-axis current estimation value iq_est are calculated by integrating the sensor-phase direction d-axis correction value id_crr and the sensor-phase direction q-axis correction value iq_crr on the dq-axis plane, which are calculated based on the W-phase current detection value iw_sns and the current reference value iw_bf which is the W-phase component of the previously-calculated d-axis current estimation value id_est and q-axis current estimation value iq_est.

As described above, the d-axis current estimation value id_est and the q-axis current estimation value iq_est are calculated by using the sensor-phase direction d-axis correction value id_crr and the sensor-phase direction q-axis correction value iq_crr, which are information changing with rotation of the AC motor 2. Thus, since another dimension is compensated in addition to the W-phase current detection value iw_sns, a two-dimensional quantity is accurately estimated so that vector control on a two dimension can be accurately performed. Accordingly, the d-axis current estimation value id_est and the q-axis current estimation value iq_est are calculated accurately. Therefore, the responsiveness in the one-phase control can be improved.

(Tenth Embodiment)

A tenth embodiment of the present disclosure is described below with reference to FIG. 24. The tenth embodiment corresponds to a modification of the ninth embodiment.

In the ninth embodiment, the sensor-phase direction correction vector (Δid, Δiq) is integrated on the dq-axis plane to improve convergence of the d-axis current estimation value id_est and the q-axis current estimation value iq_est to the d-axis current actual value id and the q-axis current actual value iq, respectively. In other wards, in the ninth embodiment, the d-axis current estimation value id_est and the q-axis current estimation value iq_est are corrected in a direction of the W-phase as the sensor-phase. In contrast, in the tenth embodiment, the d-axis current estimation value id_est and the q-axis current estimation value iq_est are corrected also in a direction orthogonal to the sensor-phase to further improve the convergence of the d-axis current estimation value id_est and the q-axis current estimation value iq_est to the d-axis current actual value id and the q-axis current actual value iq, respectively.

Figure 24:
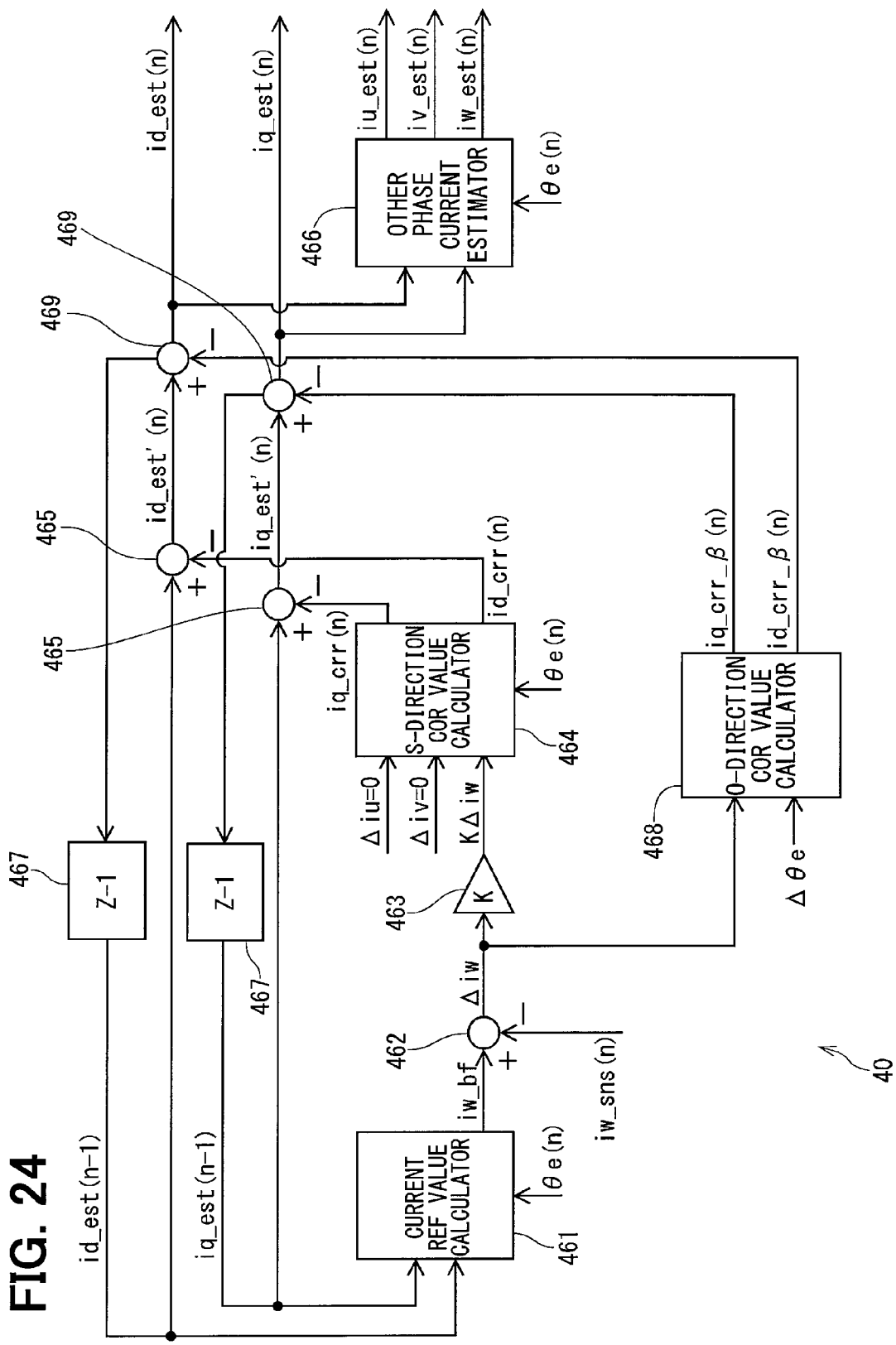
FIG. 24 is a block diagram of a current estimator according to an eighth embodiment of the present disclosure.

As shown in FIG. 24, compared to the current estimator 40 according to the ninth embodiment, the current estimator 40 according to the tenth embodiment further includes an orthogonal direction correction value calculator 468 and a subtractor 469.

The sensor phase direction correction value calculator 464 calculates the sensor-phase direction d-axis correction value id_crr(n) and the sensor-phase direction q-axis correction value iq_crr(n).

The subtractor 465 calculates a d-axis current provisional estimation value id_est'(n), which is corrected in the W-phase direction, by subtracting the sensor-phase direction d-axis correction value id_crr(n) from the d-axis current estimation value id_est(n−1) which was fed back through the delay device 467. Likewise, the subtractor 465 calculates a q-axis current provisional estimation value iq_est(n), which is corrected in the W-phase direction, by subtracting the sensor-phase direction q-axis correction value iq_crr(n) from the q-axis current estimation value iq_est(n−1) which was fed back through the delay device 467. The d-axis current provisional estimation value id_est'(n) and the q-axis current provisional estimation value iq_est'(n) are the same as the d-axis current estimation value id_est(n) and the q-axis current estimation value iq_est(n) of the ninth embodiment, respectively.

The orthogonal direction correction value calculator 468 calculates a p-axis estimation error Δiβ, which is a component orthogonal to the α-axis coinciding with the sensor-phase, from the following formula (22) Further, from the following formula (23), the orthogonal direction correction value calculator 468 calculates an orthogonal direction d-axis correction value id_crr_β(n) and an orthogonal direction q-axis correction value iq_crr_β(n) by dq converion using the β-axis estimation error Δiβ.

The subtractor 469 calculates the d-axis current estimation value id_est(n) by subtracting the orthogonal direction d-axis correction value id_crr_β(n) from the d-axis current provisional estimation value id_est'(n). Likewise, the subtractor 469 calculates the q-axis current estimation value iq_est(n) by subtracting the orthogonal direction q-axis correction value iq_crr_β(n) from the q-axis current provisional estimation value iq_est'(n).

$$\Delta i\beta = \frac{\cos\Delta\theta e}{\sin\Delta\theta e}\left\{\Delta iw(n) - \frac{1}{\cos\Delta\theta e}(1-K)\Delta iw(n-1)\right\} \quad (22)$$

$$\begin{bmatrix} \text{id\_crr\_}\beta(n) \\ \text{iq\_crr\_}\beta(n) \end{bmatrix} = K\begin{bmatrix} \cos(\theta w(n) + 90°) \\ -\sin(\theta w(n) + 90°) \end{bmatrix}\Delta i\beta \quad (23)$$

The current estimation process according to the tenth embodiment can be given by the following recurrence formula (24).

$$\begin{bmatrix} \text{id\_est}(n) \\ \text{iq\_est}(n) \end{bmatrix} = \begin{bmatrix} \text{id\_est}(n-1) \\ \text{iq\_est}(n-1) \end{bmatrix} - K\begin{bmatrix} \cos(\theta w(n)) \\ -\sin(\theta w(n)) \end{bmatrix}\Delta iw - \begin{bmatrix} \text{id\_crr\_}\beta(n) \\ \text{iq\_crr\_}\beta(n) \end{bmatrix} \quad (24)$$

Figure 25:
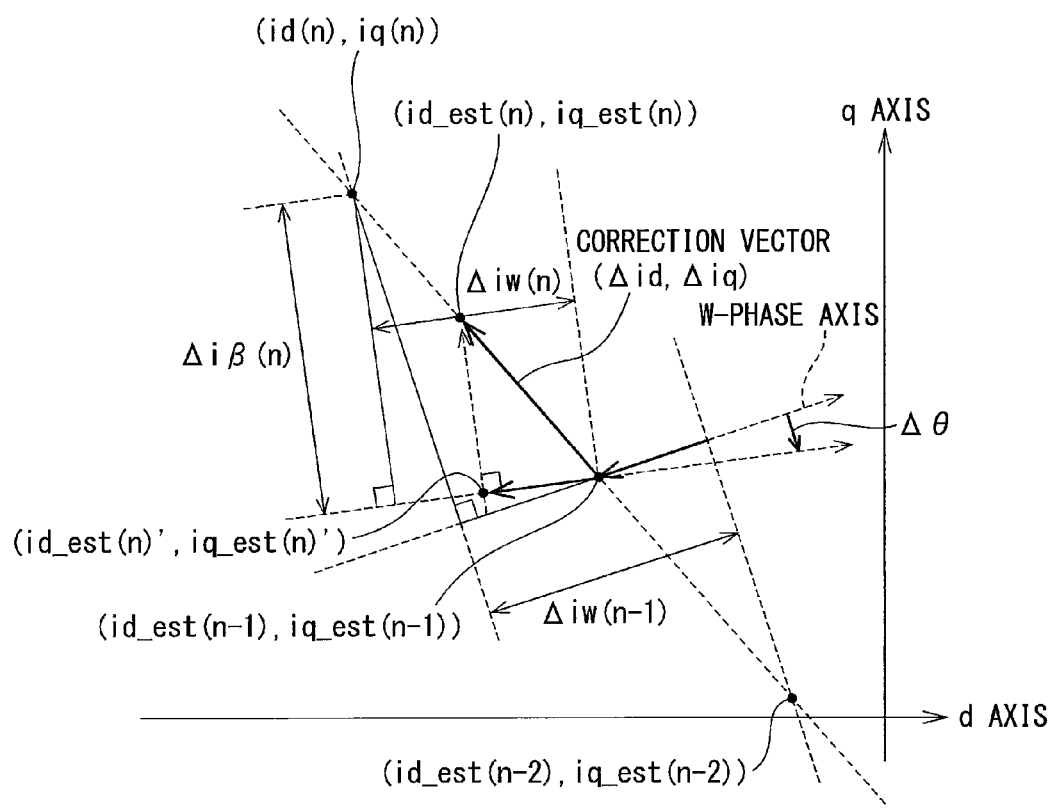
FIG. 25 is a vector diagram for explaining current estimation according to a tenth embodiment of the present disclosure.

The recurrence formula (24) can be expressed by a vector diagram shown in FIG. 25. In FIG. 25, a resultant vector of the sensor-phase direction d-axis correction value iq_crr(n) and the sensor-phase direction q-axis correction value iq_crr(n), and the orthogonal direction d-axis correction value id_crr_β (n) and the orthogonal direction q-axis correction value iq_crr_β(n) is expressed as a correction vector (Δid, Δiq).

As shown in FIG. 25, according to the ninth embodiment, the current estimator 40 calculates the d-axis current estimation value id_est and the q-axis current estimation value iq_est are calculated by integrating the correction vector (Δid, Δiq) on the dq-axis plane, which is a resultant vector of the sensor-phase direction d-axis correction value id_crr and the sensor-phase direction q-axis correction value iq_crr on the dq-axis plane, which are calculated based on the W-phase current detection value iw_sns and the current reference value iw_bf which is the W-phase component of the previously-calculated d-axis current estimation value id_est and q-axis current estimation value iq_est, and the orthogonal direction d-axis correction value id_crr_β(n) and the orthogonal direction q-axis correction value iq_crr_β(n). In other words, according to the tenth embodiment, the correction vector (Δid, Δiq) is integrated with respect to the previously-calculated the d-axis current estimation value id_est(n−1) and q-axis current estimation value iq_est(n−1) on the dq-axis plane.

Thus, the d-axis current estimation value id_est and the q-axis current estimation value iq_est are calculated accurately by using the orthogonal direction d-axis correction value id_crr_β(n) and the orthogonal direction q-axis correction value iq_crr_β(n) in addition to the sensor-phase direction d-axis correction value id_crr and the sensor-phase direction q-axis correction value iq_crr, which are information changing with rotation of the AC motor 2.

According to the tenth embodiment, the resultant vector of the sensor-phase direction d-axis correction value iq_crr(n) and the sensor-phase direction q-axis correction value iq_crr (n), and the orthogonal direction d-axis correction value id_crr_β(n) and the orthogonal direction q-axis correction value iq_crr_β(n) correspond to a correction vector.

The subtraction of the sensor-phase direction d-axis correction value id_crr(n) in the subtractor 465 and the orthogonal direction d-axis correction value id_crr_β(n) in the subtractor 469 from the d-axis current estimation value id_est(n−1), and the subtraction of the sensor-phase direction d-axis correction value id_crr(n) in the subtractor 465 and the orthogonal direction q-axis correction value iq_crr_β(n) in the subtractor 469 from the d-axis current estimation value id_est(n−1) correspond to an integration of the correction vector on the dq-axis plane.

(Eleventh Embodiment)

Figure 26:
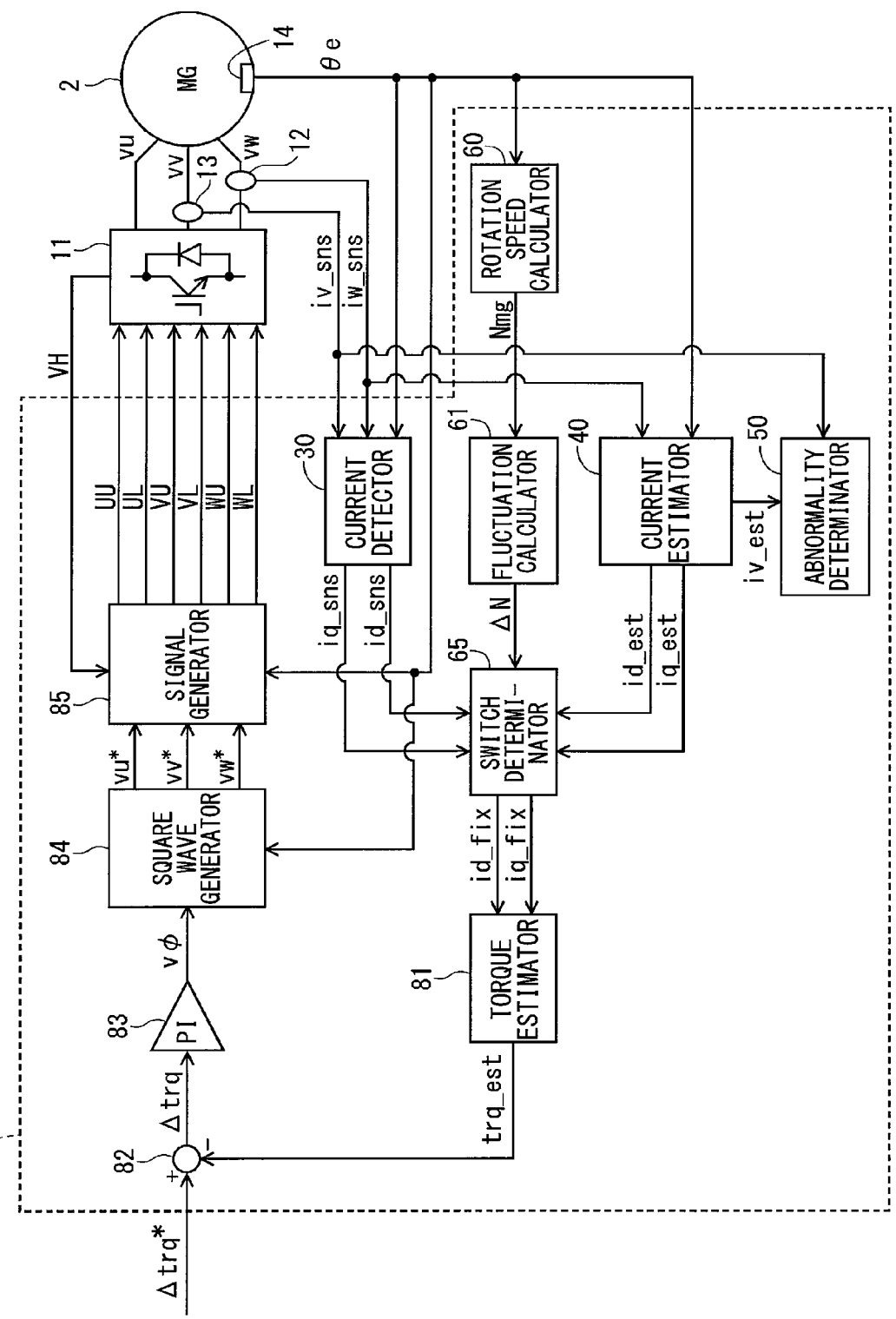
FIG. 26 is a block diagram of a controller according to an eleventh embodiment of the present disclosure.

An eleventh embodiment of the present disclosure is described below with reference to FIGS. 26 and 27.

In the preceding embodiments, a current feedback control system is mainly described in which the d-axis current fixed value id_fix and the q-axis current fixed value iq_fix are fed back, and the d-axis voltage command value vd* and the q-axis voltage command value vq* are calculated based on the feedback d-axis current fixed value id_fix, the feedback q-axis current fixed value iq_fix, the d-axis current command value id*, and the q-axis current command value iq*.

In the current feedback control system, although a torque ripple is reduced, voltage utilization is low as disclosed in JP-2010-124544. According to the eleventh embodiment, as shown in FIG. 26, a torque feedback control system is employed to increase voltage utilization.

For example, the torque feedback control system according to the eleventh embodiment is implemented as a square wave control mode. In the torque feedback control system, one pulse of a square wave with a duty ratio of 50% is applied to the AC motor 2. Thus, voltage utilization in the torque feedback control system is increased compared to that in an overmodulation PWM control mode.

A controller 16 according to the eleventh embodiment is described in detail with reference to FIG. 26.

The controller 16 includes a torque estimator 91, a subtractor 82, a PI calculator 83, a squire (rectangular) wave generator 84, and a signal generator 85 in addition to the current detector 30, the current estimator 40, the abnormality determinator 50, the rotation speed calculator 60, the fluctuation calculator 61, and the switch determinator 65.

The torque estimator 81 calculates a torque estimation value trq_est based on the d-axis current fixed value id_fix and the q-axis current fixed value iq_fix by using a map, a formula, or the like. The calculated torque estimation value trq_est is fed back to the subtractor 82. The subtractor 82 calculates a torque deviation Δtrq. The torque deviation Δtrq is a difference between the torque estimation value trq_est, which is fed back from the torque estimator 81, and the torque command value trq*.

The PI calculator 83 calculates a voltage command phase vφ as a voltage command by PI calculation so that the torque deviation Δtrq can converge to zero, thereby causing the torque estimation value trq_est to follow the torque command value trq.

The squire wave generator 84 generates a square (rectangular) wave based on the voltage command phase vφ and the electrical angle θe and outputs a U-phase voltage command value vu*, a V-phase voltage command value vv*, and a W-phase voltage command value vw*.

The signal generator 85 calculates driving signals UU, UL, VU, VL, WU, and WL based on the U-phase voltage command value vu*, the V-phase voltage command value vv*, the W-phase voltage command value vw*, and an inverter input voltage VH applied to the inverter 11.

The switching devices of the inverter 11 are turned ON and OFF based on the driving signals UU, UL, VU, VL, WU, and WL so that three-phase AC voltages vu, vv, and vw can be generated. When the three-phase AC voltages vu, vv, and vw are applied to the AC motor 2, the AC motor 2 outputs torque corresponding to the torque command value trq*.

In the square wave control mode, the voltage command is calculated without using the d-axis current command value id* and the q-axis current command value iq*. Therefore, it is preferable that the current estimator 40 should calculate the d-axis current estimation value id_est and the q-axis current estimation value iq_est by the methods which are described in the eighth to tenth embodiments and don't use the d-axis current command value id* and the q-axis current command value iq*. Alternatively, although the voltage command can be calculated without using the d-axis current command value id* and the q-axis current command value iq*, the d-axis current command value id* and the q-axis current command value iq can be calculated. In this case, the current estimator 40 can calculate the d-axis current estimation value id_est and the q-axis current estimation value iq_est by the method which is described in the first embodiment and uses the d-axis current command value id* and the q-axis current command value iq*.

The switch determinator 65 performs a determination procedure in the same manner as discussed in the first embodiment.

Next, a drive control process according to the eleventh embodiment is described with reference to a flowchart shown in FIG. 27.

Figure 27:
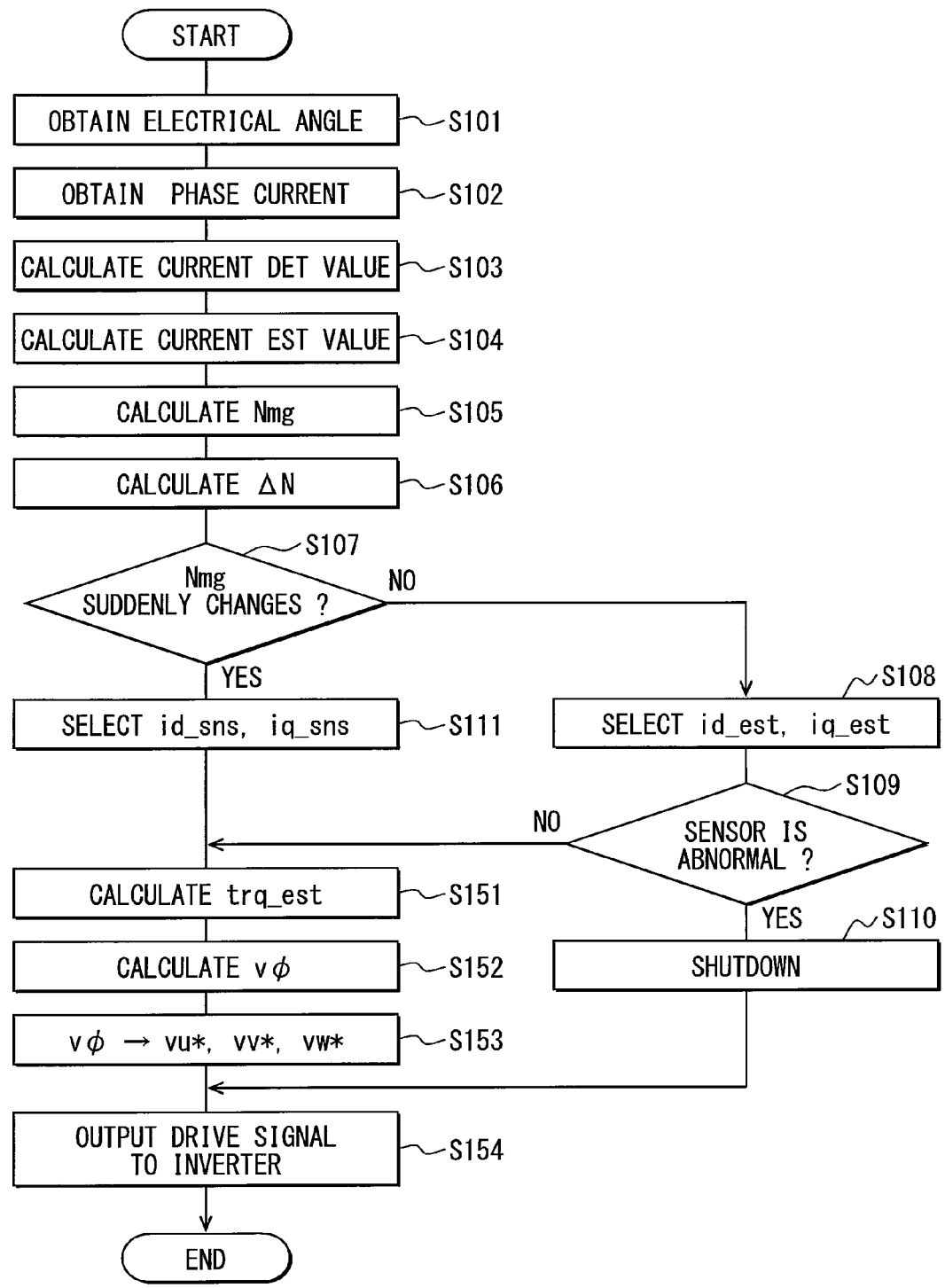
FIG. 27 is a flowchart of a drive control process according to the eleventh embodiment.

A difference between FIGS. 7 and 27 is that S112-S114 in FIG. 7 are replaced with S151-S154. Therefore, S151-S154 are described below.

At S151, to which the drive control process proceeds after S111 or when a negative determination is made at S109, the torque estimator 81 calculates the torque estimation value trq_est based on the d-axis current fixed value id_fix and the q-axis current fixed value iq_fix.

At S152, the subtractor 82 calculates the torque deviation Δtrq based on the torque command value trq* and the feedback torque estimation value trq_est. Further, at S152, the PI calculator 83 calculates the voltage command phase vφ by PI calculation so that the torque deviation Δtrq can converge to zero.

At S153, the squire wave generator 84 calculates the three-phase voltage command values vu*, vv*, and vw* based on the voltage command phase vφ.

At S154, the signal generator 85 calculates and outputs the driving signals UU, UL, VU, VL, WU, and WL to the inverter 11 based on the three-phase voltage command values vu*, vv*, and vw* and the inverter input voltage VH.

As described above, according to the eleventh embodiment, the torque estimator 81 for calculating the torque estimation value trq_est is included.

The PI calculator 83 calculates the voltage command phase vφ based on the feedback torque estimation value trq_est and the torque command value trq* related to driving of the AC motor 2.

In this way, the torque feedback control system implemented as the square wave control mode is employed so that voltage utilization can be increased. Since the torque estimation value trq_est to be fed back is estimated from the d-axis current fixed value id_fix and the q-axis current fixed value iq_fix, the torque feedback control system can be broadly interpreted as the current feedback control.

Correspondence between terms used in the eleventh embodiment and claims is as follows.

The torque estimator 81 corresponds to a torque estimator. The PI calculator 83 corresponds to a voltage command value calculator.

S151 corresponds to a procedure as a function of a torque estimator. S152 corresponds to a procedure as a function of a voltage command value calculator.

The torque command value trq* corresponds to a drive command value and a torque command value. The voltage command phase vφ corresponds to a voltage command value.

(Twelfth Embodiment)

A twelfth embodiment of the present disclosure is described below with reference to FIG. 28. The twelfth embodiment differs from the eleventh embodiment in a procedure performed in the switch determinator 65.

Figure 28:
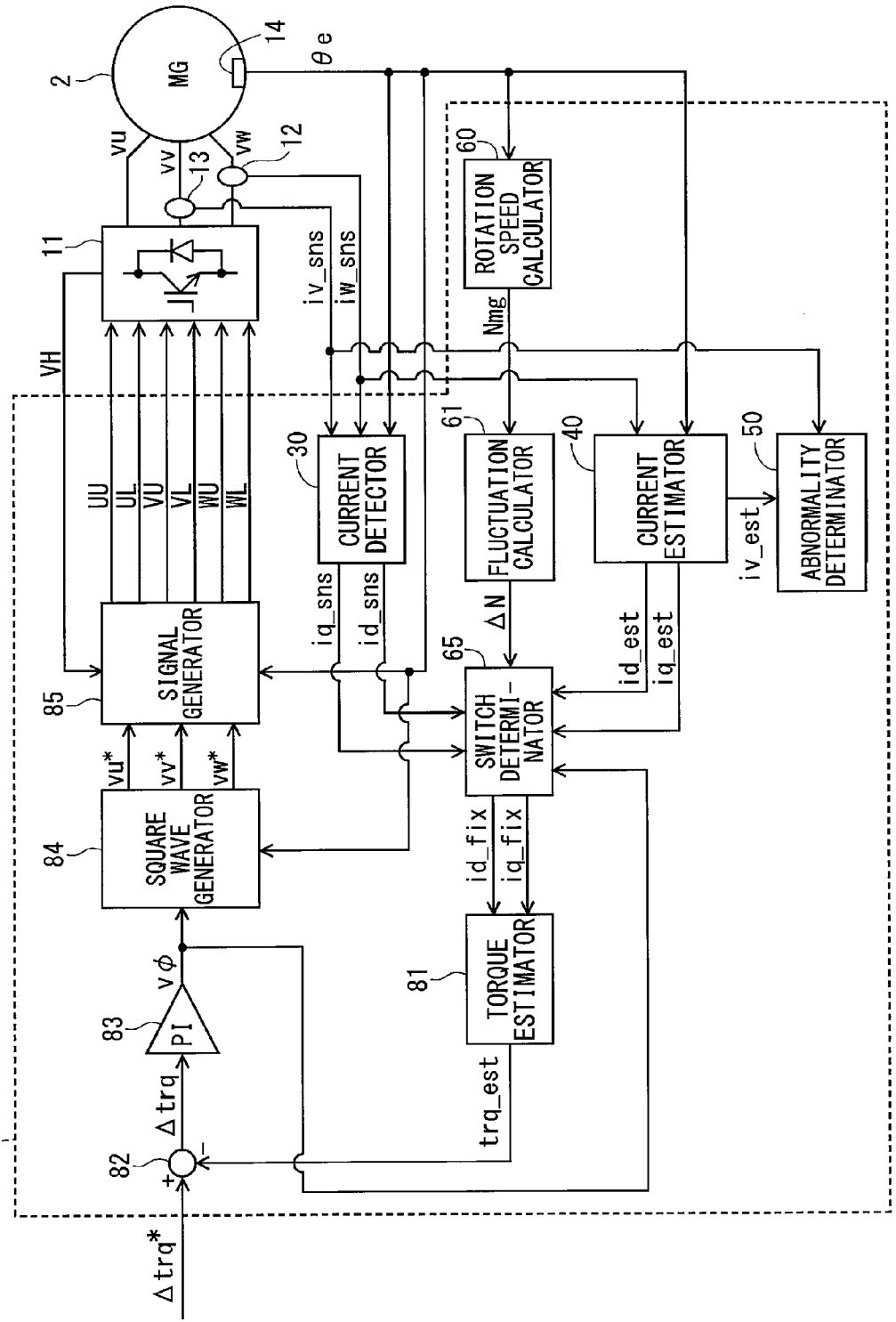
FIG. 28 is a block diagram of a controller according to a twelfth embodiment of the present disclosure.

As shown in FIG. 28, according to the twelfth embodiment, the switch determinator 65 determines whether the sudden change occurs based on whether the voltage command phase vφ suddenly changes in addition to whether the rotation speed fluctuation ΔN suddenly changes. That is, unless the voltage command phase vφ as a calculation result suddenly changes, the three-phase voltage command values vu*, vv*, and vw* applied to the AC motor 2 do not suddenly change. Therefore, unless the voltage command phase vφ suddenly changes, suitable responsiveness can be achieved even in the one-phase control using the d-axis current estimation value id_est and the q-axis current estimation value iq_est.

Figure 14:
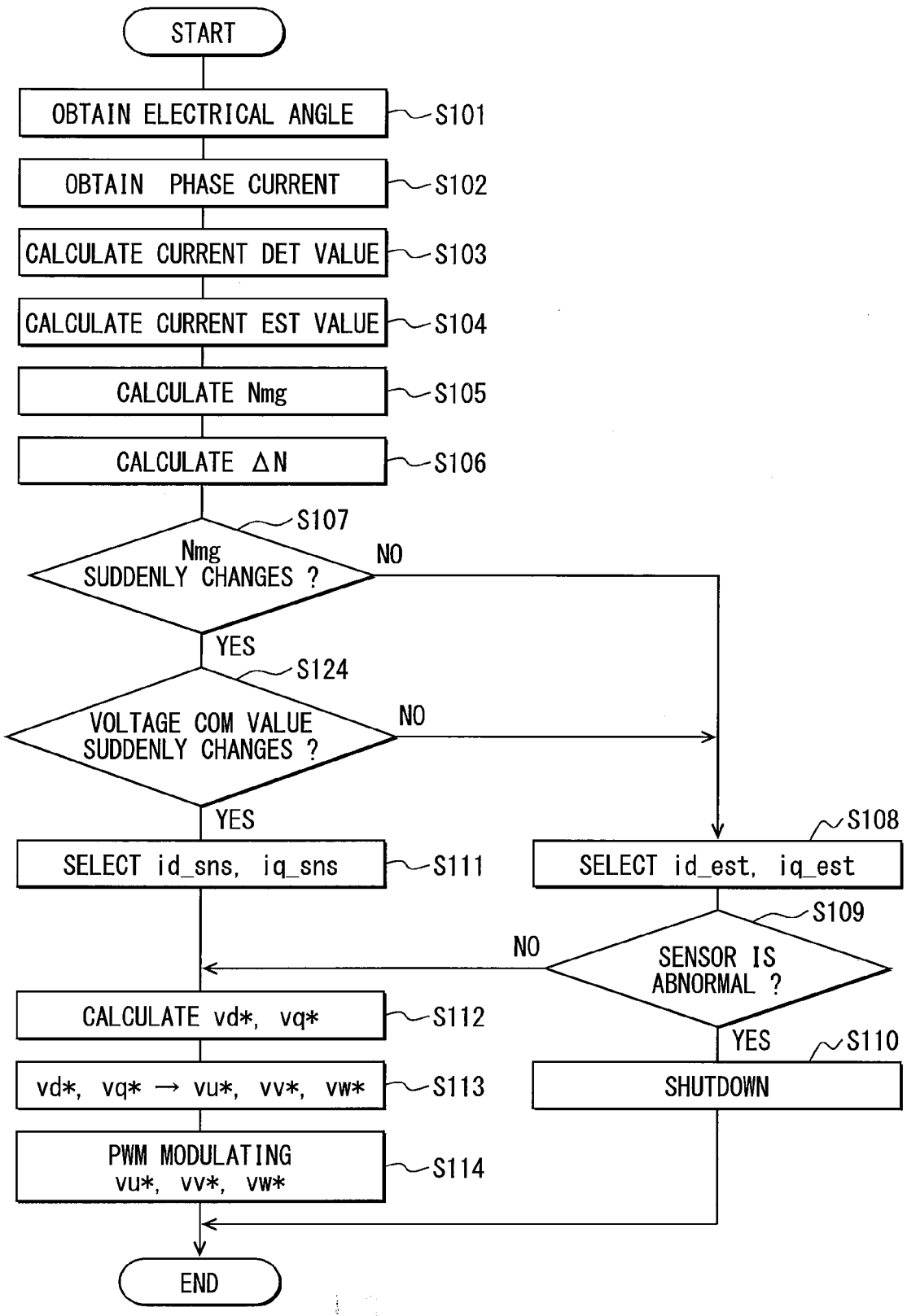
FIG. 14 is a flowchart of a drive control process according to the fifth embodiment.

A flowchart of a drive control process according to the twelfth embodiment is almost the same as the flowchart shown in FIG. 14 in which S112-S114 are replaced with S151-S154 in FIG. 27.

At S124, to which the drive control process proceeds when the switch determinator 65 determines that the rotation speed Nmg suddenly changes (YES at S107), the switch determinator 65 determines whether the voltage command phase vφ suddenly changes. Like the determination of whether the rotation speed Nmg suddenly changes, determination of whether the voltage command phase vφ suddenly changes can be made based on any value including a moving average, a difference between previous and present values, and a difference between maximum and minimum values over a predetermined period. If the switch determinator 65 does not determine that the voltage command phase vφ suddenly changes (NO at S124), the drive control process proceeds to S108 so that the one-phase control can be selected. In contrast, if the switch determinator 65 determines that the voltage command phase vφ suddenly changes (YES at S124), the drive control process proceeds to S111 so that the two-phase control can be selected.

(Thirteenth Embodiment)

A thirteenth embodiment of the present disclosure is described below with reference to FIG. 29. The twelfth embodiment differs from the eleventh embodiment in a procedure performed in the switch determinator 65.

Figure 29:
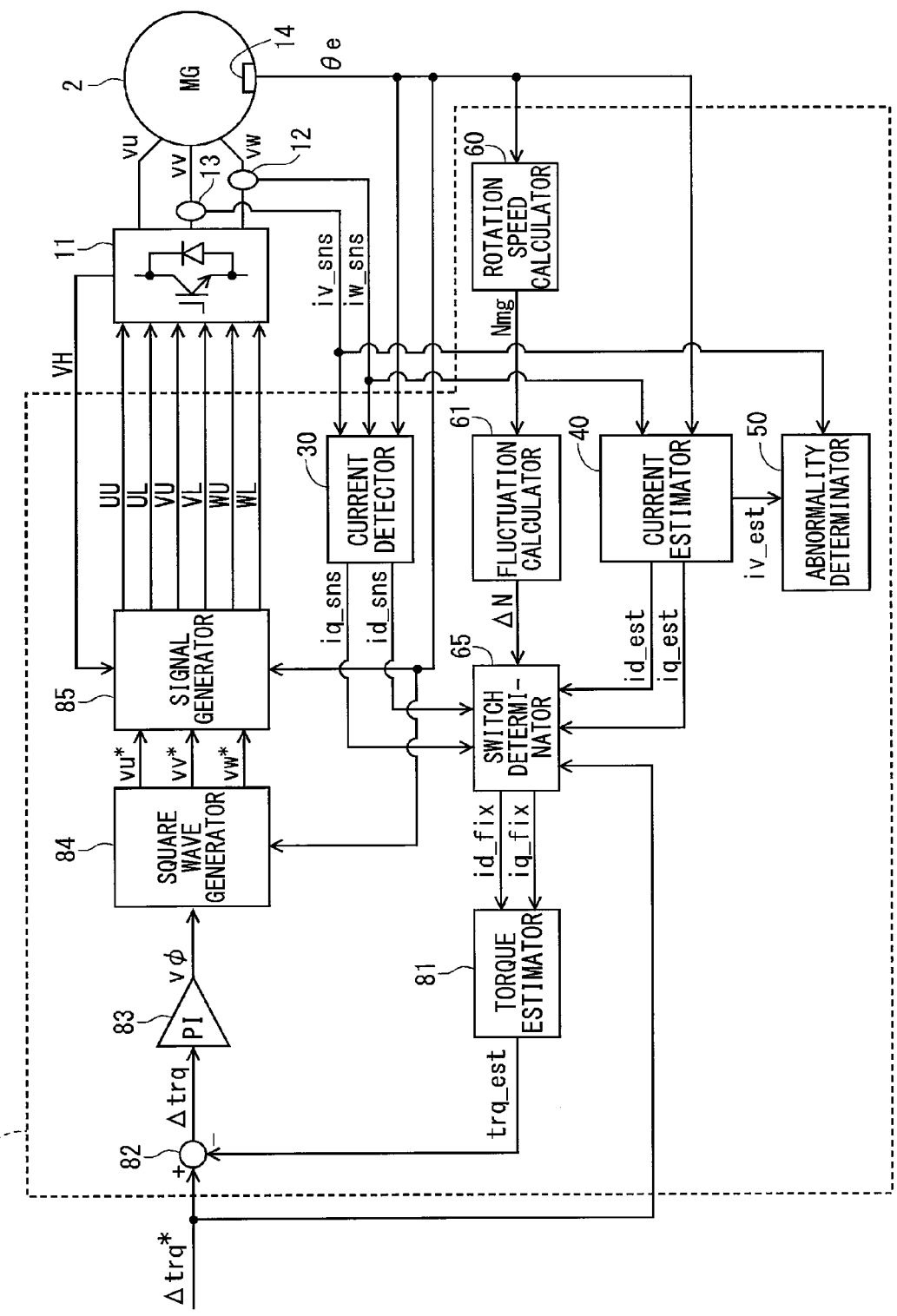
FIG. 29 is a block diagram of a controller according to a thirteenth embodiment of the present disclosure.

As shown in FIG. 29, according to the thirteenth embodiment, like the fourth embodiment, the switch determinator 65 determines whether the sudden change occurs based on whether the voltage command phase vφ suddenly changes in addition to whether the torque command value trq*.

Figure 12:
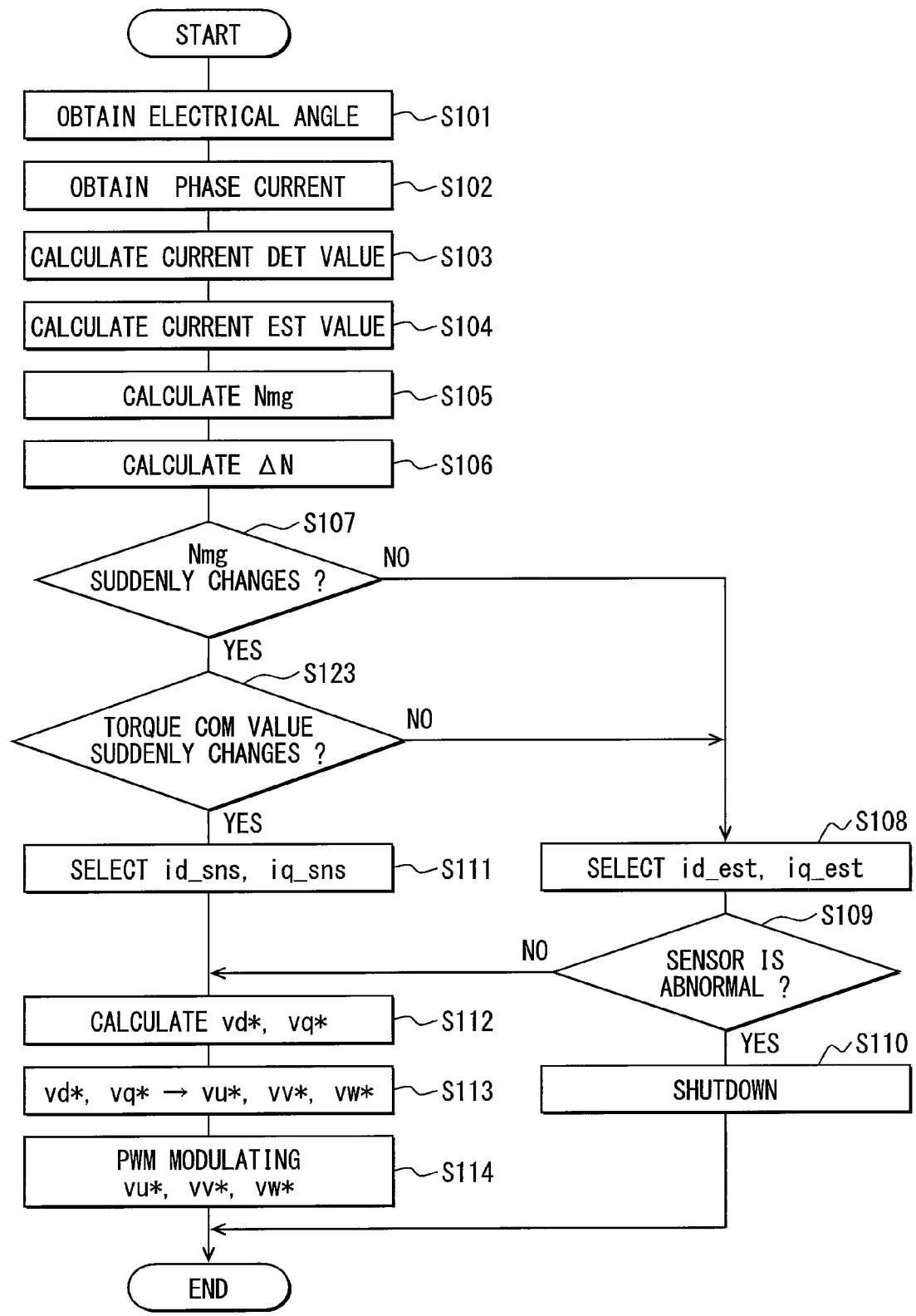
FIG. 12 is a flowchart of a drive control process according to the fourth embodiment.

A flowchart of a drive control process according to the thirteenth embodiment is almost the same as the flowchart shown in FIG. 12 in which S112-S114 are replaced with S151-S154 in FIG. 27.

(Modifications)

While the present disclosure has been described with reference to embodiments thereof, it is to be understood that the disclosure is not limited to the embodiments. The present disclosure is intended to cover various modifications and equivalent arrangements within the spirit and scope of the present disclosure.

In the second to fifth embodiments, the twelfth embodiment, the thirteenth embodiment, the determination of whether the sudden change occurs is made based on the rotation speed of the AC motor and (i) the difference between the d-axis current command value and the d-axis current detection value and the difference between the q-axis current command value and the q-axis current detection value, (ii) the d-axis current command value and the q-axis current command value, (iii) the torque command value, (iv) the d-axis voltage command value and the q-axis voltage command value, or (v) the voltage command phase. Alternatively, the determination of whether the sudden change occurs can be made based on the rotation speed of the AC motor and at least two of (i)-(v). For example, when the determination of whether the sudden change occurs is made based on the rotation speed of the AC motor and all of (i)-(v), a flowchart of a drive control process can be as follows. When an affirmative determination is made at S107, S121-S124 are added. When an affirmative determination is made, the drive control process proceeds to S111, and when a negative determination is made, the drive control process proceeds to S108. Further, when an affirmative determination is made at all of S121-S124, the drive control process can proceed to S111. It is noted that S121-S124 can be performed in any order.

The sixth embodiment, in which two-phase control is continued for the predetermined time period, can be combined with any other embodiment.

The seventh embodiment, in which there is a period where only one of a set of the d-axis current estimation value and the q-axis current estimation value and a set of the d-axis current detection value and the q-axis current detection value is calculated, can be combined with any other embodiment except the second embodiment, in which there is a need to calculate the set of the d-axis current detection value and the q-axis current detection value even in the one-phase control.

In the first embodiment, the current estimator calculates the d-axis current estimation value and the q-axis current estimation value by using the d-axis current command value and the q-axis current command value. It is noted that an update period of the d-axis current command value and the q-axis current command value may be longer than a phase current detection period or a voltage command calculation period. In such a case, the d-axis current command value and the q-axis current command value, which are used to calculate the d-axis current estimation value and the q-axis current estimation value, can be updated at a higher frequency or processed by a low-pass filter.

The zero-crossing interpolation procedure performed by the zero-crossing interpolator of the current estimator is not limited to that described in the embodiments. The zero-crossing interpolation procedure can be omitted if unnecessary.

Regarding division by zero, to prevent the estimation value from being calculated to be an unintended value in the formula (15) due to influence of discrete system, the estimation coefficient iv_kp or the term "1/tan(θx)" in the estimation coefficient iv_kp can be limited within a predetermined range. When the formula (15) is implemented in the controller 15, it is preferable that the estimation coefficient iv_kp or the term "1/tan(θx)" in the estimation coefficient iv_kp should be determined by referring to a map and limited on the map.

In the embodiments, the two-phase control current value, the one-phase control current value, the current fixed value, the voltage command value, and the current command value are described as being on the dq-axis. Alternatively, these values can be based on a phase value or another axis, as long as they can be used for current feedback control. Further, the voltage command value can be calculated by any other method and by using any other parameter, as long as the voltage command value is calculated based on a command value (e.g., a current command value or a torque command value) related to driving of the AC motor and the current fixed value.

In the embodiments, the command value related to driving of the AC motor is a current command value in the current feedback control system and a torque command value in the torque feedback control system. However, the command value related to driving of the AC motor can be any value, as long as it is related to driving of the AC motor. It is not always necessary that a command value used for calculation of the voltage command value is the same as a command value used for determination of the sudden change. For example, the torque command value can be used for calculation of the voltage command value, and the current command value can be used for determination of the sudden change.

In the first to tenth embodiments, the voltage command value is calculated by the current feedback control system. In the eleventh to thirteenth embodiments, the voltage command value is calculated by the torque feedback control system. Alternatively, the inverter for controlling the voltage applied to the AC motor can be controlled by any other method that employs current feedback control. The current feedback control system described in the first to tenth embodiments and the torque feedback control system described in the eleventh to thirteenth can be switched from each other according to, for example, the rotation speed and the torque of the AC motor.

In the embodiments, the W-phase is described as an example of the first phase, and the V-phase is described as an example of the second phase. Alternatively, the first phase can be any one of the U-phase, the V-phase, and the W-phase, and the second phase can be any one of the others of the U-phase, the V-phase, and the W-phase.

In the embodiments, two current sensors are provided to two of three phases. Alternatively, three current sensors can be provided to three phases. In this case, when an abnormal condition occurs in any one of the three phases, the drive control process according to the present disclosure can be used to control the other two normal phases. The abnormal condition and the phase in which the abnormal condition occurs can be detected by any method.

In the embodiments, an abnormality detection procedure for detecting whether the abnormal condition occurs in the current sensor is always performed in the one-phase control. Alternatively, the abnormality detection procedure can be omitted in the one-phase control. Further, the abnormality detection procedure can be performed independently from the drive control process. Furthermore, the abnormality detection procedure can be performed at a frequency different from a frequency at which the drive control process is performed.

In the embodiments, the determination of whether the abnormal condition occurs in at least one of the W-phase current sensor and the V-phase current sensor is made based on the result of the comparison between the V-phase current estimation value, which is calculated based on the W-phase current detection value, and the V-phase current detection value. Alternatively, the determination of whether the abnormal condition occurs in at least one of the W-phase current sensor and the V-phase current sensor can be made based on the result of the comparison between the W-phase current estimation value, which is calculated based on the V-phase current detection value, and the W-phase current detection value. That is, the determination of whether the abnormal condition occurs in at least one of the first current sensor and the second current sensor can be made based on the result of the comparison between the first-phase current estimation value, which is calculated based on the second-phase current detection value, and the first-phase current detection value.

In this example, a current sensor used for controlling the drive of the AC motor is provided to the W-phase as the first phase and defined as the W-phase current sensor, and a current sensor used for detecting a current sensor abnormal condition is provided to the V-phase as the second phase and defined as the V-phase current sensor. In other words, a current sensor used for controlling the drive of the AC motor and a current sensor used for detecting the abnormal condition are clearly distinguished from each other. In a system where feedback control is accurately performed at high speed, if a current sensor used for controlling the drive of the AC motor and a current sensor used for detecting the abnormal condition are not distinguished from each other, control is performed so that a desired sinusoidal current can be obtained. As a result, current feedback interference, which gives an illusion that the current sensors are normal, occurs. In contrast, when a current sensor used for controlling the drive of the AC motor and a current sensor used for detecting the abnormal condition are clearly distinguished from each other, and the W-phase current estimation value is calculated based on the V-phase current detection value, which is not used for calculation of one-phase control current value to be fed back in the one-phase control, the calculated W-phase current estimation value is not affected by the current feedback interference. In this way, when the current sensor used for detecting the abnormal condition is independent of a current feedback loop, the current feedback interference does not occur so that the current sensor abnormal condition can be suitably detected.

In the embodiments, the rotation angle sensor detects and outputs the electrical angle θe to the controller. Alternatively, the rotation angle sensor can detect and output a mechanical angle θm to the controller, and a conversion of the mechanical angle θm to the electrical angle θe can be performed in the controller. Further, the mechanical angle θm can be used as a rotation angle detection value instead of the electrical angle θe. Furthermore, the rotation speed Nmg can be calculated based on the mechanical angle θm.

In the embodiments, the AC motor is a permanent magnet three-phase synchronous motor. Alternatively, the AC motor can be an induction motor or another type of synchronous motor. In the embodiments, the AC motor is a so-called motor generator serving as not only a motor but also a generator. Alternatively, the AC motor can serve as only a motor.

The AC motor can be connected to an engine. In this case, the AC motor can serve as a motor to start the engine and serve as a generator using power of the engine. Further, multiple AC motors can be provided, and a power distribution mechanism for distributing power of the engine and the AC motors.

In the embodiments, the motor control apparatus according to the present disclosure is applied to a motor drive system having one set of an AC motor and an inverter. Alternatively, the motor control apparatus can be applied to a motor drive system having multiple sets of AC motors and inverters. Further, the motor control apparatus can be applied to a system, for example, used in a train, having multiple AC motors connected in parallel to one inverter.

What is claimed is:

1. An apparatus for controlling a three-phase AC motor to which a voltage controlled by an inverter is applied, the control apparatus comprising:
   a first current receiver configured to receive a first current detection value from a first current sensor provided to a first phase of the AC motor;
   a second current receiver configured to receive a second current detection value from a second current sensor provided to a second phase of the AC motor, the second phase being different from the first phase;
   a rotation angle receiver configured to receive a rotation angle detection value from a rotation angle sensor that detects a rotation angle of the AC motor;
   a two-phase control current value calculator configured to calculate a two-phase control current value based on the first current detection value, the second current detection value, and the rotation angle detection value;
   a one-phase control current value calculator configured to calculate a one-phase control current value based on the first current detection value and the rotation angle detection value;
   a rotation speed calculator configured to calculate a rotation speed of the AC motor;
   a fluctuation calculator configured to calculate a rotation speed fluctuation indicative of a fluctuation in the rotation speed;
   a sudden-change determinator configured to determine whether a sudden change occurs based on the rotation speed fluctuation;
   a switch configured to select the one-phase control current value as a current fixed value when the sudden-change determinator does not determine that the sudden change occurs, the switch configured to select the two-phase control current value as the current fixed value when the sudden-change determinator determines that the sudden change occurs, and
   a voltage command value calculator configured to calculate a voltage command value based on the current fixed value and a drive command value related to driving of the AC motor, the voltage command value related to a voltage applied to the inverter.

2. The apparatus according to claim 1, wherein the sudden-change determinator determines whether the sudden change occurs based on a difference between a current command value related to driving of the AC motor and the two-phase control current value in addition to the rotation speed fluctuation.

3. The apparatus according to claim 1, wherein the sudden-change determinator determines whether the sudden change occurs based on a current command value related to driving of the AC motor in addition to the rotation speed fluctuation.

4. The apparatus according to claim 1, wherein the sudden-change determinator determines whether the sudden change occurs based on a torque command value related to driving of the AC motor in addition to the rotation speed fluctuation.

5. The apparatus according to claim 1, wherein the sudden-change determinator determines whether the sudden change occurs based on the voltage command value related to driving of the AC motor in addition to the rotation speed fluctuation.

6. The apparatus according to claim 1, wherein when the switch selects the two-phase control current value as the current fixed value, the switch continues to select the two-phase control current value for a predetermined time period.

7. The apparatus according to claim 1, wherein the one-phase control current value calculator calculates the one-phase control current value based on a current command value related to driving of the AC motor in addition to the first current detection value and the rotation angle detection value.

8. The apparatus according to claim 1, wherein
a α-axis is defined as an axis coinciding with the first phase of the AC motor,
a β-axis is defined as an axis orthogonal to the α-axis,
the one-phase control current value calculator calculates the one-phase control current value based on a α-axis current detection value and a β-axis current estimation value,
the α-axis current detection value is calculated based on the first current detection value, and
the β-axis current estimation value is estimated based on a differential value of the α-axis current detection value.

9. The apparatus according to claim 1, wherein
the one-phase control current value calculator calculates the one-phase control current value by integrating a correction vector on a dq-axis plane,
the correction vector is calculated based on the first current detention value and a current reference value, and
the current reference value is a first-phase component of the previously-calculated one-phase control current value.

10. The apparatus according to claim 1, further comprising:
   an other-phase current estimator configured to calculate at least one of a first-phase current estimation value derived from the second current detection value and a second-phase current estimation value derived from the first current detection value, and
   an abnormality determinator configured to determine whether an abnormal condition occurs in at least one of the first current sensor and the second current sensor, when the switch selects the one-phase control current value as the current fixed value, wherein
   the abnormality determinator determines whether the abnormal condition occurs based on at least one of a result of a comparison between the first current detection value and the first-phase current estimation value and a result of a comparison between the second current detection value and the second-phase current estimation value.

11. The apparatus according to claim 1, wherein
the voltage command value calculator calculates the voltage command value based on the feedback current fixed value and a current command value related to driving of the AC motor.

12. The apparatus according to claim 1, further comprising:
a torque estimator configured to calculate a torque estimation value based on the current fixed value, wherein
the voltage command value calculator calculates the voltage command value based on the feedback torque estimation value and a torque command value related to driving of the AC motor.

13. The apparatus according to claim 1, further comprising:
a torque estimator configured to calculate a torque estimation value based on the current fixed value, wherein
the voltage command value calculator is capable of switching between a current feedback control system and a torque feedback control system,
in the current feedback control system, the voltage command value calculator calculates the voltage command value based on the feedback current fixed value and a current command value related to driving of the AC motor, and
in the torque feedback control system, the voltage command value calculator calculates the voltage command value based on the feedback torque estimation value and a torque command value related to driving of the AC motor.

* * * * *